US008976103B2

(12) United States Patent
Ino et al.

(10) Patent No.: US 8,976,103 B2
(45) Date of Patent: Mar. 10, 2015

(54) DISPLAY APPARATUS, DRIVING METHOD FOR DISPLAY APPARATUS AND ELECTRONIC APPARATUS

(75) Inventors: Masumitsu Ino, Kanagawa (JP); Yasuhiro Ukai, Hyogo (JP)

(73) Assignee: Japan Display West Inc., Aichi-Ken (JP)

( * ) Notice: Subject to any disclaimer, the term of this patent is extended or adjusted under 35 U.S.C. 154(b) by 1308 days.

(21) Appl. No.: 12/213,274

(22) Filed: Jun. 18, 2008

(65) Prior Publication Data

US 2009/0046085 A1 Feb. 19, 2009

(30) Foreign Application Priority Data

Jun. 29, 2007 (JP) ................................ P2007-173459
Jun. 29, 2007 (JP) ................................ P2007-173460
Apr. 30, 2008 (JP) ................................ P2008-119202

(51) Int. Cl.
*G09G 3/36* (2006.01)
*G06F 3/038* (2013.01)
*G09G 5/00* (2006.01)

(52) U.S. Cl.
CPC ............ *G09G 3/3674* (2013.01); *G09G 3/3648* (2013.01); *G09G 2310/06* (2013.01); *G09G 2320/0223* (2013.01)
USPC ........................................... 345/100; 345/208

(58) Field of Classification Search
USPC .................... 345/87–104, 204–215, 690–699
See application file for complete search history.

(56) References Cited

U.S. PATENT DOCUMENTS

| | | | | |
|---|---|---|---|---|
| 5,391,948 | A | 2/1995 | Izumita et al. | |
| 5,396,262 | A * | 3/1995 | Hastings, III | 345/92 |
| 5,495,353 | A | 2/1996 | Yamazaki et al. | |
| 5,773,999 | A * | 6/1998 | Park et al. | 327/108 |
| 5,825,215 | A * | 10/1998 | Sugio et al. | 327/108 |
| 5,892,495 | A * | 4/1999 | Sakai et al. | 345/98 |
| 5,969,702 | A * | 10/1999 | Bae | 345/92 |
| 6,064,364 | A * | 5/2000 | Katoh et al. | 345/100 |
| 6,108,056 | A * | 8/2000 | Nakajima et al. | 349/38 |
| 7,002,545 | B2 * | 2/2006 | Osame | 345/98 |
| 7,133,105 | B2 * | 11/2006 | Kim et al. | 349/149 |
| 8,143,919 | B2 * | 3/2012 | Kurokawa | 326/114 |
| 8,704,551 | B2 * | 4/2014 | Kurokawa | 326/114 |
| 2002/0175888 | A1 * | 11/2002 | Murade | 345/92 |
| 2003/0117354 | A1 * | 6/2003 | Maekawa et al. | 345/87 |
| 2004/0113881 | A1 * | 6/2004 | Kim | 345/97 |
| 2007/0097104 | A1 | 5/2007 | Kuroki | |

FOREIGN PATENT DOCUMENTS

| | | |
|---|---|---|
| JP | 06-090520 | 3/1994 |
| JP | 06-337399 | 12/1994 |
| JP | 08-234703 A | 9/1996 |

(Continued)

OTHER PUBLICATIONS

Japanese Office Action issued Aug. 7, 2012 for corresponding Japanese Application No. 2008-119202.

(Continued)

*Primary Examiner* — Patrick F Marinelli
(74) *Attorney, Agent, or Firm* — Rader, Fishman & Grauer PLLC

(57) ABSTRACT

Disclosed herein is a display apparatus, including, a pixel section, a plurality of scanning lines, a plurality of signal lines, and a driving circuit.

13 Claims, 54 Drawing Sheets

(56) References Cited

FOREIGN PATENT DOCUMENTS

| | | | |
|---|---|---|---|
| JP | 2005-148424 | | 6/2005 |
| JP | 2005-148425 | | 6/2005 |
| JP | 2006-78505 | | 3/2006 |
| JP | 2007-52370 | | 3/2007 |
| JP | 2007-086736 | A | 4/2007 |
| JP | 2008-040327 | A | 2/2008 |
| KR | 2007-0023577 | A | 2/2007 |
| WO | WO-94/20949 | A1 | 9/1994 |

OTHER PUBLICATIONS

Korean Office Action issued Jan. 31, 2014 for corresponding Korean Application No. 10-2008-0062331.

* cited by examiner

100
HDRV
VDRV
120
SIGNAL DRIVER D11
SIGNAL DRIVER D12
SIGNAL DRIVER D13
SIGNAL DRIVER D14
131
132
133
134
130
116-1
116-2
116-3
116-4
116-5
116-6
116-7
116-8
116-9
116-10
116-11
116-12(n)
160 VDD2
161 VSS2
117
Vcom
140-1
140-2
140-3
140-m
Gp1
Gp2
Gp3
Gpm
111
112
113
114
115-1
115-2
115-3
115-m
150-11
150-12
150-13
150-1m
150-21
150-22
150-23
150-2m
110

Gp
GAGE PULSE WAVEFORM: AFTER GATE BUFFER

IDEAL WAVEFORM
DISTORTION OF WAVEFORM WHERE NO WAVEFORM SHAPING IS INVOLVED
GATE PULSE WAVEFORM: AT TERMINAL END PORTION OF GATE WIRING LINE

112A

112B

100A
SIGNAL DRIVER D11
SIGNAL DRIVER D12
SIGNAL DRIVER D13
SIGNAL DRIVER D14
131
132
133
134
130
116-1
116-2
116-3
116-4
116-5
116-6
116-7
116-8
116-9
116-10
116-11
116-12(n)
160 VDD2
161 VSS2
117
Vcom
115-1
115-2
115-3
115-m
150-11
150-12
150-13
150-14 (n)
150-21
150-22
150-23
150-24 (n)
140-1
140-2
140-3
140-m
120
VDRV
110

GAGE PULSE WAVEFORM: AFTER GATE BUFFER

GATE WAVEFORM SHAPED
GATE PULSE WAVEFORM: AT TERMINAL END PORTION OF GATE WIRE OF GATE LINE

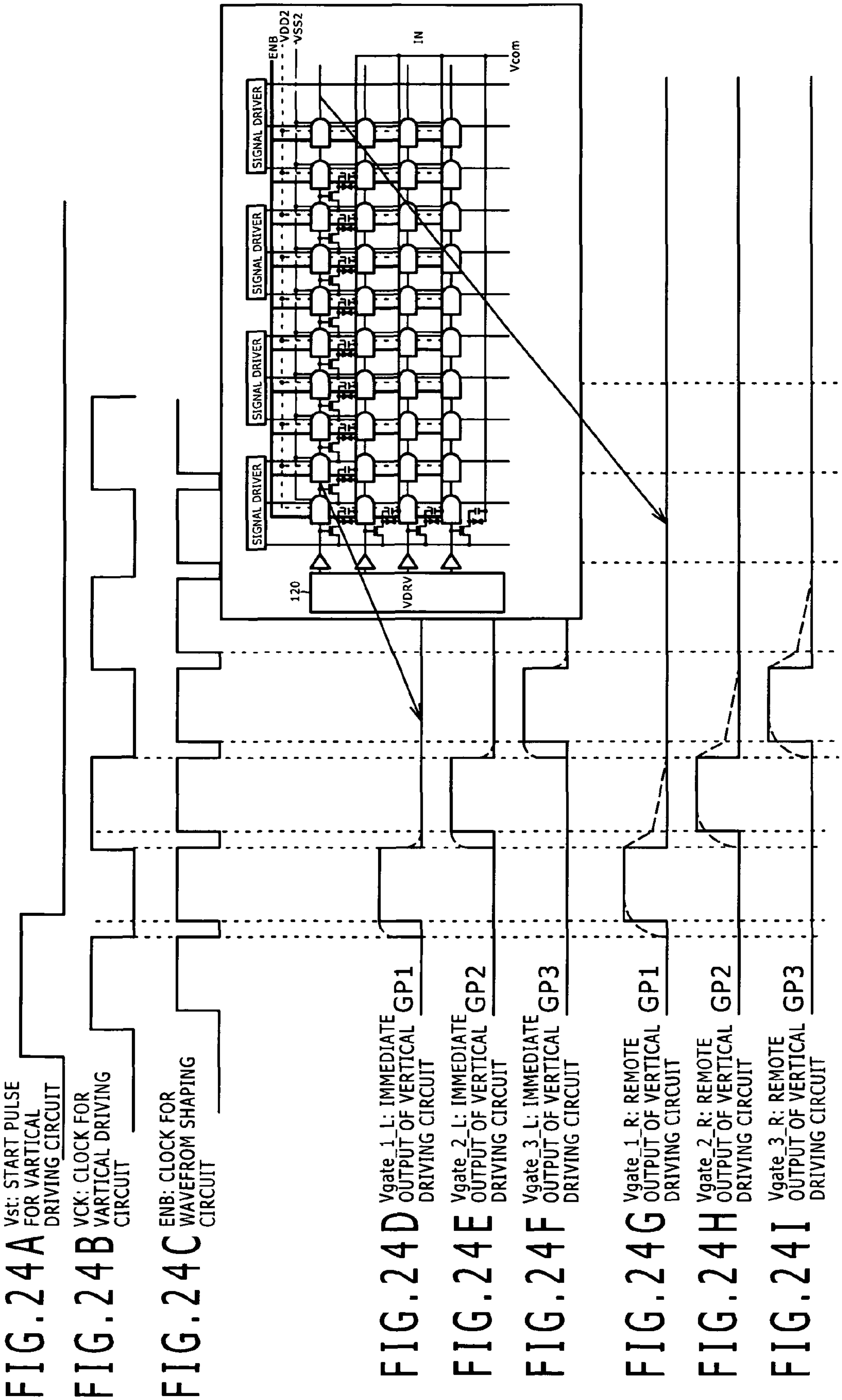
FIG. 24A Vst: START PULSE FOR VARTICAL DRIVING CIRCUIT
FIG. 24B VCK: CLOCK FOR VARTICAL DRIVING CIRCUIT
FIG. 24C ENB: CLOCK FOR WAVEFROM SHAPING CIRCUIT
FIG. 24D Vgate_1_L: IMMEDIATE OUTPUT OF VERTICAL DRIVING CIRCUIT GP1
FIG. 24E Vgate_2_L: IMMEDIATE OUTPUT OF VERTICAL DRIVING CIRCUIT GP2
FIG. 24F Vgate_3_L: IMMEDIATE OUTPUT OF VERTICAL DRIVING CIRCUIT GP3
FIG. 24G Vgate_1_R: REMOTE OUTPUT OF VERTICAL DRIVING CIRCUIT GP1
FIG. 24H Vgate_2_R: REMOTE OUTPUT OF VERTICAL DRIVING CIRCUIT GP2
FIG. 24I Vgate_3_R: REMOTE OUTPUT OF VERTICAL DRIVING CIRCUIT GP3
SIGNAL DRIVER
SIGNAL DRIVER
SIGNAL DRIVER
SIGNAL DRIVER
ENB
VDD2
VSS2
IN
Vcom
120
VDRV

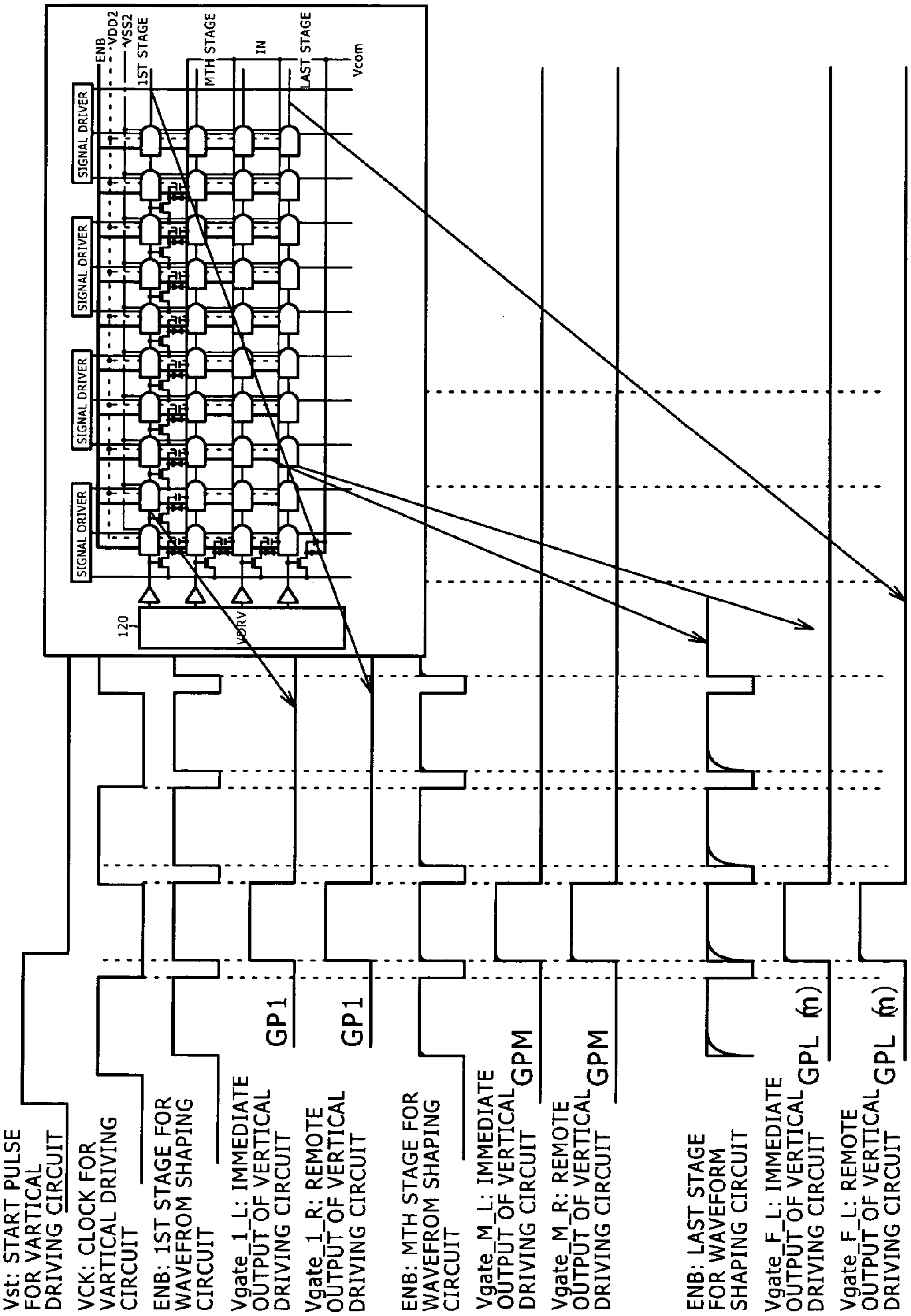

FIG.25A Vst: START PULSE FOR VARTICAL DRIVING CIRCUIT

FIG.25B VCK: CLOCK FOR VARTICAL DRIVING CIRCUIT

FIG.25C ENB: 1ST STAGE FOR WAVEFROM SHAPING CIRCUIT

FIG.25D Vgate_1_L: IMMEDIATE OUTPUT OF VERTICAL DRIVING CIRCUIT

FIG.25E Vgate_1_R: REMOTE OUTPUT OF VERTICAL DRIVING CIRCUIT

FIG.25F ENB: MTH STAGE FOR WAVEFROM SHAPING CIRCUIT

FIG.25G Vgate_M_L: IMMEDIATE OUTPUT OF VERTICAL DRIVING CIRCUIT

FIG.25H Vgate_M_R: REMOTE OUTPUT OF VERTICAL DRIVING CIRCUIT

FIG.25I ENB: LAST STAGE FOR WAVEFORM SHAPING CIRCUIT

FIG.25J Vgate_F_L: IMMEDIATE OUTPUT OF VERTICAL DRIVING CIRCUIT

FIG.25K Vgate_F_L: REMOTE OUTPUT OF VERTICAL DRIVING CIRCUIT

PIXEL ELECTRODE REFLECTION REGION
161
A
112 (402)
PT2
NT2
REFLECTION ELECTRODE CONTACT
PT1
NT1
160
PIXEL ELECTRODE TRANSMISSION REGION
B
116
115 GP
405a
B
A
116
400
404
405
406
407
411
410
409
408
401
402
403

500
503
502
501

510
511
512
513
514

510
513

520
521
522
523
524

530
531
532
533
534

530
531
533
535
536
537

540
541
543

DISPLAY APPARATUS, DRIVING METHOD FOR DISPLAY APPARATUS AND ELECTRONIC APPARATUS

CROSS REFERENCES TO RELATED APPLICATIONS

The present invention contains subject matter related to Japanese Patent Applications JP 2008-119202, filed in the Japan Patent Office on Apr. 30, 2008, Japanese Patent Applications JP 2007-173459 and JP 2007-173460 which are both filed in the Japan Patent Office on Jun. 29, 2007, the entire contents of which being incorporated herein by reference.

BACKGROUND OF THE INVENTION

1. Field of the Invention

This invention relates to a display apparatus wherein a thin film transistor as a switching device is formed on a transparent insulating substrate, a driving method for the display apparatus, and an electronic apparatus.

2. Description of the Related Art

A display apparatus, for example, a liquid crystal display apparatus wherein a liquid crystal cell is used as a display element or an electro-optical element is an image display apparatus wherein such pixels are arrayed in a matrix and an output image is displayed through a liquid crystal display face.

The liquid crystal display apparatus is slim and low in power consumption. Making the most of these features, the liquid crystal display apparatus is applied to various electronic apparatuses such as, for example, personal digital assistants (PDA), portable telephone sets, digital cameras, video cameras, and personal computers.

FIGS. 1A to 1C shows an example of a popular liquid crystal display apparatus and gate pulse waveforms of the liquid crystal display apparatus.

Referring first to FIG. 1A, the liquid crystal display apparatus 1 shown includes an effective pixel section 2, a vertical driving circuit (VDRV) 3, and a horizontal driving circuit (HDRV) 4.

The effective pixel section 2 has a plurality of pixel circuits 21 arrayed in a matrix.

Each of the pixel circuits 21 includes a thin film transistor TFT 22 serving as a switching device, a liquid crystal cell 23, and a holding capacitor 24. The liquid crystal cell 23 is connected at the pixel electrode to the drain electrode or the source electrode of the TFT 22. The holding capacitor 24 is connected at one electrode thereof to the drain electrode of the TFT 22.

The pixel circuits 21 are connected to gate lines 5-1 to 5-m wired along a pixel array direction for the individual rows and signal lines 6-1 to 6-n wired along the other pixel array direction for the individual columns.

The gate electrodes of the TFTs 22 of the pixel circuits 21 are individually connected to same ones of the gate lines 5-1 to 5-m in a unit of a row. The source electrodes or the drain electrodes of the pixel circuits 21 are individually connected to same ones of the signal lines 6-1 to 6-n in a unit of a column.

Further, in each of the pixel circuits 21, the liquid crystal cell 23 is connected at the pixel electrode thereof to the drain electrode of the TFT 22 and at the opposing electrode thereof to a common line 7. The holding capacitor 24 is connected between the drain electrode of the TFT 22 and the common line 7.

The common line 7 is connected to receive, as a common voltage Vcom, a predetermined ac voltage from a VCOM circuit not shown formed integrally with a driving circuit and so forth on a glass substrate.

The gate lines 5-1 to 5-m are individually driven by the vertical driving circuit 3, and the signal lines 6-1 to 6-n are individually driven by the horizontal driving circuit 4.

The vertical driving circuit 3 receives a vertical start signal VST, a vertical clock Vclk, and an enable signal ENAB and scans in a vertical direction, that is, in a direction of a row for each one field period to successively select the pixel circuits 21 connected to the gate lines 5-1 to 5-m in a unit of a row.

In particular, when a scanning pulse Gp1 is applied from the vertical driving circuit 3 to the scanning line 5-1, the pixels in the columns in the first row are selected, and when another scanning pulse Gp2 is applied to the scanning line 5-2, the pixels in the columns in the second row are selected. Thereafter, gate pulses GP3, . . . , Gpm are successively applied to the gate lines or scanning lines 5-3, . . . , 5-m similarly, respectively.

Gate buffers 8-1 to 8-m are provided at the output stage of a gate pulse Gp to the vertical driving circuit 3 to the gate lines 5-1 to 5-m, respectively.

FIG. 1B shows an example of a waveform at the output stage of the gate buffer 8-m to the gate line 5-m after gate buffering of the gate pulse Gpm.

FIG. 1C shows an example of a waveform at a wire terminal portion of the gate line 5-m of the gate pulse Gpm.

The horizontal driving circuit 4 receives a horizontal start pulse Hst, which is produced from a clock generator (not shown) and indicates starting of horizontal scanning, and horizontal clocks Hclk of the opposite phases to each other, which are used as a reference for horizontal scanning. Then, the horizontal driving circuit 4 generates a sampling pulse.

The horizontal driving circuit 4 successively samples image data R (red), G (green), and B (blue) inputted thereto in response to the sampling pulse generated thereby and supplies the sampled image data as data signals to be written into the pixel circuits 21 to the signal lines 6-1 to 6-n.

The horizontal driving circuit 4 divides the signal lines 6-1 to 6-n into a plurality of groups and includes signal drivers 41 to 44 corresponding to the individual groups.

While the liquid crystal display apparatus 1 shown in FIG. 1 has a basic configuration, a large number of techniques have been proposed regarding gate line driving by such a vertical driving circuit 3, as described above, and signal line driving by such a horizontal driving circuit 4, as described above. Such techniques are disclosed, for example, in Japanese Patent No. 3,276,996 (hereinafter referred to as Patent Document 1), Japanese Patent laid-Open No. 2007-52370 (hereinafter referred to as Patent Document 2), Japanese Patent No. 3,270,485 (hereinafter referred to as Patent Document 3), Japanese Patent Laid-Open No. 2006-78505 (hereinafter referred to as Patent Document 4), Japanese Patent Laid-Open No. 2005-148424 (hereinafter referred to as Patent Document 5), and Japanese Patent Laid-Open No. 2005-148425 (hereinafter referred to as Patent Document 6).

SUMMARY OF THE INVENTION

Incidentally, a gate pulse GP outputted from the vertical driving circuit 3 in the liquid crystal display apparatus 1 shown in FIG. 1 usually causes the resistance of a gate wiring line in the inside of the panel and parasitic capacitance in the gate wiring line, that is, gate capacitance of a TFT and capacitance between a pixel electrode and a VCOM wiring line, to generate impedance.

As a result, the gate output waveform at the terminal end of each gate wiring line of the vertical driving circuit 3, that is, at a remote end portion of the gate wiring line from the vertical driving circuit 3, indicates some distortion with respect to the waveform of the output at the output stage immediately next to the vertical driving circuit 3 due to a time constant generated by the generated impedance as indicated by a broken line in FIG. 1C.

The distortion of the waveform of the gate pulse gives rise to some difference in waveforms between locations different in distance from the output stage of the vertical driving circuit 3 on the gate line.

As a result, the TFTs 22 as pixel transistors at the different locations on the gate line are turned on at displaced timings from each other by a gate signal, and consequently, the image quality on the liquid crystal display apparatus is deteriorated. Particularly, a luminance difference in black and gray appears in the horizontal direction.

Further, for example, with the pixel number of the 4K2K SuperHighVision (4,096×RGB×1,080), since the horizontal period 1H is shorter than that of the HighVision (1,920×RGB×1,080), the picture quality deterioration is further serious.

Besides, the High Frame Rate of 240 Hz (normal rate is 60 Hz) further reduces the 1H period to one fourth, which disables display of an image itself.

Here, the High Frame Rate is described. For example, a liquid crystal display apparatus adopts a technique of increasing the number of frames and the frame frequency for display for one second period to four times ordinary ones to display thereby to improve the moving picture characteristic. Since the liquid crystal display apparatus normally operates with 60 Hz, the High Frame Rate is 240 Hz.

Meanwhile, the techniques disclosed in Patent Documents 1 to 6 have such disadvantages as described below.

The technique disclosed in Patent Document 1 is directed to a method of intentionally making the falling edge of a gate pulse longer than the rising edge of the gate pulse to suppress invasion of an undesirable potential into a pixel electrode upon turning off of a transistor. However, the technique does not make a countermeasure for the elimination of the distribution in delay along a gate line.

Therefore, the technique is not suitable for a liquid crystal display apparatus, which includes such a great number of pixels, that the resistance of gate lines gives rise to shading reduction at the left and right of the screen or uses the High Frame Rate for display.

The technique disclosed in Patent Document 2 involves data transfer in the vertical direction carried out for each pixel, transfer of a horizontal scanning signal in the vertical direction along control clock wiring lines laid for the individual pixels, and outputting of a gate pulse signal for each pixel.

According to the technique, power supplies VDD and VSS for a shift register, a clock signal and an input signal line and an output signal line for the shift register are required, and a space for these lines are needed around the aperture of the liquid crystal. This makes a cause of reduction of the aperture ratio of the liquid crystal.

This gives rise to decrease of the transmission factor and increase of power to the backlight.

Further, since a control clock line and a signal line are positioned adjacent to each other, invasion of an undesirable potential by parasitic capacitance between the signal line and the control clock line occurs. Consequently, malfunction is likely to occur. Further, since the clock itself has some delay by distortion caused by the capacitance, there is no effect to suppress the gate delay.

The technique disclosed in Patent Document 3 uses a PWM (Pulse Wave Modulation) method by which not analog data but digital data are used as signal data for display, and a gate pulse of a pixel is received and an output of a CMOS circuit is used as an output of a pixel potential.

However, the technique does not basically provide a countermeasure against the delay of a gate wiring line. Therefore, the technique is not suitable for a liquid crystal display apparatus, which includes such a great number of pixels that the resistance of gate lines gives rise to shading reduction at the left and right of the screen or uses the High Frame Rate for display.

In the display method disclosed in Patent Document 4, a writing method, which uses a thin film transistor (TFT), is carried out in the following manner.

In the writing method, pixel display is carried out successively from the left and writing of one frame image for 1/240 second or writing into liquid crystal for 1/60 second at successively displaced timings in such a manner that it appears as if frame rewriting were carried out in 1/240 second (FIG. 21 of Patent Document 4).

However, Patent Document 4 describes nothing of the input timing (inputting method) of image signal data into a data line driving circuit, and a particular writing system for writing in 240 Hz of the image frame frequency is not disclosed.

In the techniques disclosed in Patent Documents 5 and 6, a memory is built in a pixel in order to reduce the power consumption, and a circuit of an SRAM structure of CMOS is constructed.

However, the techniques are directed to a circuit for supplying a pixel potential and wiring of a signal line to the end but do not disclose a circuit configuration for eliminating the gate delay.

Therefore, since some delay along gate lines of the display apparatus appears, the circuit cannot cope with a display apparatus, which includes a great number of pixels or is driven at a high speed.

Therefore, it is demanded to provide a display apparatus, a driving method for the display apparatus, and an electronic apparatus that can suppress delay along a scanning line and wherein a great number of pixels can be driven at a high speed.

According to an embodiment of the present invention, there is provided a display apparatus, including:

a pixel section including a plurality of pixel circuits into each of which pixel data is written through a switching element, the pixel circuits being disposed so as to form a matrix including a plurality of columns;

a plurality of scanning lines disposed corresponding to the columns of the pixel circuits and configured to control conduction of the switching elements;

a plurality of signal lines disposed corresponding to the columns of the pixel circuits and configured to allow the pixel data to propagate therethrough; and a driving circuit configured to output a scanning pulse for rendering the switching elements of the pixel circuits conducting to the scanning lines, wherein a waveform shaping circuit disposed in a wire of each of the scanning lines and configured to carry out waveform shaping of the scanning pulse propagated in the scanning line.

According to another embodiment of the present invention, there is provided a driving method for a display apparatus which includes a pixel section including a plurality of pixel circuits in each of which pixel data is written through a switching element, the pixel circuits being disposed so as to form a matrix including a plurality of columns, a plurality of scanning lines disposed corresponding to the columns of the pixel circuits and configured to control conduction of the switching elements, a plurality of signal lines disposed corresponding to the columns of the pixel circuits and configured to allow the pixel data to propagate therethrough, and a driving circuit configured to output a scanning pulse for rendering the switching elements of the pixel circuits conducting to the scanning lines, the driving method including the step of:

shaping the waveform of the scanning pulse propagated in each of the scanning lines intermediately of the scanning line.

According to yet another embodiment of the present invention, there is provided a driving method for a display apparatus which includes a pixel section including a plurality of pixel circuits in each of which pixel data is written into a pixel cell through a switching element, the pixel circuits being disposed so as to form a matrix including a plurality of columns, a plurality of scanning lines disposed corresponding to the columns of the pixel circuits and configured to control conduction of the switching elements, a plurality of signal lines disposed corresponding to the columns of the pixel circuits and configured to allow the pixel data to propagate therethrough, and a driving circuit configured to output a scanning pulse for rendering the switching elements of the pixel circuits conducting to the scanning lines, the driving method including the steps of:

supplying an enable signal through a wire parallel to the signal lines to control starting of waveform shaping operation in response to the enable signal; and shaping the waveform of the scanning pulse propagated in each of the scanning lines intermediately of the scanning line.

According to yet another embodiment of the present invention, there is provided a electronic apparatus, including:

a display apparatus including:

a pixel section including a plurality of pixel circuits into each of which pixel data is written through a switching element, the pixel circuits being disposed so as to form a matrix including a plurality of columns;

a plurality of scanning lines disposed corresponding to the columns of the pixel circuits and configured to control conduction of the switching elements;

a plurality of signal lines disposed corresponding to the columns of the pixel circuits and configured to allow the pixel data to propagate therethrough;

a driving circuit configured to output a scanning pulse for rendering the switching elements of the pixel circuits conducting to the scanning lines; and a waveform shaping circuit disposed in a wire of each of the scanning lines and configured to carry out waveform shaping of the scanning pulse propagated in the scanning line.

The display apparatus, driving method for a display apparatus, and electronic apparatus are advantageous in that they can suppress delay in the scanning lines and can implement display of a greater number of pixels driven at a high speed.

BRIEF DESCRIPTION OF THE DRAWINGS

FIGS. 15A, 15B, and 15C are a circuit diagram and waveform diagrams showing an example of a configuration of a liquid crystal display apparatus according to a tenth embodiment of the present invention and examples of a gate pulse waveform, respectively;

FIGS. 24A to 24I are timing charts illustrating operation of the liquid crystal display apparatus shown in FIG. 23A;

FIGS. 25A to 25K are timing charts illustrating different operation of the liquid crystal display apparatus shown in FIG. 23A;

DETAILED DESCRIPTION OF THE PREFERRED EMBODIMENTS

In the following, the present invention is described in detail in connection with preferred embodiments thereof shown in the accompanying drawings.

<First Embodiment>

Figures 1A, 1B, 1C:
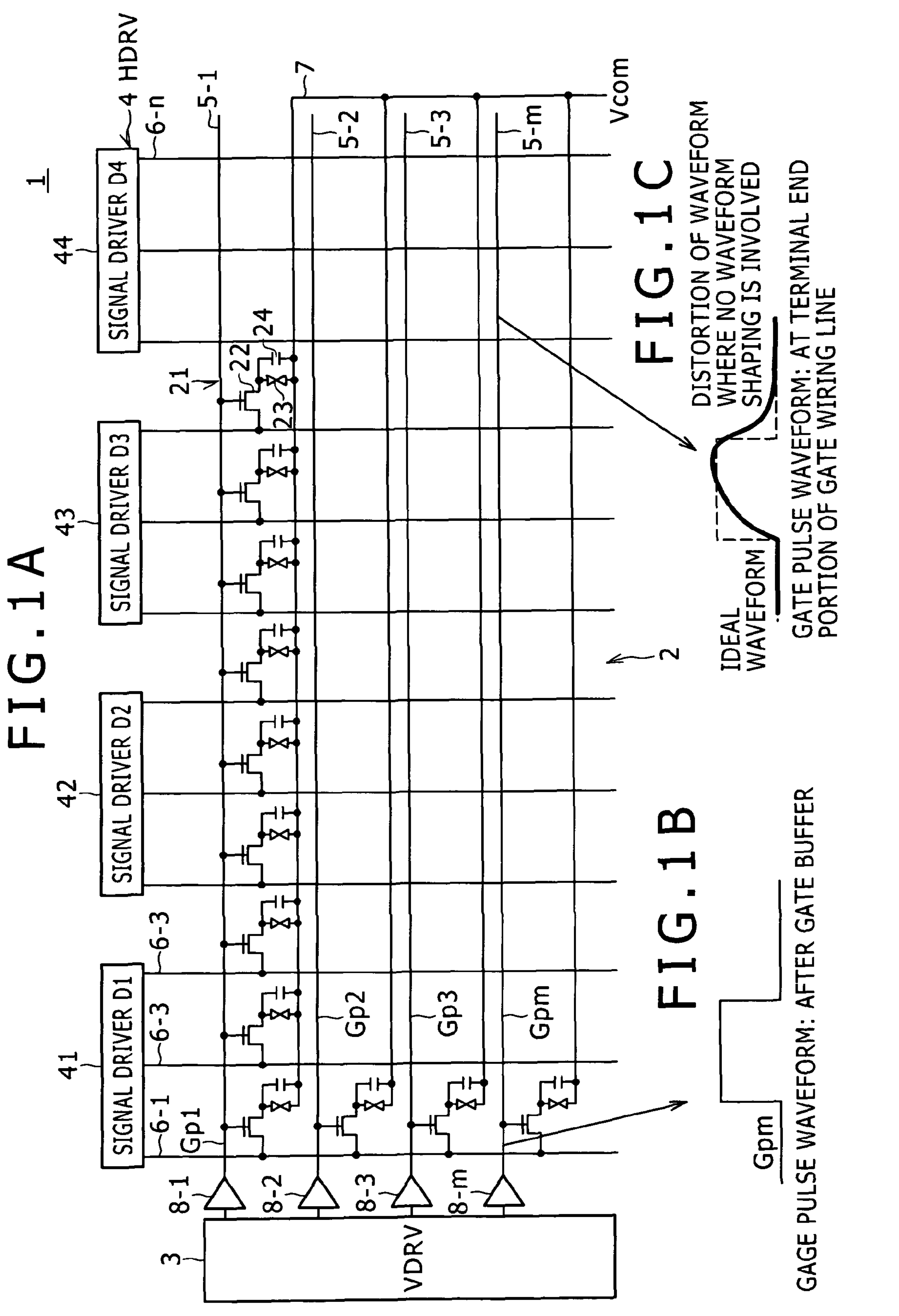
FIGS. 1A, 1B, and 1C are a circuit diagram and waveform diagrams showing an example of a configuration of a popular liquid crystal display apparatus and an example of gate pulse waveforms, respectively.
Figures 2A, 2B, 2C:
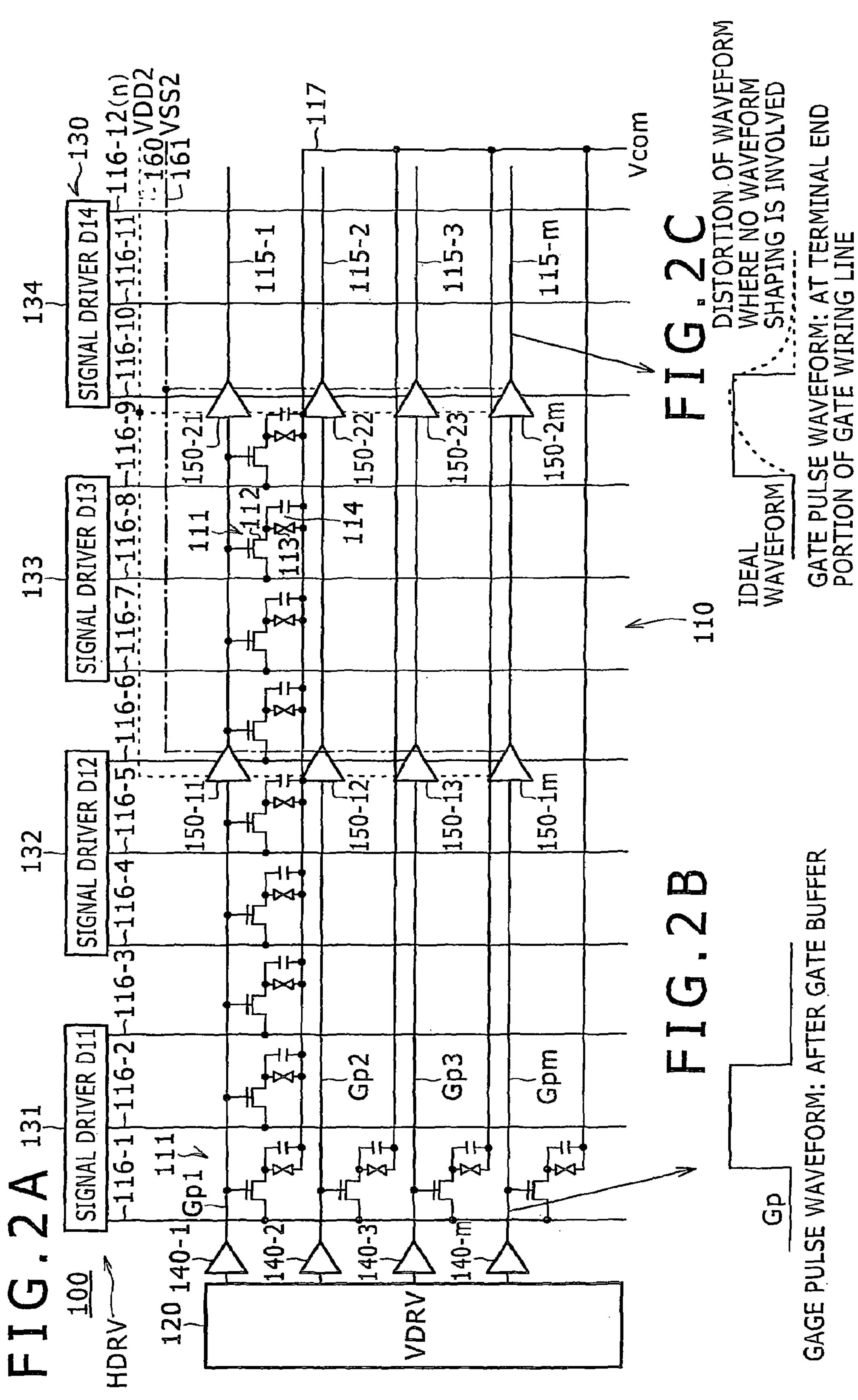
FIGS. 2A, 2B, and 2C are a circuit diagram and waveform diagrams showing an example of a configuration of a liquid crystal display apparatus according to a first embodiment of the present invention and examples of a gate pulse waveform, respectively.

FIGS. 2A to 2C show an example of a configuration of a liquid crystal display apparatus according to a first embodiment of the present invention and examples of a gate pulse waveform, respectively.

Referring first to FIG. 2A, the liquid crystal apparatus 100 includes an effective pixel region section 110, a vertical driving circuit (VDRV) 120 and a horizontal-driving circuit (HDRV) 130.

Gate buffers 140-1 to 140-m are disposed at the output stage of the vertical driving circuit 120 to gate lines 115-1 to 115-m which are scanning lines of a gate pulse GP.

In the liquid crystal apparatus 100 of the active matrix type of the present embodiment, waveform shaping circuits 150-11 to 150-1m and 150-21 to 150-2m for carrying out waveform shaping and voltage change for a gate pulse outputted from the vertical driving circuit 120 are disposed intermediately on the gate lines 115-1 to 115-m.

A gate pulse outputted from the vertical driving circuit 120 or the gate pulse after the waveform shaping and the voltage change are applied thereto is supplied to a pixel switch transistor formed from a thin film transistor through each of the gate lines 150-1 to 150-m.

The configuration, location and so forth of the waveform shaping circuits are hereinafter described in detail.

The effective pixel region section 110 includes a plurality of pixel circuits 111 arrayed in a matrix.

Each of the pixel circuits 111 includes a thin film transistor (TFT) 112 serving as a switching element, a liquid crystal cell 113, and a holding region or storage capacitor 114.

The liquid crystal cell 113 is connected at the pixel electrode thereof to the drain electrode or the source electrode of the TFT 112. The holding capacitor 114 is connected at one of electrodes thereof to the drain electrode of the TFT 112.

For the pixel circuits 111, the gate lines 115-1 to 115-m extend along the pixel array direction for the individual rows, and signal lines 116-1 to 116-n are wired along the pixel array direction for the individual columns.

The TFTs 112 of the pixel circuits 111 are connected at the gate electrode thereof to the same gate lines 115-1 to 115-m in a unit of a row. Further, the TFTs 112 of the pixel circuits 111 are connected at the source electrode or the drain electrode thereof to the same signal lines 116-1 to 116-n in a unit of a column.

Further, the liquid crystal cell 113 is connected at the pixel electrode thereof to the drain electrode of the TFT 112 and at the opposing electrode thereof to a common line 117. The holding capacitor 114 is connected between the drain electrode of the TFT 112 and the common line 117.

To the common line 117, a predetermined ac voltage is applied as a common voltage Vcom from a VCOM circuit not shown which is formed integrally with a driving circuit and so forth on a glass substrate.

The gate lines 115-1 to 115-m are driven by the vertical driving circuit 120, and the signal lines 116-1 to 116-n are driven by the horizontal driving circuit 130.

The TFT 112 is a switching element for selecting a pixel to be used for display and supplying a display signal to the pixel region of the selected pixel.

Figure 3:
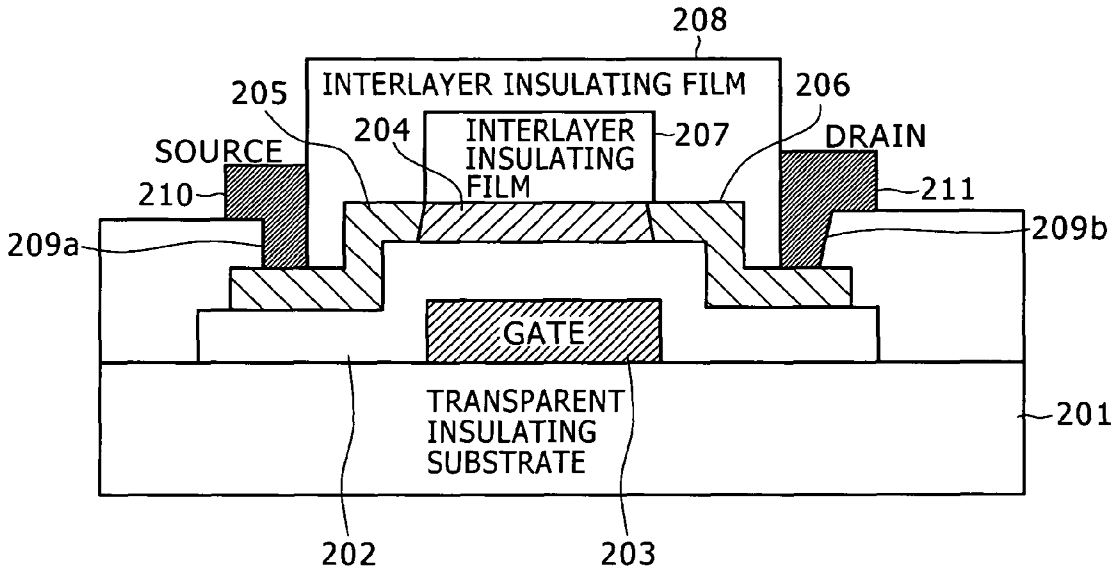
FIG. 3 is a schematic sectional view showing a TFT of a bottom gate structure.
Figure 4:
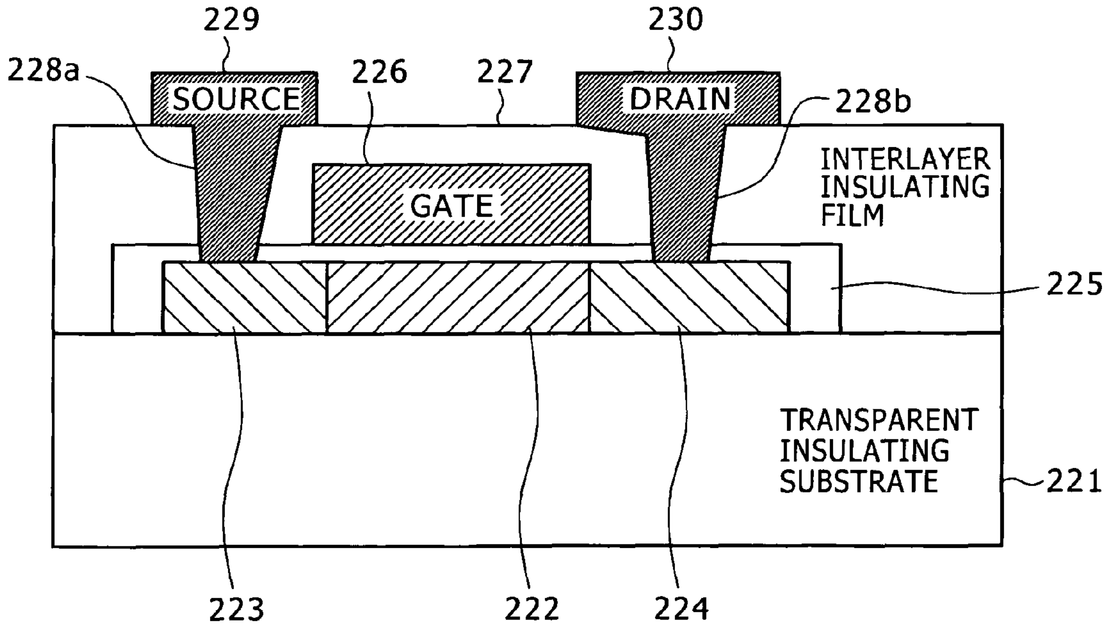
FIG. 4 is a schematic sectional view showing a TFT of a top gate structure.

The TFT 112 has, for example, such a bottom gate structure as shown in FIG. 3 or such a top gate structure as shown in FIG. 4.

Referring to FIG. 3, in the TFT 112A of the bottom gate structure shown, a gate electrode 203 covered with a gate insulating film 202 is formed on a transparent insulating substrate 201 formed, for example, from a glass substrate.

The gate electrode 203 is connected to a gate line 115 as a scanning line, and a gate pulse which is a scanning signal is inputted from the gate line 115 to the gate electrode 203. The TFT 112A is turned on or off in response to the scanning signal. The gate electrode 203 is formed from a film of a metal or an alloy of, for example, molybdenum (Mo) or tantalum (Ta) by such a method as sputtering.

The TFT 112A includes a semiconductor film 204 formed on the gate insulating film 202 and configured to function as a channel formation region. The TFT 112A further includes a pair of $n^+$ diffusing layers 205 and 206 formed across the semiconductor film 204. An interlayer insulating film 207 is formed on the semiconductor film 204, and another interlayer insulating film 208 is formed so as to cover the transparent insulating substrate 201, gate insulating film 202, $n^+$ diffusing layers 205 and 206 and interlayer insulating film 207.

A source electrode 210 is connected to the $n^+$ diffusing layer 205 through a contact hole 209*a* formed in the interlayer insulating film 208. Meanwhile, a drain electrode 211 is connected to the other $n^+$ diffusing layer 206 through a contact hole 209*b* formed in the interlayer insulating film 208.

The source electrode 210 and the drain electrode 211 are formed, for example, by patterning aluminum (Al). A signal line 116 is connected to the source electrode 210, and the drain electrode 211 is connected to a pixel region or pixel electrode through a connection electrode not shown.

Referring now to FIG. 4, the TFT 112B of the top gate structure is shown. The TFT 112B includes a semiconductor film 222 formed on a transparent insulating substrate 221 formed, for example, from a glass substrate and configured to function as a channel formation region. The TFT 112B further includes a pair of $n^+$ diffusing layers 223 and 224 formed across the semiconductor film 222.

A gate insulating film 225 is formed in such a manner as to cover the semiconductor film 222 and the $n^+$ diffusing layers 223 and 224, and a gate electrode 226 is formed on the gate insulating film 225 opposing to the semiconductor film 222. Further, an interlayer insulating film 227 is formed in such a manner as to cover the transparent insulating substrate 221, gate insulating film 225 and gate electrode 226.

A source electrode 229 is connected to the $n^+$ diffusing layer 223 through a contact hole 228*a* formed in the interlayer insulating film 227 and the gate insulating film 225. A drain electrode 230 is connected to the other $n^+$ diffusing layer 224 through another contact hole 228*b* formed in the interlayer insulating film 227 and the gate insulating film 225.

Referring back to FIG. 2A, in the liquid crystal display apparatus 1 described above, the TFT 112 of each pixel circuit 111 is formed from a transistor of a semiconductor thin film of amorphous silicon (a-Si) or polycrystalline silicon.

The vertical driving circuit 120 receives a vertical start signal VST, a vertical clock VCK and an enable signal ENB and scans in a vertical direction, that is, in a direction of a row, for each one-field period to successively select the pixel circuits 111 connected to the gate lines 115-1 to 115-m in a unit of a row.

In particular, if a gate pulse Gp1 is provided from the vertical driving circuit 120 to the gate line 115-1, then the pixels in the columns in the first row are selected, but when another scanning pulse Gp2 is provided to the gate line 115-2, then the pixels in the columns in the second row are selected. Thereafter, gate pulses GP3, . . . , Gpm are successive provided to the gate lines 115-3, . . . , 115-m, respectively.

FIG. 2B illustrates an example of a waveform at the output stage of the gate pulse Gpm at the gate buffer 140-m to the gate line 115-m after gate buffering of the same.

FIG. 2C illustrates an example of a waveform of the gate pulse Gpm at a line terminal portion of the gate line 115-m.

The horizontal driving circuit 130 receives a horizontal start pulse Hst produced from a clock generator not shown and indicating starting of horizontal scanning and horizontal clocks HCK of the opposite phases to each other which make a reference for horizontal scanning, and generates a sampling pulse.

The horizontal driving circuit 130 successively samples image data R (red), G (green), and B (blue) inputted thereto in response to the sampling pulse generated thereby and supplies the sampled image data as data signals to be written into the pixel circuits 21 to the signal lines 116-1 to 116-n.

The horizontal driving circuit 130 divides the signal lines 116-1 to 116-n into a plurality of groups and includes signal drivers 131 to 134 corresponding to the individual groups.

Here, the waveform shaping circuits are described.

In the present embodiment, the waveform shaping circuits 150-11 to 150-1m and 150-21 to 150-2m which carry out waveform shaping and voltage change of gate pulses from the gate buffers 140-1 to 140-m are disposed intermediately on the gate lines 115-1 to 115-m as described hereinabove.

Consequently, as seen from a waveform indicated by a solid line in FIG. 2C, the waveform of the gate pulse at the remote end portion or terminal end portion remote from the output stage of the gate buffers 140-1 to 140-m of the gate lines 115-1 to 115-m is improved from distortion thereof. It is to be noted that a waveform indicated by a broken line in FIG. 2C exhibits distortion of the waveform of the gate pulse at the remote end portion or terminal end portion where no waveform shaping circuit is interposed.

Consequently, the display apparatus facilitates display by a great number of pixels and a high frame frequency.

The waveform shaping circuits 150-11 to 150-1m and 150-21 to 150-2m are disposed intermediately on the wires of the gate lines 115-1 to 115-m for waveform shaping, respectively.

Further, the waveform shaping circuits 150-11 to 150-1m and 150-21 to 150-2m are connected commonly to a supply line 160 for a power supply voltage VDD2 which is a HIGH potential and a supply line 161 for another power supply voltage VSS2 which is a LOW potential.

Figure 5A:
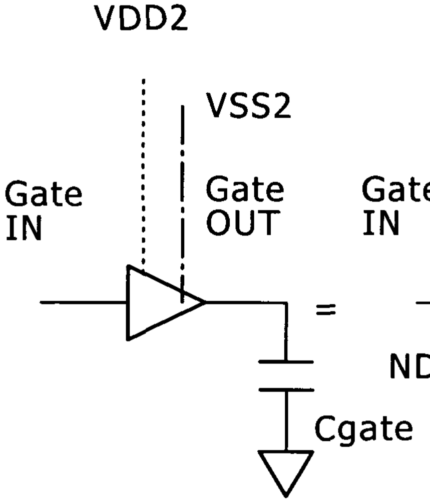
FIGS. 5A, 5B, and 5C are circuit diagrams showing an example of a waveform shaping circuit in the liquid crystal display apparatus of FIG. 2A where it is formed from a CMOS buffer.
Figure 5B:
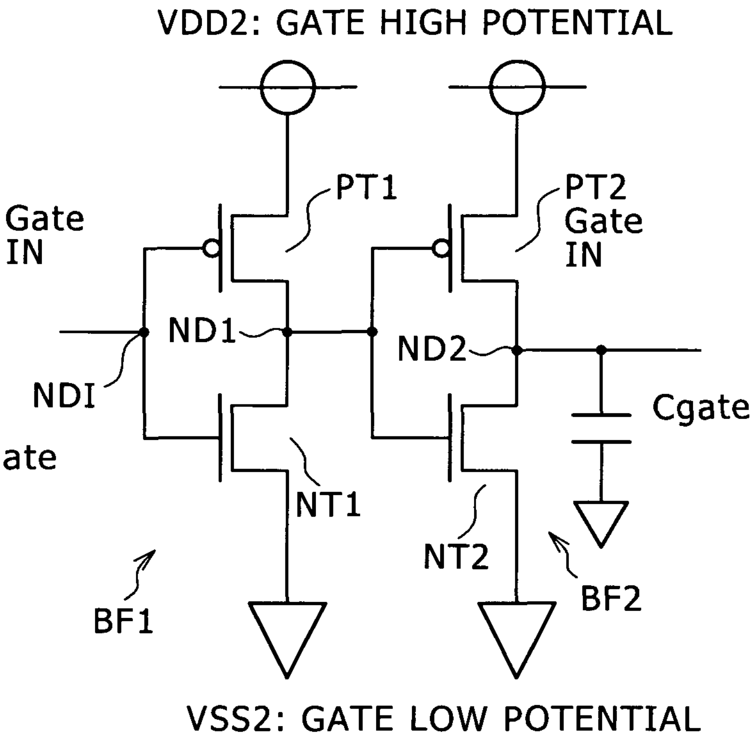
Figure 5C:
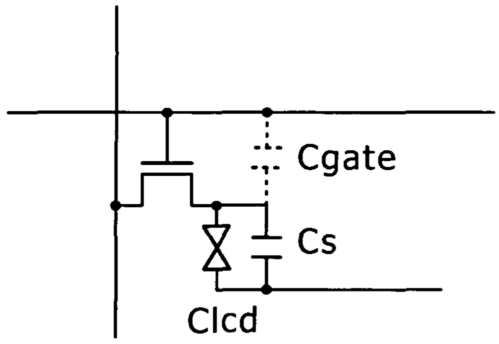

The waveform shaping circuits 150-11 to 150-1m and 150-21 to 150-2m are each formed, for example, from a circuit including two CMOS buffers connected in a cascade connection as seen in FIGS. 5A to 5C.

In the present first embodiment, the waveform shaping circuits 150-11 to 150-1m and 150-21 to 150-2m are disposed at the same coordinates in the vertical direction, that is, in the extending direction of a signal line, in coordinate arrangement of the matrix of the pixel circuits 111.

More particularly, the waveform shaping circuits 150-11 to 150-1m are disposed at intersecting positions of the signal line 116-6 and the gate lines 115-1 to 115-m, respectively. The waveform shaping circuits 150-21 to 150-2m are disposed at intersecting positions between the signal line 116-10 and the gate lines 115-1 to 115-m, respectively.

It is to be noted that, in FIG. 2A, the supply line 160 for the power supply voltage VDD2 of the HIGH potential and the supply line 161 for the power supply voltage VSS2 of the LOW potential are indicated by a broken line and an alternate long and short dash line, respectively, so as to facilitate distinction from and understandings of the gate lines and the signal lines.

FIGS. 5A to 5C illustrate an example wherein the waveform shaping circuit according to the present embodiment is formed from a CMOS buffer. In particular, FIG. 5A shows an equivalent circuit and FIG. 5B shows a particular circuit while FIG. 5C illustrates capacitance on the output side of the buffer.

As seen in FIG. 5B, each of the waveform shaping circuits 150 includes a CMOS buffer or inverter BF1 and another CMOS buffer or inverter BF2 connected in a cascade connection.

The CMOS buffer BF1 includes a p-channel MOS (PMOS) transistor PT1 and an n-channel MOS (NMOS) transistor NT1.

The PMOS transistor PT1 is connected at the source thereof to the supply line 160 for the power supply voltage VDD2 of the HIGH potential and at the drain thereof to the drain of the NMOS transistor NT1. A node ND1 is formed from a connecting point of the drains of the PMOS transistor PT1 and the NMOS transistor NT1. The NMOS transistor NT1 is connected at the source thereof to the supply line 161 for the power supply voltage VSS2 of the LOW potential.

The gates of the PMOS transistor PT1 and the NMOS transistor NT1 are connected to each other, and the input node ND1 is formed at a connecting point of the gates.

The input node ND1 is connected to a corresponding one of the gate lines 115 (115-1 to 115-m).

The CMOS buffer BF2 includes a PMOS transistor PT2 and an NMOS transistor NT2.

The PMOS transistor PT2 is connected at the source thereof to the supply line 160 for the power supply voltage VDD2 of the HIGH potential and at the drain thereof to the drain of the NMOS transistor NT2. A node ND2 is formed from a connecting point of the drains of the PMOS transistor PT2 and the NMOS transistor NT2. The NMOS transistor NT2 is connected at the source thereof to the supply line 161 for the power supply voltage VSS2 of the LOW potential.

The gates of the PMOS transistor PT2 and the NMOS transistor NT2 are connected to each other, and a connecting point of the gates is connected to the node ND1 of the CMOS buffer BF1. The node ND2 is connected as an output node to a corresponding one of the gate lines 115 (115-1 to 115-m).

The waveform shaping circuit 150 having such a configuration as described above outputs a gate pulse GP1 to GPm propagated along a corresponding gate line 115 (115-1 to 115-m) from the arrangement side of the vertical driving circuit 120, that is, from the output side on the left side in FIG. 2 in positive logic and besides carries out waveform shaping.

The outputs of the CMOS buffers BF1 and BF2 for waveform shaping signify capacitance Cgate of the gate line and further signifies capacitance including liquid crystal capacitance Clcd in a state wherein the pixel electrode or the TFT (pixel transistor) is in an on state and storage capacitance Cs of the pixels.

Further, since one stage of a CMOS buffer exhibits a negative logic output with respect to an input thereof, in order for the waveform shaping circuit 150 to output a positive logic output, the waveform shaping circuit 150 is formed from a series connection circuit of the CMOS buffers BF1 and BF2.

Since the waveform shaping circuit 150 requires an output power supply, the supply lines 160 and 161 for supplying the power supply voltage VDD2 of the high side and the power supply voltage VSS2 of the low side for turning the pixel gate on and off are disposed.

The wiring lines for the supply lines 160 and 161 are disposed in parallel to the pixel signal lines.

The reason is that, where the supply lines 160 and 161 are wired in parallel to each other in the proximity of the signal line 116 (116-1 to 116-n), for example, drop of the aperture ratio of liquid crystal can be minimized. Further, where bus lines which exhibit lower resistance to the supply lines 160 and 161 for the voltages VDD2 and VSS2 are connected above the effective pixel region section 110, the voltage drop of the power supply lines in the horizontal direction can be minimized.

As a result, also the variation of a voltage (high voltage) corresponding to the high level and another voltage (low voltage) corresponding to the low level outputted from the waveform shaping circuit 150 in the horizontal direction of effective pixels can be minimized.

Further, in the present first embodiment, the supply lines 160 and 161 for the voltages VDD2 and VSS2 to be supplied to the waveform shaping circuits 150 and the waveform shaping circuits 150 are preferably disposed on the same coordinates in the horizontal direction.

The reason is that, since the coordinates of the waveform shaping circuits 150 in the horizontal direction are fixed, the gate pulse waveform does not suffer from delay.

As described above, according to the present first embodiment, the waveform shaping circuits 150-11 to 150-1m and 150-21 to 150-2m which carry out waveform shaping and voltage change intermediately on wires of the gate lines for a gate pulse outputted from the vertical driving circuit 120 are disposed.

Accordingly, with the present first embodiment, the following effects can be achieved.

In a display apparatus which includes a great number of pixels of 4K×2K and uses a high frame frequency of 240 Hz, occurrence of shading in a leftward and rightward direction by delay by a gate line or of chromaticity difference in a leftward and rightward direction is eliminated, and good picture quality can be obtained.

Further, occurrence of output delay and distortion in waveform of the gate pulse GP from the vertical driving circuit 120 can be suppressed, and the occupation area of the vertical driving circuit and buffer circuits located on the left side or the right wide of a picture frame of the active matrix display apparatus can be reduced. Therefore, the picture frame of the display apparatus can be formed with a reduced width on the left and right portions thereof.

Further, the supply lines 160 and 161 for the voltages VDD2 and VSS2 to be supplied to the waveform shaping circuits 150 and the waveform shaping circuits 150 are disposed on the same coordinates in the horizontal direction, delay of the gate pulse waveform can be suppressed.

<Second Embodiment>

Figures 6A, 6B, 6C:
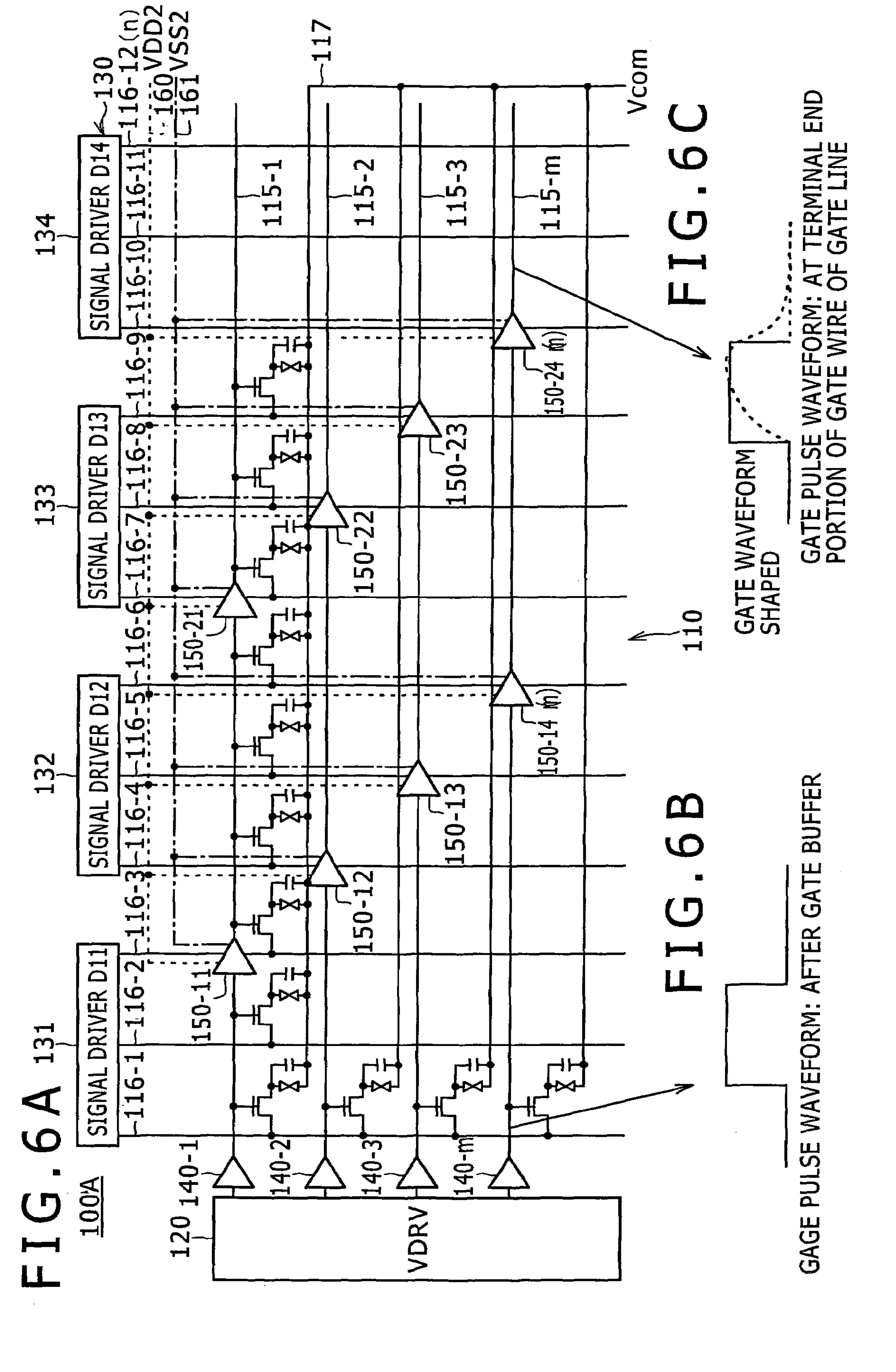
FIGS. 6A, 6B, and 6C are views showing an example of a configuration of a liquid crystal display apparatus according to a second embodiment of the present invention and gate pulse waveforms.

FIGS. 6A, 6B, and 6C show an example of a configuration of a liquid crystal display apparatus according to a second embodiment of the present invention and examples of a gate pulse waveform, respectively.

Referring first to FIG. 6A, the liquid crystal display apparatus 100A according to the present second embodiment is similar in configuration to but different in the arrangement position of the waveform shaping circuits 150 from the liquid crystal apparatus 100 according to the first embodiment described above.

In particular, in the liquid crystal apparatus 100 of the first embodiment described above, the supply lines 160 and 161 for the voltages VDD2 and VSS2 to be supplied to the waveform shaping circuits 150 and the waveform shaping circuits 150 are disposed on the same coordinates in the horizontal direction.

In contrast, in the liquid crystal display apparatus 100A of the present second embodiment, the supply lines 160 and 161 for the voltages VDD2 and VSS2 to be supplied to the waveform shaping circuits 150 and the waveform shaping circuits 150 are not disposed at the same coordinates in the horizontal direction but are disposed in a displaced relationship by one column distance from each other in a corresponding relationship to the wires of the gate lines and the signal lines.

In the example of FIG. 6A, the waveform shaping circuit 150-11 is disposed in the proximity of an intersecting position of the signal line 116-3 and the gate line 115-1. The waveform shaping circuit 150-12 is disposed in the proximity of an intersecting position of the signal line 116-4 and the gate line 115-2. The waveform shaping circuit 150-13 is disposed in the proximity of an intersecting position of the signal line 116-5 and the gate line 115-3. The waveform shaping circuit 150-14(*m*) is disposed in the proximity of an intersecting position of the signal line 116-6 and the gate line 115-m.

Meanwhile, the waveform shaping circuit 150-21 is disposed in the proximity of an intersecting position of the signal line 116-7 and the gate line 115-1. The waveform shaping circuit 150-22 is disposed in the proximity of an intersecting position of the signal line 116-8 and the gate line 115-2. The waveform shaping circuit 150-23 is disposed in the proximity of an intersecting position of the signal line 116-9 and the gate line 115-3. The waveform shaping circuit 150-24(*m*) is disposed in the proximity of an intersecting position of the signal line 116-10 and the gate line 115-(m.

In this instance, in such a case that the coordinates of the waveform shaping circuits 150 in the horizontal direction are not fixed, local one-sidedness is eliminated from the supply lines 160 and 161 for the power supply voltage VDD2 and the reference voltage VSS2. Therefore, the uniformity in transmission factor of pixels under the influence of the wiring layout of the supply lines 160 and 161 for the voltages VDD2 and VSS2 is assured.

In this instance, the luminance distribution of the display apparatus is fixed.

The configuration of the other part of the present second embodiment is similar to that of the first embodiment, and effects similar to those achieved by the first embodiment described above can be achieved.

<Third Embodiment>

Figures 7A, 7B, 7C:
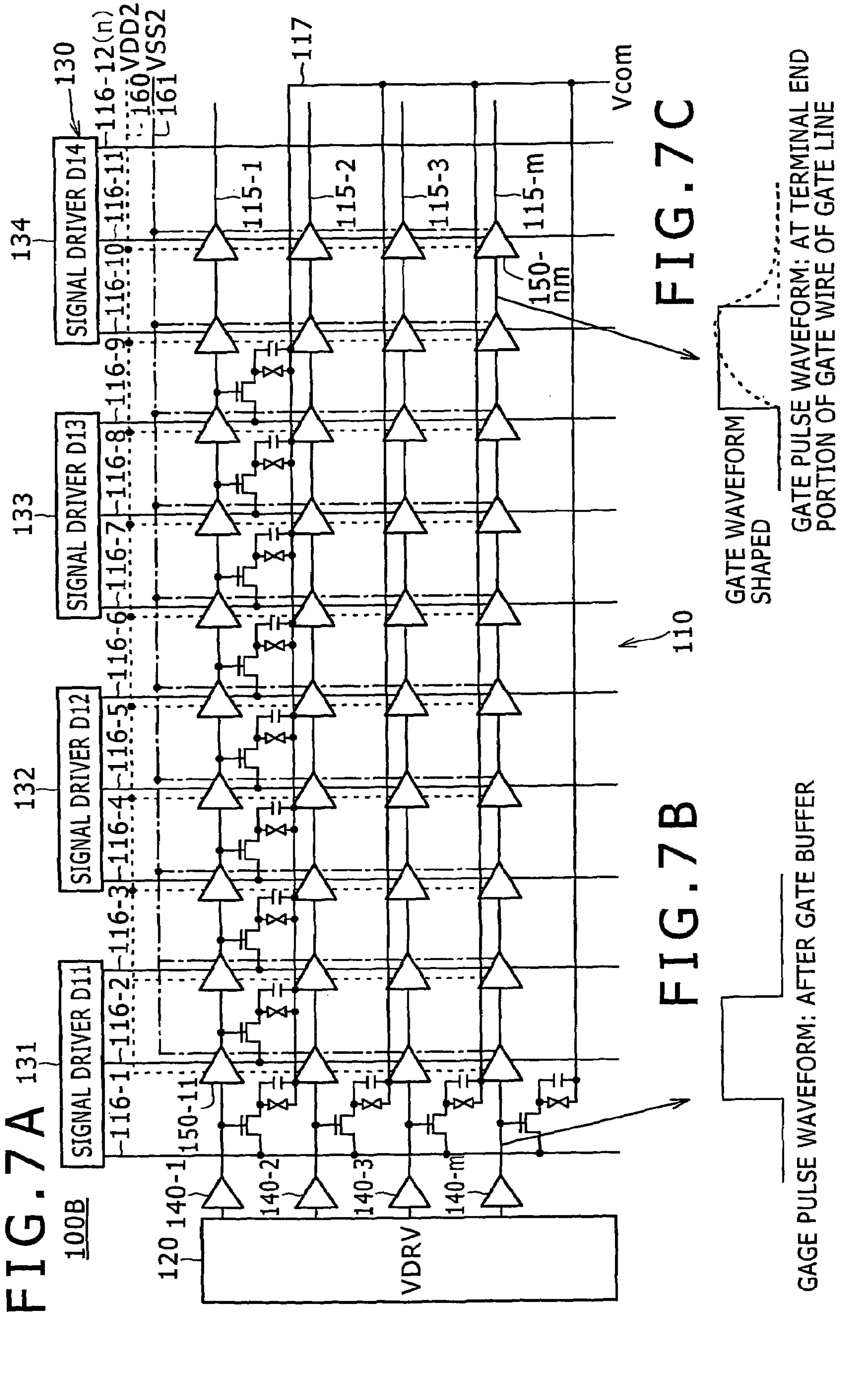
FIGS. 7A, 7B, and 7C are a circuit diagram and waveform diagrams showing an example of a configuration of a liquid crystal display apparatus according to a third embodiment of the present invention and examples of a gate pulse waveform, respectively.

FIGS. 7A, 7B, and 7C show an example of a configuration of a liquid crystal display apparatus according to a third embodiment of the present invention and examples of a gate pulse waveform, respectively.

Referring first to FIG. 7A, the liquid crystal display apparatus 100B according to the present third embodiment is similar in configuration to but different in the arrangement position of the waveform shaping circuits 150 from the liquid crystal display apparatus 100 and 100A according to the first and second embodiments described above.

In particular, in the liquid crystal display apparatus 100 and 100A according to the first and second embodiments, the supply lines 160 and 161 for the voltages VDD2 and VSS2 to be supplied to the waveform shaping circuits 150 and the waveform shaping circuits 150 are disposed at the same coordinates in the horizontal direction.

Or conversely, the supply lines 160 and 161 for the voltages VDD2 and VSS2 to be supplied to the waveform shaping circuits 150 and the waveform shaping circuits 150 are not disposed at the same coordinates.

In contrast, in the liquid crystal display apparatus 100B according to the present third embodiment, the waveform shaping circuits 150-11 to 150-nm are disposed on the gate lines in the proximity of almost all intersecting positions of the gate lines and the signal lines, or in other words, at inputting portions of the pixel circuits 111 for a gate pulse.

Where the waveform shaping circuit 150 is disposed for each pixel circuit 111 on the wires of the gate lines in this manner, it is possible to allow a plurality of pixel circuits 111 to exist between different waveform shaping circuits so that no dispersion in delay of the waveform of a gate pulse may occur therein.

In other words, where a plurality of pixel circuits exist between a waveform shaping circuit and another waveform shaping circuit, the ununiformity in parasitic capacitance is eliminated, and uniform load capacitance of the pixel gates of the waveform shaping circuits is assured. Therefore, no delay occurs with the gate electrodes any more.

The configuration of the other part of the present third embodiment is similar to that of the first and second embodiments, and effects similar to those achieved by the first and second embodiments described above can be achieved.

<Fourth Embodiment>

Figure 8:
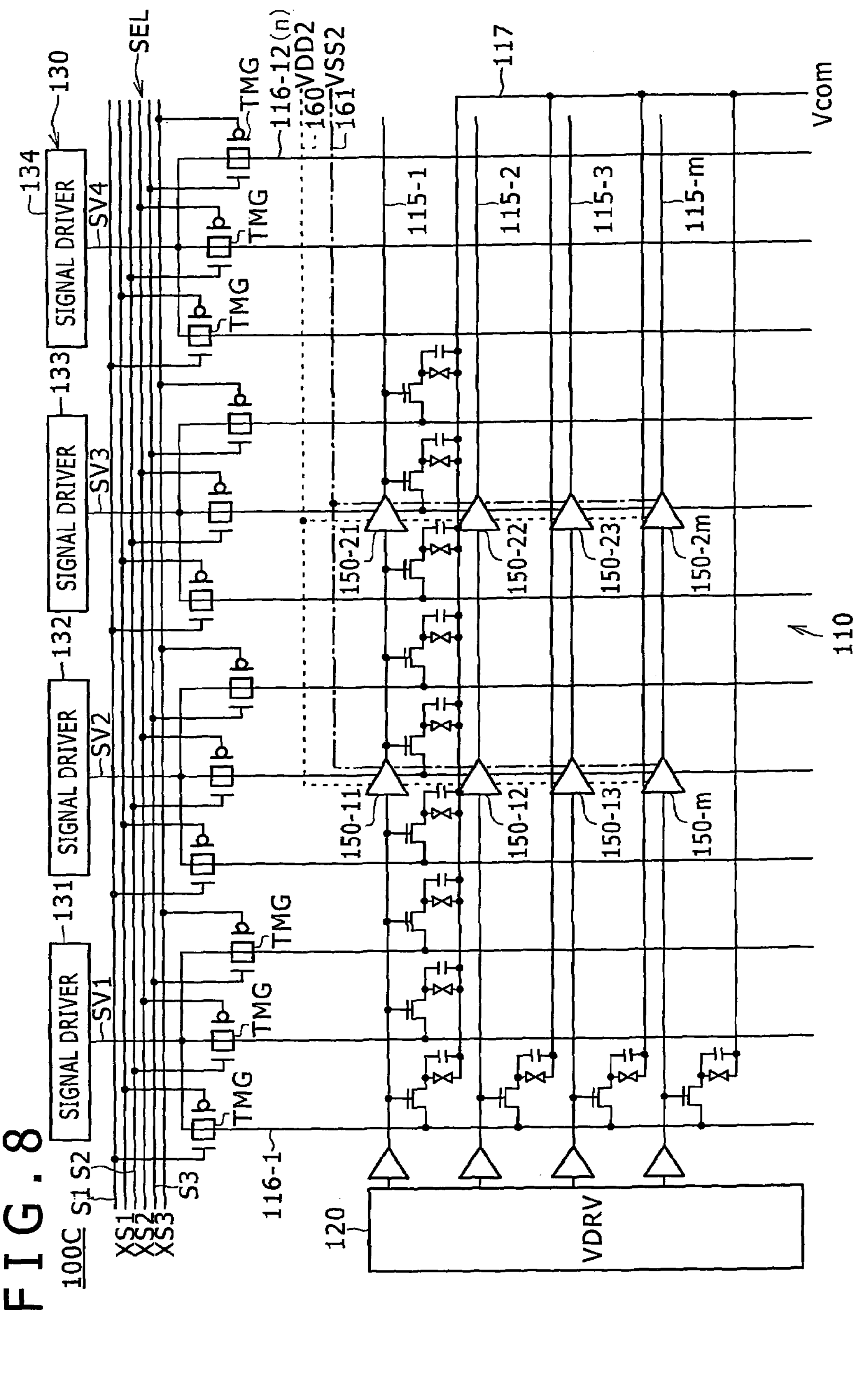
FIG. 8 is a circuit diagram showing an example of a configuration of a liquid crystal display apparatus according to a fourth embodiment of the present invention.

FIG. 8 shows an example of a configuration of a liquid crystal display apparatus according to a fourth embodiment of the present invention.

Referring to FIG. 8, the liquid crystal display apparatus 100C according to the present fourth embodiment is similar in configuration to but different from the liquid crystal apparatus 100 according to the first embodiment described above in that it adopts a configuration which is effective also in a system wherein image data are written time-divisionally into a panel.

Particularly, also where a time-dividing switch is utilized as seen in FIG. 8 in order to reduce the picture frame of the panel, application of the present invention is required where the time division number of the time dividing switch does not sufficiently satisfy an electric characteristic and an image characteristic within a horizontal selection period.

Signals SV1 to SV4 from the signal drivers 131 to 134 are transferred to signal lines 116 (116-1 to 116-12) through a selector SEL having a plurality of transfer gates TMG.

The conduction state of the transfer gates (analog switches) TMG is controlled by a selection signal S1 and an inverted signal XS1 of the same, another selection signal S2 and an inverted signal XS2 of the same, a further selection signal S3 and an inverted signal XS3 of the same, . . . which are supplied from the outside and have complementary levels to each other.

Where such a configuration as described above is adopted, it is possible for an active matrix display apparatus of the high-definition (UXGA) and high-speed frame rate type to adopt a selector time divisional driving system which decreases the number of connection terminals and improve the mechanical reliance of connections.

The configuration of the other part of the present fourth embodiment is similar to that of the first embodiment, and effects similar to those achieved by the first embodiment described above can be achieved.

<Fifth Embodiment>

Figure 9:
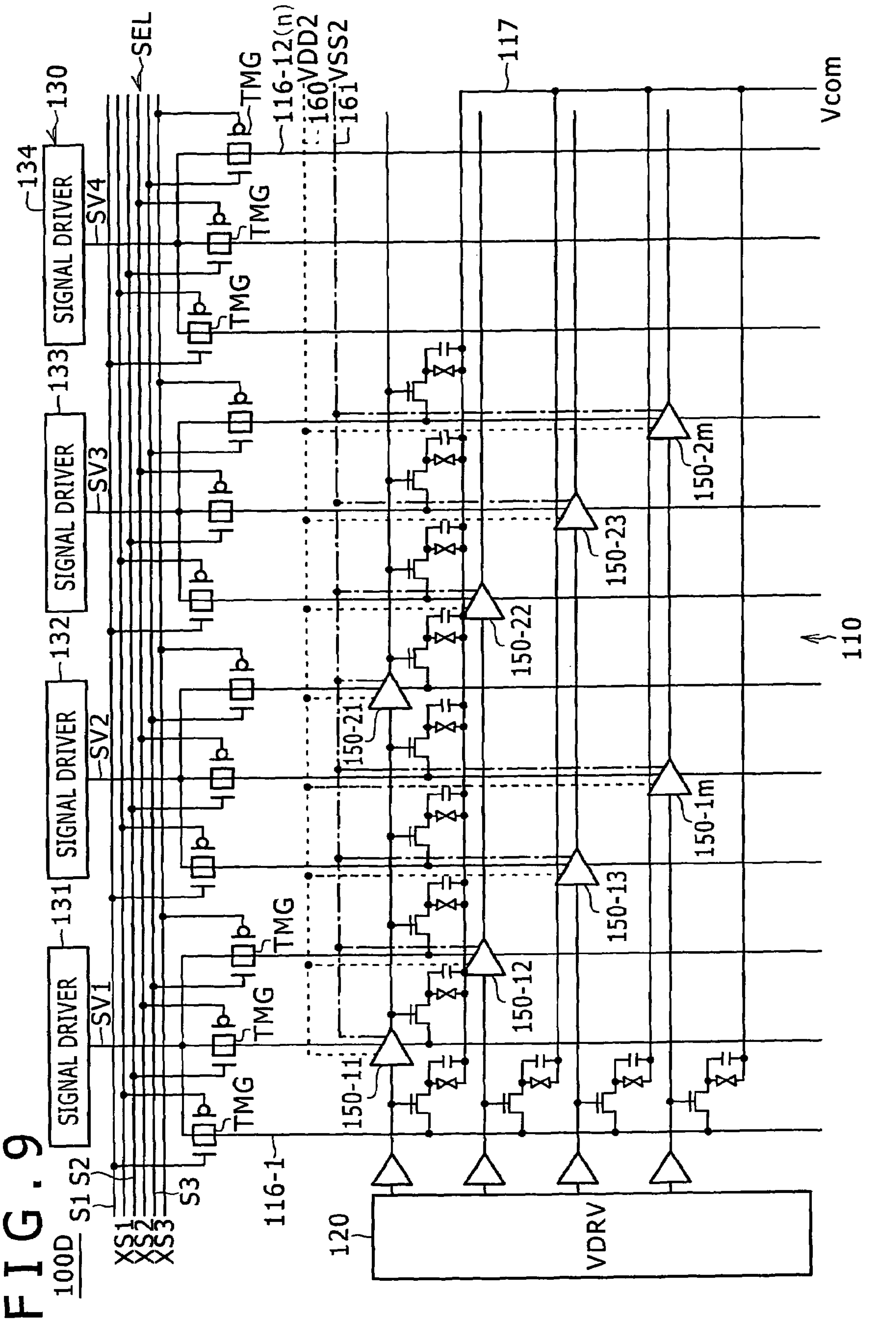
FIGS. 9, 10, and 11 are circuit diagrams showing an example of a configuration of liquid crystal display apparatus according to fifth, sixth, and seventh embodiments of the present invention, respectively.

FIG. 9 shows an example of a configuration of a liquid crystal display apparatus according to a fifth embodiment of the present invention.

Referring to FIG. 9, the liquid crystal display apparatus 100D according to the present fifth embodiment is similar in configuration to but different from the liquid crystal display apparatus 100A according to the second embodiment described above in that it adopts a configuration which is effective also in a system wherein image data are written time-divisionally into a panel.

Particularly, also where a time dividing switch is utilized as seen in FIG. 9 in order to reduce the picture frame of the panel, application of the present invention is required where the time division number of the time dividing switch does not sufficiently satisfy an electric characteristic and an image characteristic within a horizontal selection period.

Referring to FIG. 9, the signals SV1 to SV4 from the signal drivers 131 to 134 are transferred to the signal lines 116 (116-1 to 116-12) through a selector SEL having a plurality of transfer gates TMG.

The conduction state of the transfer gates (analog switches) TMG is controlled by a selection signal S1 and an inverted signal XS1 of the same, another selection signal S2 and an inverted signal XS2 of the same, a further selection signal S3 and an inverted signal XS3 of the same, . . . which are supplied from the outside and have complementary levels to each other.

Where such a configuration as described above is adopted, it is possible for an active matrix display apparatus of the high-definition (UXGA) and high-speed frame rate type to adopt a selector time divisional driving system which decreases the number of connection terminals and improve the mechanical reliance of connections.

The configuration of the other part of the present fifth embodiment is similar to that of the second embodiment, and effects similar to those achieved by the first and second embodiments described above can be achieved.

<Sixth Embodiment>

Figure 10:
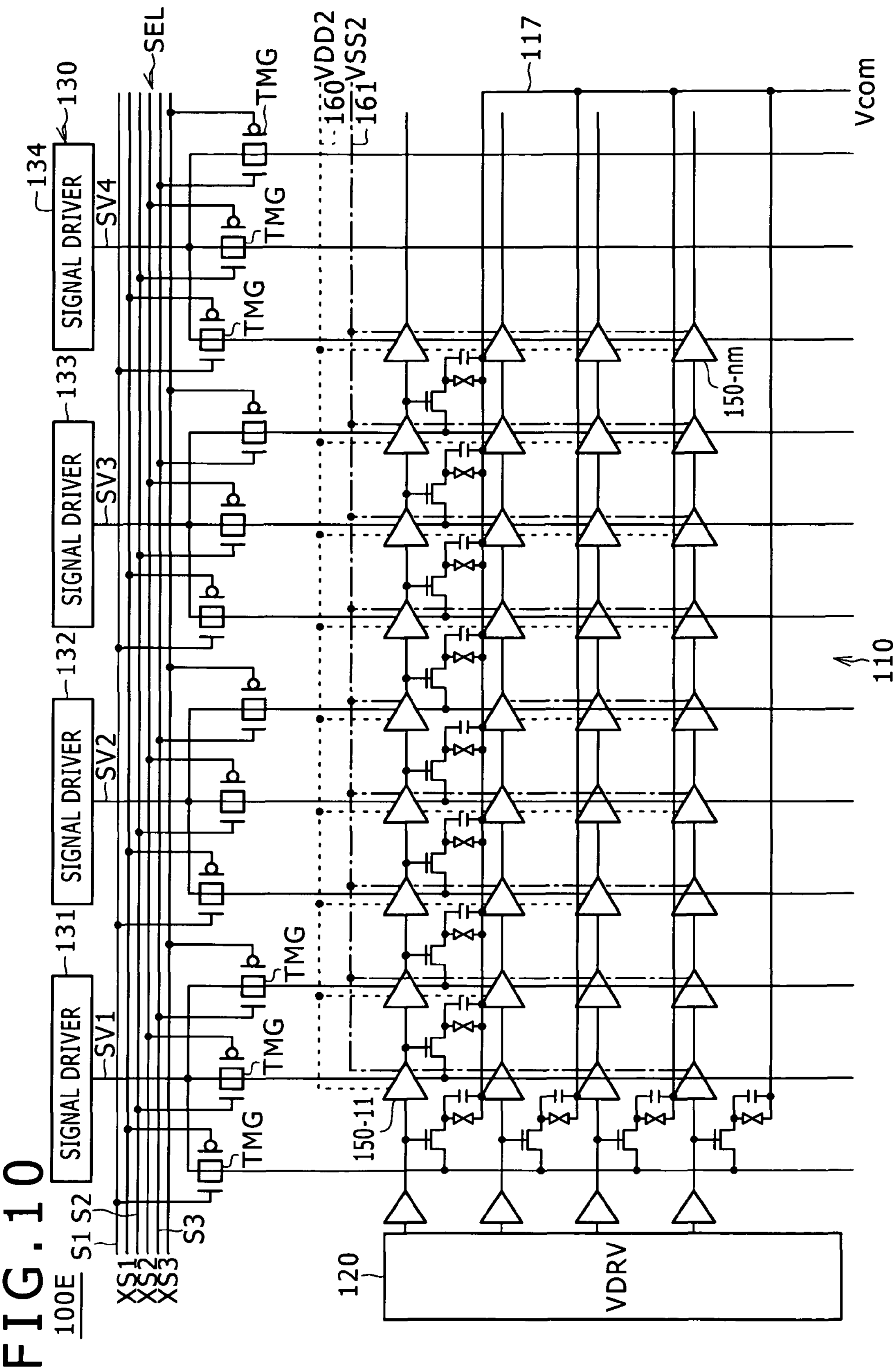

FIG. 10 shows an example of a configuration of a liquid crystal display apparatus according to a sixth embodiment of the present invention.

Referring to FIG. 10, the liquid crystal display apparatus 100E according to the present sixth embodiment is similar in configuration to but different from the liquid crystal display apparatus 100B according to the third embodiment described above in that it adopts a configuration which is effective also in a system wherein image data are written time-divisionally into a panel.

Particularly, also where a time dividing switch is utilized as seen in FIG. 10 in order to reduce the picture frame of the panel, application of the embodiment of the present invention is required where the time division number of the time dividing switch does not sufficiently satisfy an electric characteristic and an image characteristic within a horizontal selection period.

Referring to FIG. 10, the signals SV1 to SV4 from the signal drivers 131 to 134 are transferred to the signal lines 116 (116-1 to 116-12) through the selector SEL having the plural transfer gates TMG.

The conduction state of the transfer gates (analog switches) TMG is controlled by the selection signal S1 and the inverted signal XS1 of the same, the selection signal S2 and the inverted signal XS2 of the same, the selection signal S3 and the inverted signal XS3 of the same, . . . which are supplied from the outside and have complementary levels to each other.

Where such a configuration as described above is adopted, it is possible for an active matrix display apparatus of the high-definition (UXGA) and high-speed frame rate type to adopt a selector time divisional driving system which decreases the number of connection terminals and improve the mechanical reliance of connections.

The configuration of the other part of the present sixth embodiment is similar to that of the third embodiment, and effects similar to those achieved by the first to third embodiments described above can be achieved.

<Seventh Embodiment>

Figure 11:
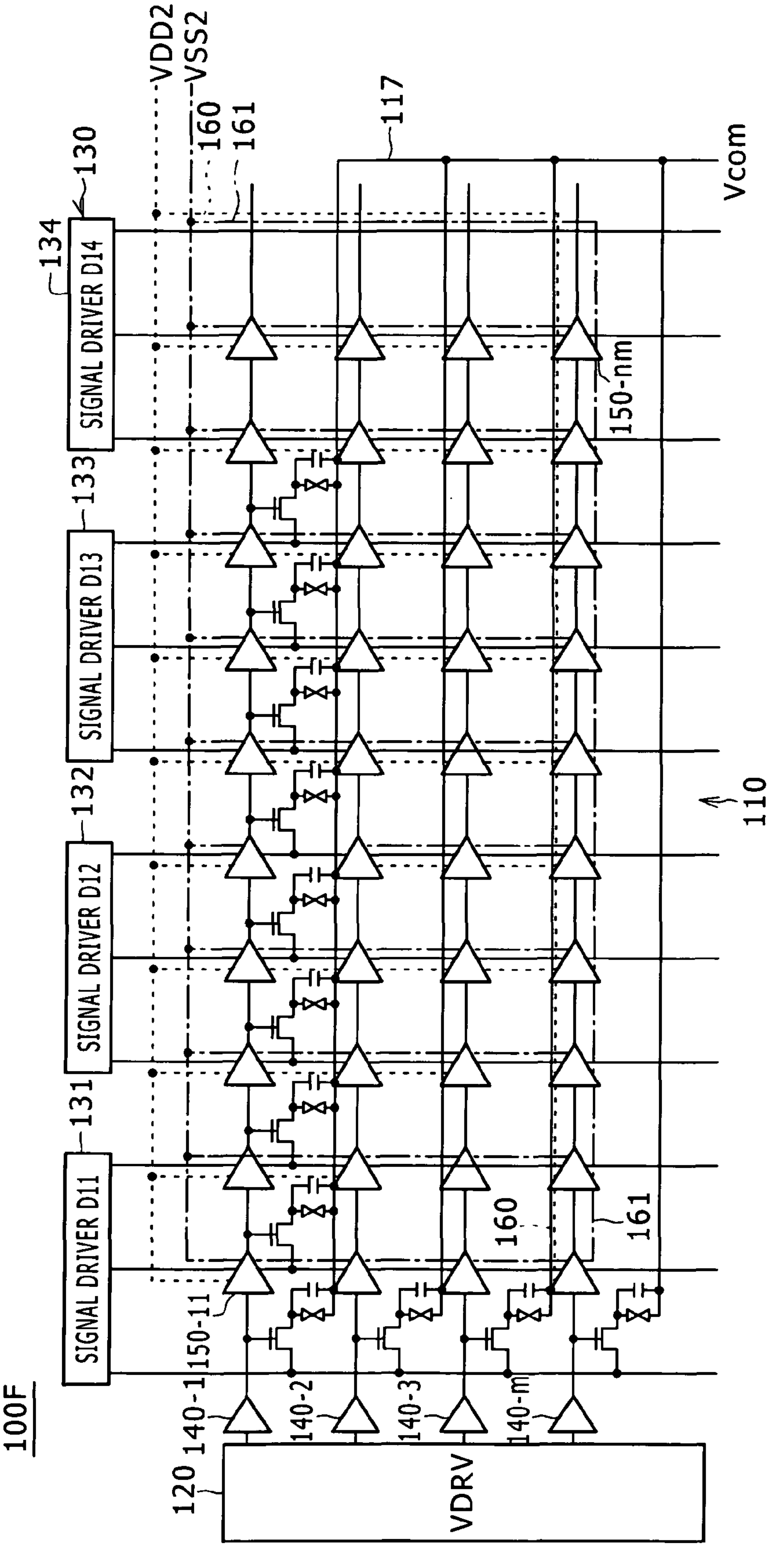

FIG. 11 shows an example of a configuration of a liquid crystal display apparatus according to a seventh embodiment of the present invention.

Referring to FIG. 11, the liquid crystal display apparatus 100F according to the present seventh embodiment is similar in configuration to but different from the liquid crystal display apparatus 100B according to the third embodiment described above in the following point.

In particular, in the liquid crystal display apparatus 100F, the supply line 160 for the power supply voltage VDD2 and the supply line 161 for the power supply voltage VSS2 are wired also between all of the signal lines 116 (116-1 to 116-m) and all of the gate lines 115 (115-1 to 115-m).

Where the configuration described above is adopted, invasion of an undesirable voltage into an adjacent pixel circuit 111, which occurs between a gate line and a signal line, can be prevented. Consequently, good picture quality can be obtained.

The configuration of the other part of the present seventh embodiment is similar to that of the third embodiment, and effects similar to those achieved by the first to third embodiments described above can be achieved.

It is to be noted that, although a wiring scheme of the voltage supply lines in the seventh embodiment is not shown in FIG. 11, the configuration of the seventh embodiment can be applied also to the other first, second and fourth to sixth embodiments. Also in this instance, invasion of an undesirable voltage into an adjacent pixel circuit 111 can be prevented, and an effect that obtaining good picture quality can be achieved.

<Eighth Embodiment>

Figures 12A, 12B, 12C:
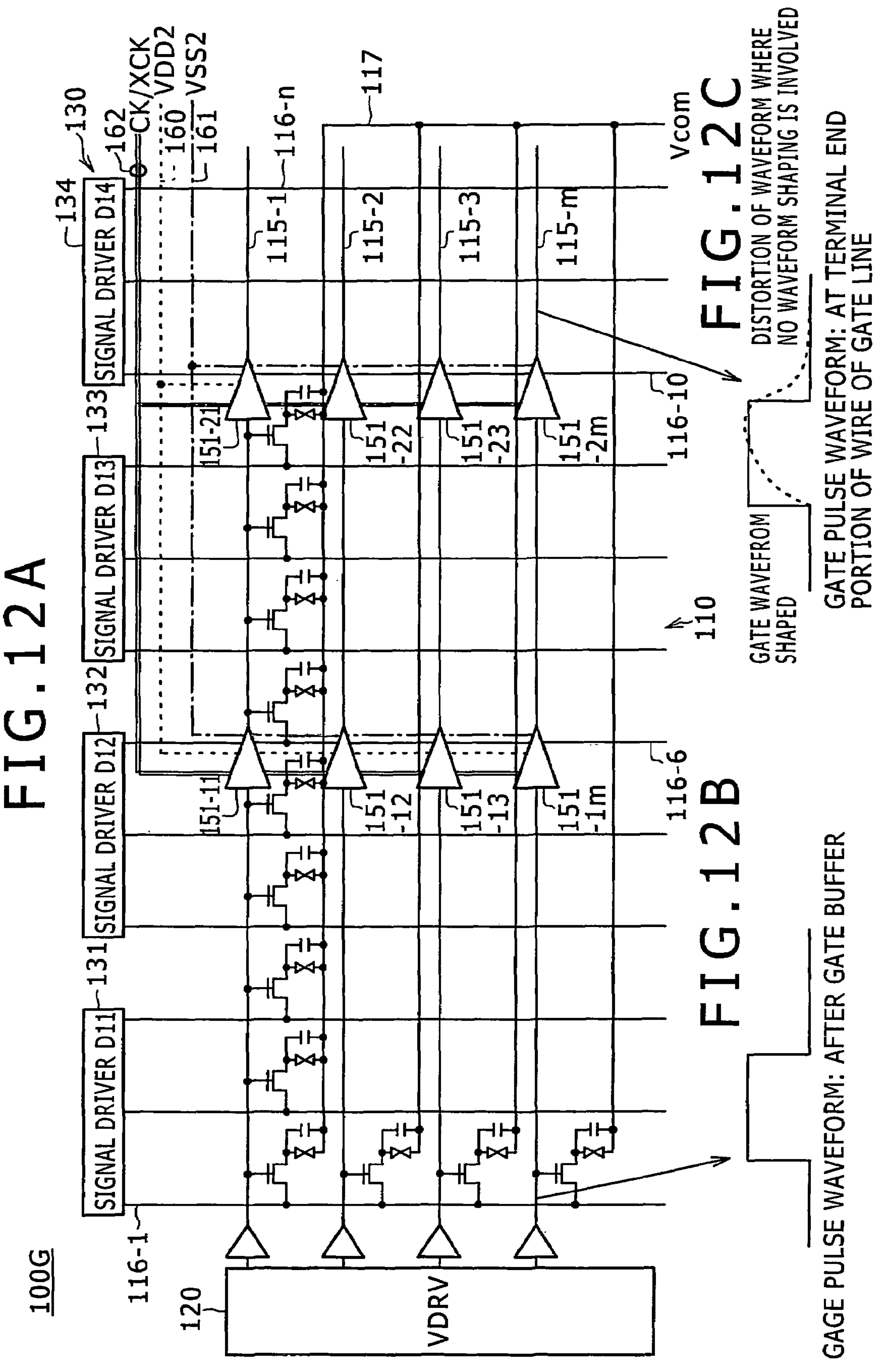
FIGS. 12A, 12B, and 12C are a circuit diagram and waveform diagrams showing an example of a configuration of a liquid crystal display apparatus according to an eighth embodiment of the present invention and examples of a gate pulse waveform, respectively.

FIGS. 12A, 12B, and 12C show an example of a configuration of a liquid crystal display apparatus according to an eighth embodiment of the present invention and examples of a gate pulse waveform, respectively.

Referring first to FIG. 12A, the liquid crystal display apparatus 100G according to the present eighth embodiment is similar in configuration to but different from the liquid crystal apparatus 100 according to the first embodiment described hereinabove in that the waveform shaping circuits are configured not from CMOS buffers connected simply in a cascade connection but using a clocked CMOS circuit.

Here, a waveform shaping circuit 151 is described.

Also in the present eighth embodiment, the waveform shaping circuits 151-11 to 151-1m and 151-21 to 151-2m, which carry out waveform shaping and voltage change of gate pulses from the gate buffers 140-1 to 140-m, are disposed intermediately on the gate lines 115-1 to 115-m as described hereinabove.

Consequently, as seen from a waveform indicated by a solid line in FIG. 12C, the waveform of the gate pulse at the remote end portion or terminal end portion remote from the output stage of the gate buffers 140-1 to 140-m of the gate lines 115-1 to 115-m is improved from distortion thereof. It is to be noted that a waveform indicated by a broken line in FIG. 12C exhibits distortion of the waveform of the gate pulse at the remote end portion or terminal end portion where no waveform shaping circuit is interposed.

Consequently, the display apparatus facilitates display by a great number of pixels and a high frame frequency.

The waveform shaping circuits 151-11 to 151-1m and 151-21 to 151-2m are disposed intermediately on the wires of the gate lines 115-1 to 115-m for waveform shaping, respectively.

Further, the waveform shaping circuits 151-11 to 151-1m and 151-21 to 151-2m are connected commonly to a supply line 160 for a power supply voltage VDD2 which is a HIGH potential and a supply line 161 for another power supply voltage VSS2 which is a LOW potential. The waveform shaping circuits 151-11 to 151-1m and 151-21 to 151-2m are each formed, for example, from a circuit including a clocked CMOS and a CMOS buffer connected in a cascade connection as seen in FIGS. 13A to 13C.

In the present eighth embodiment, the waveform shaping circuits 151-11 to 151-1m and 151-21 to 151-2m are disposed at the same coordinates in the vertical direction.

More particularly, the waveform shaping circuits 151-11 to 151-1m are disposed at intersecting positions of the signal line 116-6 and the gate lines 115-1 to 115-m, respectively. The waveform shaping circuits 151-21 to 151-2m are disposed at intersecting positions between the signal line 116-10 and the gate lines 115-1 to 115-m, respectively.

Figure 13A:
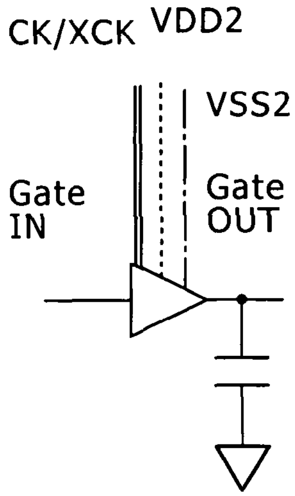
FIGS. 13A, 13B, and 13C are views showing a waveform shaping circuit of the liquid crystal display apparatus of FIG. 12A where it is formed from a clocked CMOS circuit.
Figure 13B:
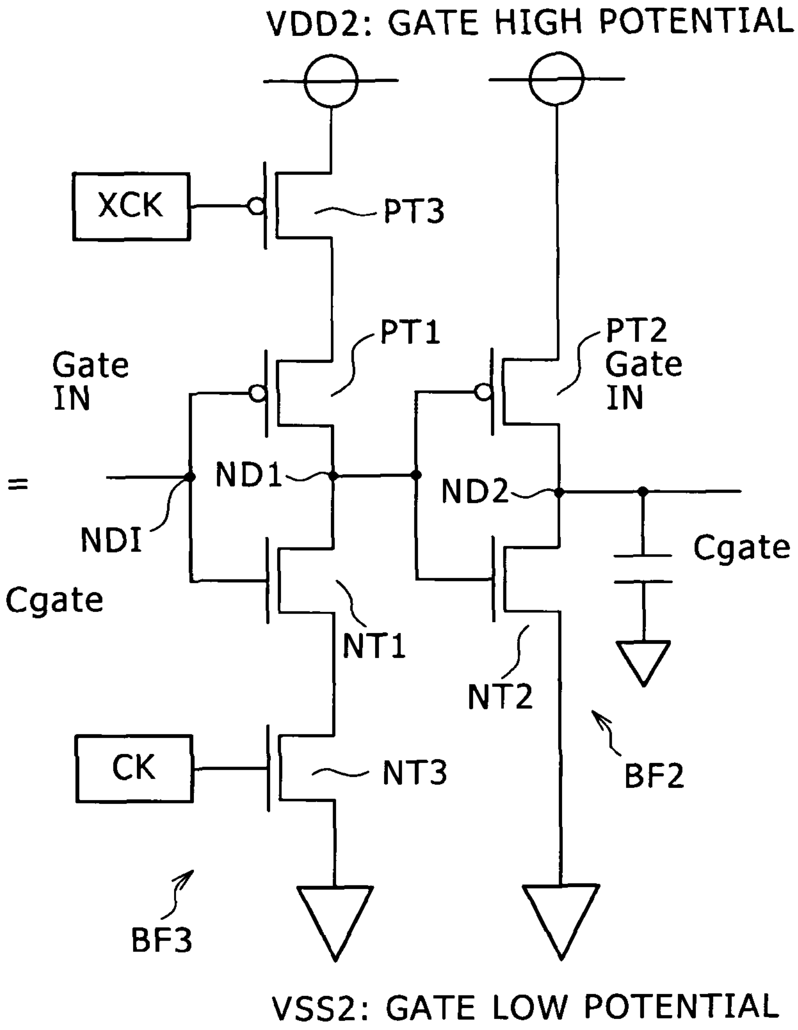
Figure 13C:
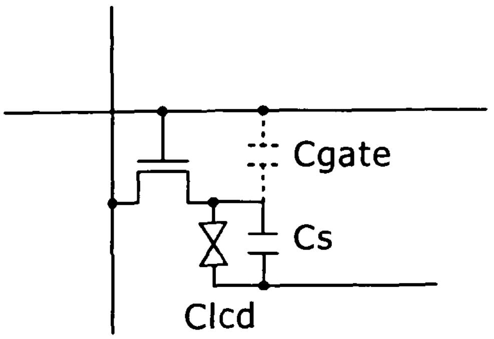

FIGS. 13A to 13C illustrate an example wherein the waveform shaping circuit is formed from a clocked CMOS circuit as the present eighth embodiment.

In particular, FIG. 13A shows an equivalent circuit and FIG. 13B shows a particular circuit, while FIG. 13C illustrates capacitance on the output side of the buffer.

As seen in FIG. 13B, each of the waveform shaping circuits 151 includes a clocked CMOS buffer or inverter BF3 in place of the configuration of the CMOS buffer BF1 of FIG. 5B, and another CMOS buffer or inverter BF2 connected in a cascade connection to the clocked CMOS buffer BF3.

The clocked CMOS buffer BF3 includes, in addition to the configuration of the CMOS buffer BF1 of FIG. 5, a PMOS transistor PT3 and an NMOS transistor NT3.

The PMOS transistor PT3 is connected at the source thereof to the supply line 160 for the power supply voltage VDD2 of the HIGH potential and at the drain thereof to the source of the PMOS transistor PT1.

Meanwhile, the NMOS transistor NT3 is connected at the source thereof to the supply line 161 for the power supply voltage VSS2 of the LOW potential and at the drain thereof to the source of the NMOS transistor NT1.

A clock CK is supplied to the gate of the NMOS transistor NT3, and an inverted or complementary signal XCK of the clock CK is supplied to the gate of the PMOS transistor PT3.

When the clock CK exhibits the high level, the PMOS transistor PT3 and the NMOS transistor NT3 are placed into an on state to render the clocked CMOS circuit operative.

The clocks CK and XCK have a function as an enable signal, which can control starting of operation of the waveform shaping circuit 151.

The configuration of the other part of the waveform shaping circuit 151 is similar to that of the circuits shown in FIGS. 5A to 5C, and therefore, overlapping description of the same is omitted herein to avoid redundancy.

The waveform shaping circuits 151 having such a configuration as described above output the waveform of the gate pulses GP1 to GPm transmitted from the arrangement side, that is, the output side or on the left side in FIG. 13A, of the vertical driving circuit 120 as a positive logic output and further carry out waveform shaping.

The outputs of the clocked CMOS buffer BF3 and the CMOS buffer BF1 for waveform shaping signify the capacitance Cgate of the gate line and signifies capacitance including the liquid crystal capacitance Clcd in a state wherein the pixel electrode or the TFT (pixel transistor) is in an on state and the storage capacitance Cs of the pixel.

Further, since the clocked CMOS buffer BF3 indicates an inverted logic output with respect to an input thereto, the waveform shaping circuit 151 is formed from a circuit wherein the CMOS buffer BF2 is connected to the clocked CMOS buffer BF3 in order to obtain a positive logic output.

Since the waveform shaping circuit 151 requires an output power supply therefor, wires of the supply lines 160 and 161 for supplying the high side power supply voltage VDD2 and the low side power supply voltage VSS2 for turning the pixel gate on and off are laid.

The wires are laid in parallel to the pixel signal wires. The reason is that, where they are laid in parallel to and in the proximity of the signal lines 116 (116-1 to 116-n), drop of the aperture ratio of the liquid crystal can be minimized.

Further, where bus lines which exhibit lower resistance to the supply lines 160 and 161 for the voltages VDD2 and VSS2 are connected above the effective pixel region section 110, the voltage drop of the power supply lines in the horizontal direction can be minimized.

As a result, the variation of the high voltage and the low voltage to be outputted from the waveform shaping circuit 151 in the horizontal direction of the effective pixels can be minimized.

The clocked CMOS buffer BF3 starts its operation at a rising edge or a falling edge of the clock (enable signal) CK or XCK as a control signal when the clock enters the CMOS buffer which forms the waveform shaping circuit 151.

Where supply lines 162 for the clocks CK and XCK are wired in the vertical direction of the display apparatus and are rendered operative, although some delay of the clocks CK and XCK or distortion in waveform in the vertical direction occurs, in the horizontal direction, the clocks CK and XCK have the same history of same parasitic capacitance. Therefore, the delay becomes fixed.

As a result, a signal transferred along a gate line disposed in the horizontal direction exhibits a delayed waveform controlled by the clocks. This gives rise to generation of a selection signal without the necessity for a gate selection waveform, which is vertically scanned at a high speed, paying attention to the horizontal direction.

Further, also in the present eighth embodiment, the supply lines 160 and 161 for the voltages VDD2 and VSS2 to be supplied to the waveform shaping circuits 151-11 to 151-1m and the waveform shaping circuits 151-21 to 151-2m are preferably disposed on the same coordinates in the horizontal direction similarly as in the first embodiment.

The reason is that, since the coordinates of the waveform shaping circuits 151 in the horizontal direction are fixed, the gate pulse waveform does not suffer from delay.

The configuration of the other part of the present eighth embodiment is similar to that of the first embodiment, and also effects similar to those achieved by the first embodiment described above can be achieved. Besides, the delay can be maintained fixed with a higher degree of accuracy.

<Ninth Embodiment>

Figures 14A, 14B, 14C:
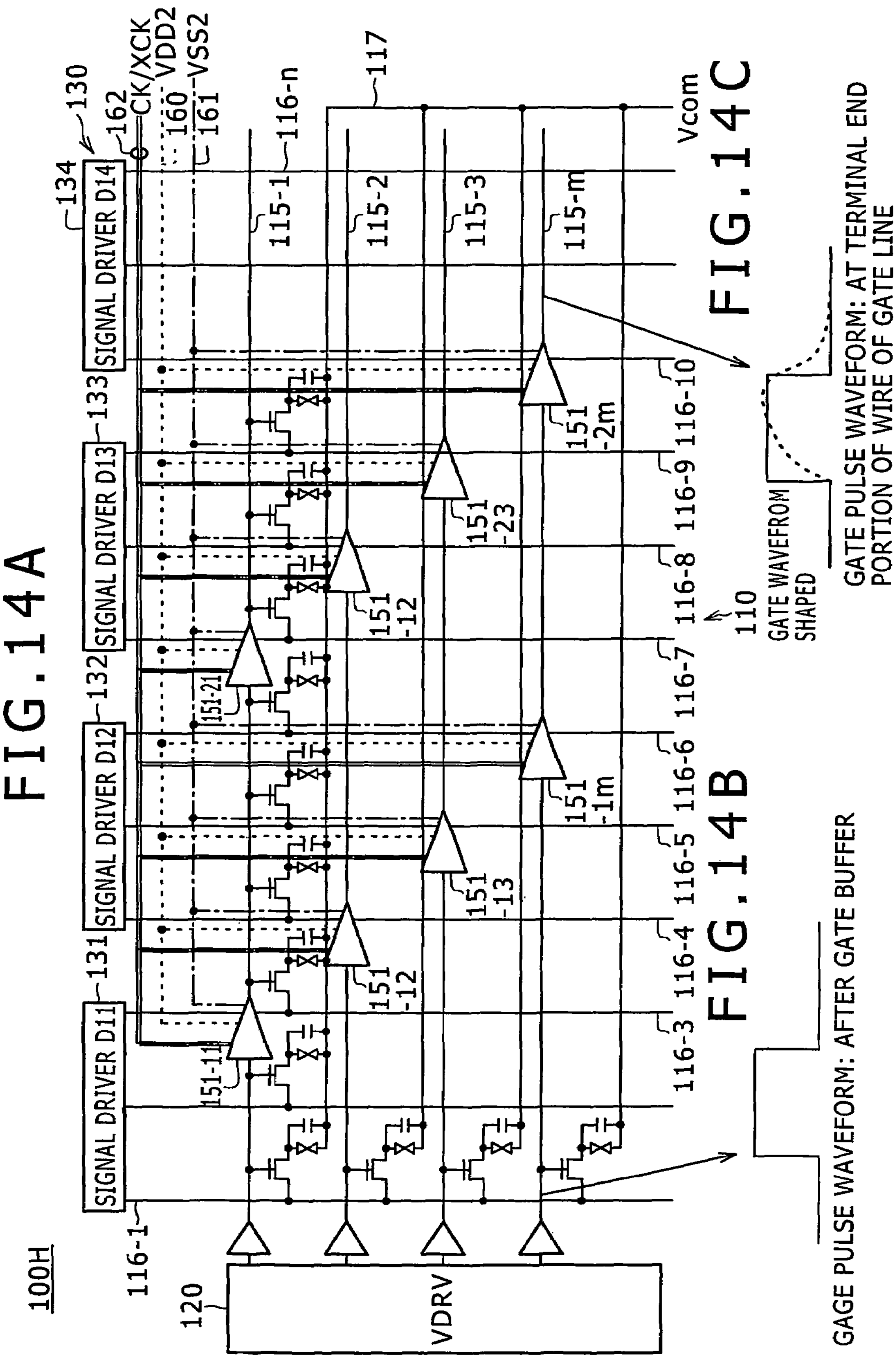
FIGS. 14A, 14B, and 14C are a circuit diagram and waveform diagrams showing an example of a configuration of a liquid crystal display apparatus according to a ninth embodiment of the present invention and examples of a gate pulse waveform, respectively.

FIGS. 14A, 14B, and 14C show an example of a configuration of a liquid crystal display apparatus according to a ninth embodiment of the present invention and examples of a gate pulse waveform, respectively.

Referring to FIG. 14A, the liquid crystal display apparatus 100H according to the present ninth embodiment is similar in configuration to but different in the arrangement position of the waveform shaping circuits 150 from the liquid crystal apparatus 100G according to the eighth embodiment described above.

In particular, in the liquid crystal apparatus 100G of the eighth embodiment described above, the supply lines 160 and 161 for the voltages VDD2 and VSS2 to be supplied to the waveform shaping circuits 150, the supply lines 162 for the clocks CK and XCK and the waveform shaping circuits 150 are disposed on the same coordinates in the horizontal direction.

In contrast, in the liquid crystal display apparatus 100G of the present eighth embodiment, the supply lines 160 and 161 for the voltages VDD2 and VSS2 to be supplied to the waveform shaping circuits 150, the supply lines 162 for the clocks CK and XCK and the waveform shaping circuits 150 are not disposed at the same coordinates in the horizontal direction but are disposed in a displaced relationship by one column distance from each other in a corresponding relationship to the wires of the gate lines and the signal lines.

In the example of FIG. 14A, the waveform shaping circuit 150-11 is disposed in the proximity of an intersecting position of the signal line 116-3 and the gate line 115-1. The waveform shaping circuit 150-12 is disposed in the proximity of an intersecting position of the signal line 116-4 and the gate line 115-2.

The waveform shaping circuit 150-13 is disposed in the proximity of an intersecting position of the signal line 116-5 and the gate line 115-3. The waveform shaping circuit 150-1m is disposed in the proximity of an intersecting position of the signal line 116-6 and the gate line 115-m.

Meanwhile, the waveform shaping circuit 150-21 is disposed in the proximity of an intersecting position of the signal line 116-7 and the gate line 115-1. The waveform shaping circuit 150-22 is disposed in the proximity of an intersecting position of the signal line 116-8 and the gate line 115-2. The waveform shaping circuit 150-23 is disposed in the proximity of an intersecting position of the signal line 116-9 and the gate line 115-3. The waveform shaping circuit 150-2m is disposed in the proximity of an intersecting position of the signal line 116-10 and the gate line 115-m.

In this instance, in such a case that the coordinates of the waveform shaping circuits 150 in the horizontal direction are not fixed, local one-sidedness is eliminated from the supply lines 160 and 161 for the power supply voltage VDD2 and the reference voltage VSS2. Therefore, the uniformity in transmission factor of pixels under the influence of the wiring layout of the supply lines 160 and 161 for the voltages VDD2 and VSS2 is assured.

In this instance, the luminance distribution of the display apparatus is fixed.

The configuration of the other part of the present ninth embodiment is similar to that of the eighth embodiment, and also effects similar to those achieved by the first and eighth embodiments described above can be achieved.

<Tenth Embodiment>

Figures 15, 15B, 15C:
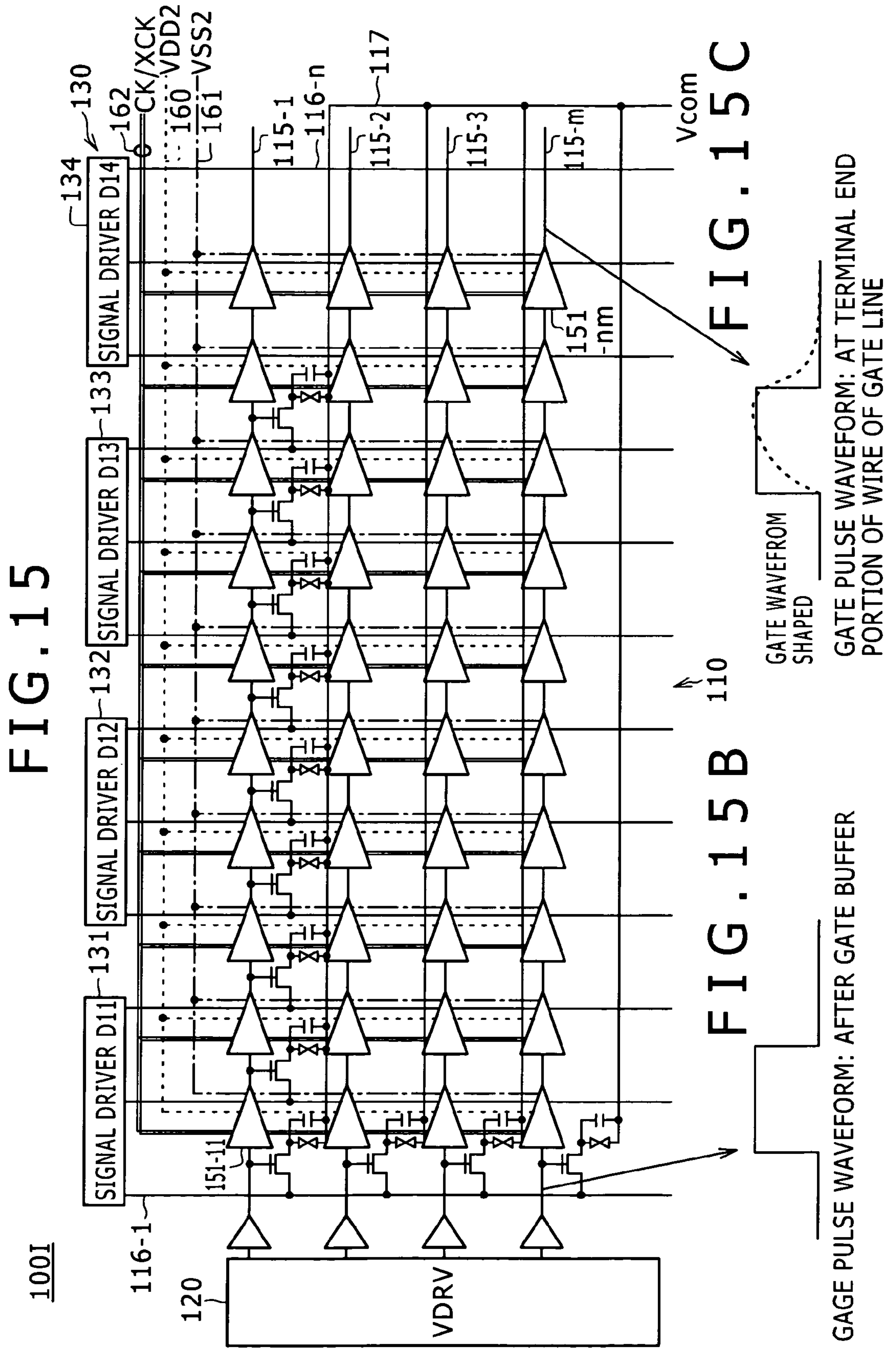

FIGS. 15A, 15B, and 15C show an example of a configuration of a liquid crystal display apparatus according to a tenth embodiment of the present invention and examples of a gate pulse waveform, respectively.

Meanwhile, FIGS. 16A to 16J illustrate operation of the liquid crystal display apparatus according to the present tenth embodiment.

Figures 16A, 16B, 16C, 16D, 16E, 16F, 16G, 16H, 16I, 16J:
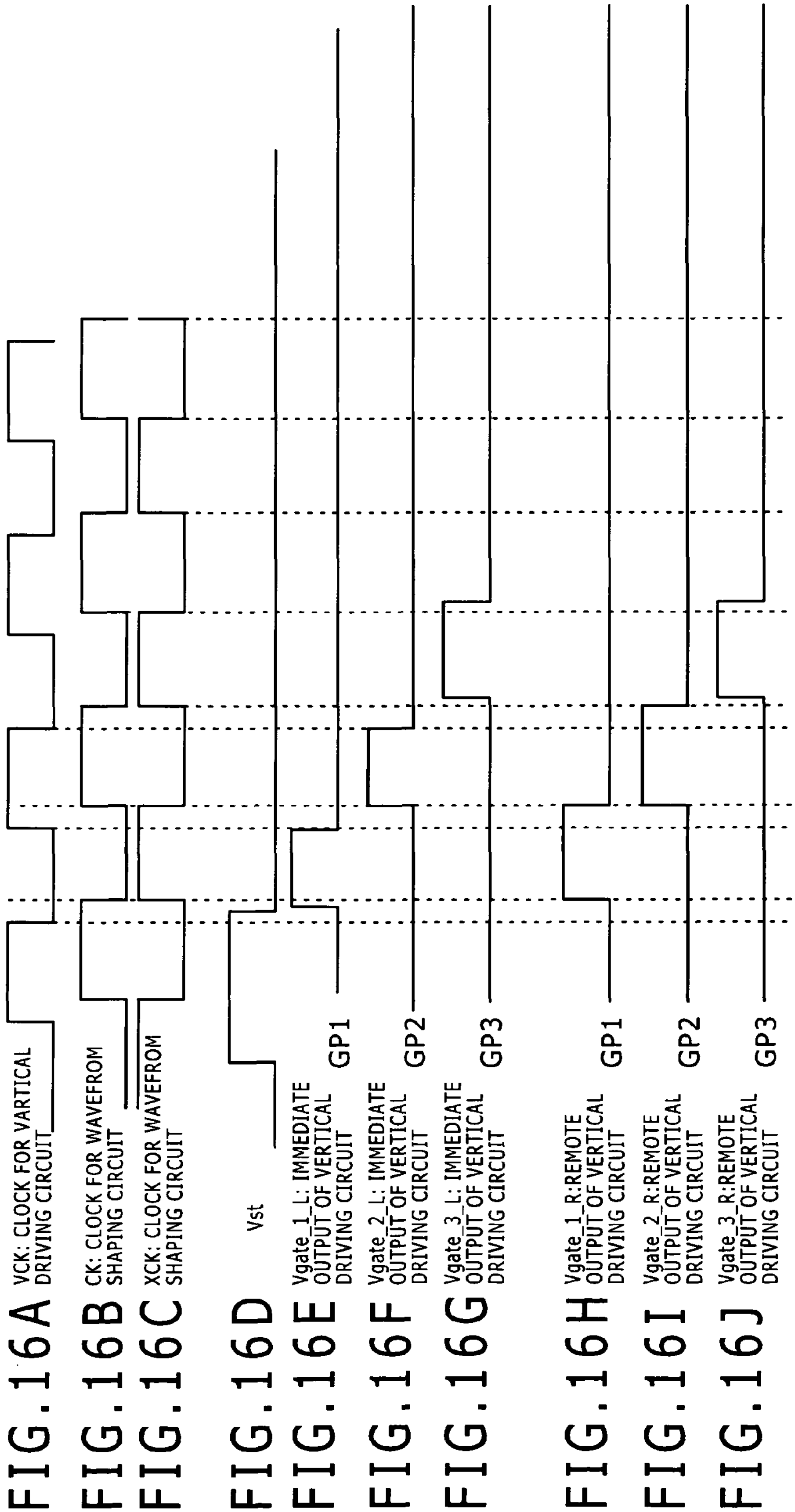
FIGS. 16A to 16J are timing charts illustrating operation of the liquid crystal display apparatus shown in FIG. 15A.

In particular, FIG. 16A illustrates a clock VCK for a vertical driving circuit; FIG. 16B a clock CK for a waveform shaping circuit; FIG. 16C an inverted XCK of the clock CK; and FIG. 16D a vertical start signal VST (Vst).

FIG. 16E illustrates a gate pulse GP1 as an immediate output for the first row of the vertical driving circuit 120; FIG. 16F a gate pulse GP2 as an immediate output for the second row of the vertical driving circuit 120; and FIG. 16G a gate pulse GP3 as an immediate output for the third row of the vertical driving circuit 120.

FIG. 16H illustrates the gate pulse GP1 at a remote end portion of the first row of the vertical driving circuit 120; FIG. 16I a gate pulse GP2 at a remote end portion of the second row of the vertical driving circuit 120; and FIG. 16J a gate pulse GP3 at a remote end portion of the third row of the vertical driving circuit 120.

Further, the time chart Vgate_1_L of FIG. 16E illustrates an immediate output pulse of the first row; the time chart Vgate_2_L of FIG. 16F illustrates an immediate output pulse of the second row; and the time chart Vgate_3_L of FIG. 16G illustrates an immediate output pulse of the third row.

Further, the time chart Vgate_1_R of FIG. 16H illustrates a remote end pulse of the first row; the time chart Vgate_2_R of FIG. 16I illustrates a remote end pulse of the second row; and the time chart Vgate_3_R of FIG. 16J illustrates a remote end pulse of the third row.

Referring to FIG. 15A, the liquid crystal display apparatus 100I according to the present tenth embodiment is similar in configuration to but different in the arrangement position of the waveform shaping circuits 151 from the liquid crystal display apparatus 100G and 100H according to the eighth and ninth embodiments described above.

In particular, in the liquid crystal display apparatus 100G and 100H according to the eighth and ninth embodiments, the supply lines 160 and 161 for the voltages VDD2 and VSS2 to be supplied to the waveform shaping circuits 151 and the waveform shaping circuits 151 are disposed at the same coordinates in the horizontal direction.

Or conversely, the supply lines 160 and 161 for the voltages VDD2 and VSS2 to be supplied to the waveform shaping circuits 151 and the waveform shaping circuits 151 are not disposed at the same coordinates.

In contrast, in the liquid crystal display apparatus 100I according to the present tenth embodiment, the waveform shaping circuits 151-11 to 151-nm are disposed on the gate lines in the proximity of almost all intersecting positions of the gate lines and the signal lines, or in other words, at inputting portions of the pixel circuits 111 for a gate pulse.

With the present tenth embodiment, a gate pulse is shaped into a good waveform as seen from FIGS. 16A to 16J.

Further, although the waveform of the gate pulse is distorted by parasitic capacitance of the supply lines 162 for the clocks CK and XCK and so forth, since, in the horizontal direction, all of the supply lines 162 for the clocks CK and XCK have an equal parasitic capacitance value, distortion in waveform of the clocks CK and XCK is same.

Then, since the gate pulses transmitted in the horizontal direction pass the waveform shaping circuits 151, the waveform thereof does not suffer from distortion in the horizontal direction and delay.

In this manner, since the waveform shaping circuit 151 is disposed for each pixel circuit 111 on the wires of the gate lines in this manner, it is possible to allow a plurality of pixel circuits 111 to exist between different waveform shaping circuits so that no dispersion in delay of the waveform of a gate pulse may occur therein.

In other words, where a plurality of pixel circuits exist between a waveform shaping circuit and another waveform shaping circuit, the ununiformity in parasitic capacitance is eliminated, and uniform load capacitance of the pixel gates of the waveform shaping circuits is assured. Therefore, no delay occurs with the gate electrodes any more.

The configuration of the other part of the present tenth embodiment is similar to that of the eighth and ninth embodiments, and also effects similar to those achieved by the eighth and ninth embodiments described above can be achieved.

<Eleventh Embodiment>

Figure 17:
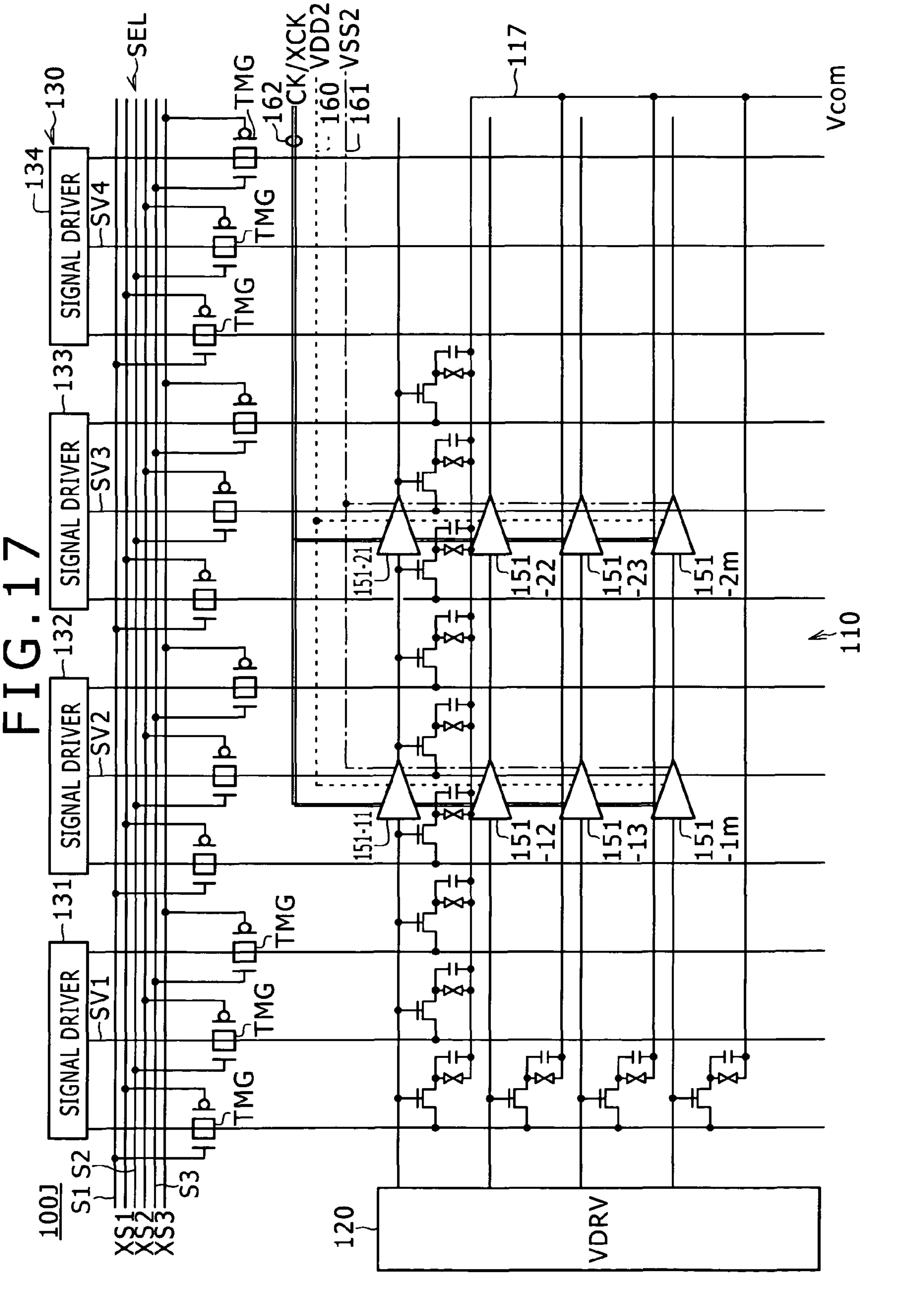
FIGS. 17, 18, and 19 are circuit diagrams showing an example of configuration of a liquid crystal display apparatus according to eleventh to thirteenth embodiments of the present invention, respectively.

FIG. 17 shows an example of a configuration of a liquid crystal display apparatus according to an eleventh embodiment of the present invention.

Referring to FIG. 17, the liquid crystal display apparatus 100J according to the present eleventh embodiment is similar in configuration to but different from the liquid crystal display apparatus 100G according to the eighth embodiment described above in that it adopts a configuration which is effective also in a system wherein image data is written time-divisionally into a panel.

Particularly, also where a time-dividing switch is utilized as seen in FIG. 17 in order to reduce the picture frame of the panel, application of the present invention is required where the time division number of the time dividing switch does not sufficiently satisfy an electric characteristic and an image characteristic within a horizontal selection period.

In FIG. 17, the signals SV1 to SV4 from the signal drivers 131 to 134 are transferred to the signal lines 116 (116-1 to 116-12) through the selector SEL having the plural transfer gates TMG.

The conduction state of the transfer gates (analog switches) TMG is controlled by the selection signal S1 and the inverted signal XS1 of the same, the selection signal S2 and the inverted signal XS2 of the same, the selection signal S3 and the inverted signal XS3 of the same, . . . which are supplied from the outside and have complementary levels to each other.

Where such a configuration as described above is adopted, it is possible for an active matrix display apparatus of the high-definition (UXGA) and high-speed frame rate type to adopt a selector time divisional driving system which decreases the number of connection terminals and improve the mechanical reliance of connections.

The configuration of the other part of the present eleventh embodiment is similar to that of the eighth embodiment, and also effects similar to those achieved by the eighth embodiment described above can be achieved.

<Twelfth Embodiment>

Figure 18:
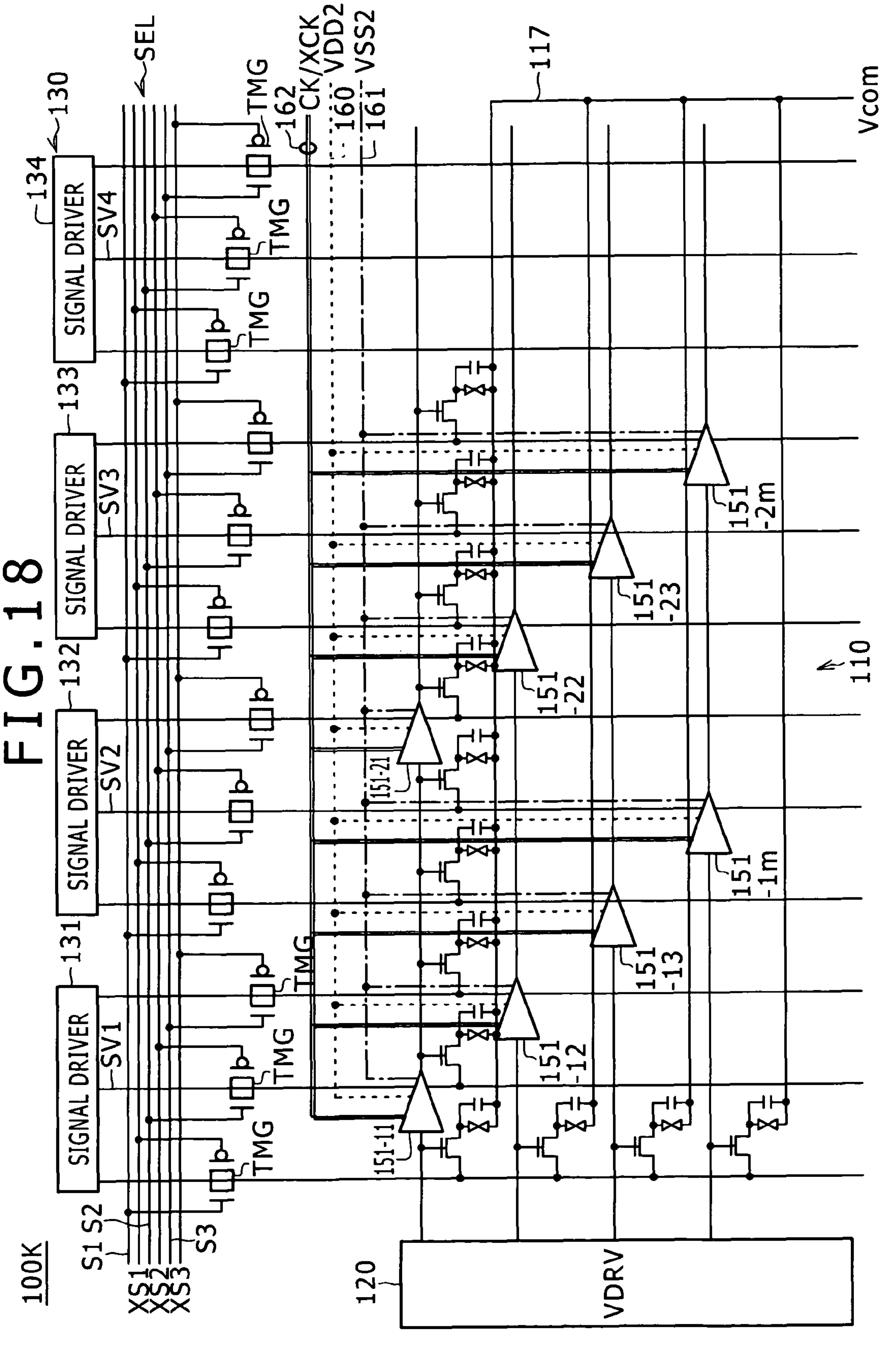

FIG. 18 shows an example of a configuration of a liquid crystal display apparatus according to a twelfth embodiment of the present invention.

Referring to FIG. 18, the liquid crystal display apparatus 100K according to the present twelfth embodiment is similar in configuration to but different from the liquid crystal display apparatus 100H according to the ninth embodiment described above in that it adopts a configuration which is effective also in a system wherein image data is written time-divisionally into a panel.

Particularly, also where a time dividing switch is utilized as seen in FIG. 18 in order to reduce the picture frame of the panel, application of the present invention is required where the time division number of the time dividing switch does not sufficiently satisfy an electric characteristic and an image characteristic within a horizontal selection period.

Referring to FIG. 18, the signals SV1 to SV4 from the signal drivers 131 to 134 are transferred to the signal lines 116 (116-1 to 116-12) through the selector SEL having the plural transfer gates TMG.

The conduction state of the transfer gates (analog switches) TMG is controlled by the selection signal S1 and the inverted signal XS1 of the same, the selection signal S2 and the inverted signal XS2 of the same, the selection signal S3 and the inverted signal XS3 of the same, . . . which are supplied from the outside and have complementary levels to each other.

Where such a configuration as described above is adopted, it is possible for an active matrix display apparatus of the high-definition (UXGA) and high-speed frame rate type to adopt a selector time divisional driving system which decreases the number of connection terminals and improve the mechanical reliance of connections.

The configuration of the other part of the present twelfth embodiment is similar to that of the ninth embodiment, and also effects similar to those achieved by the eighth and ninth embodiments described above can be achieved.

<Thirteenth Embodiment>

Figure 19:
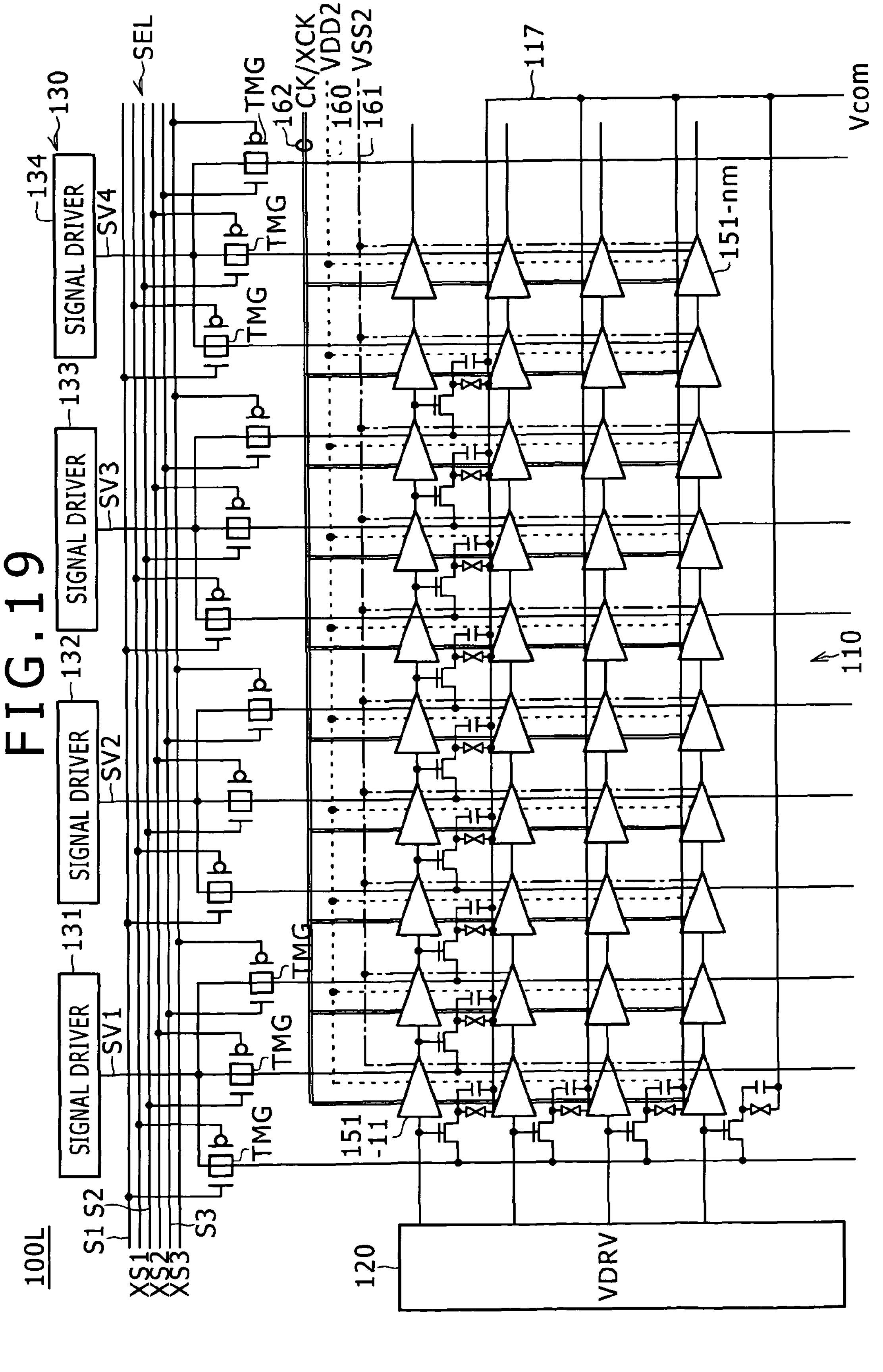

FIG. 19 shows an example of a configuration of a liquid crystal display apparatus according to a thirteenth embodiment of the present invention.

Referring to FIG. 19, the liquid crystal display apparatus 100L according to the present thirteenth embodiment is similar in configuration to but different from the liquid crystal display apparatus 100I according to the tenth embodiment described above in that it adopts a configuration which is effective also in a system wherein image data is written time-divisionally into a panel.

Particularly, also where a time dividing switch is utilized as seen in FIG. 19 in order to reduce the picture frame of the panel, application of the present invention is required where the time division number of the time dividing switch does not sufficiently satisfy an electric characteristic and an image characteristic within a horizontal selection period.

Referring to FIG. 19, the signals SV1 to SV4 from the signal drivers 131 to 134 are transferred to the signal lines 116 (116-1 to 116-12) through the selector SEL having the plural transfer gates TMG.

The conduction state of the transfer gates (analog switches) TMG is controlled by the selection signal S1 and the inverted signal XS1 of the same, the selection signal S2 and the inverted signal XS2 of the same, the selection signal S3 and the inverted signal XS3 of the same, . . . which are supplied from the outside and have complementary levels to each other.

Where such a configuration as described above is adopted, it is possible for an active matrix display apparatus of the high-definition (UXGA) and high-speed frame rate type to adopt a selector time divisional driving system which decreases the number of connection terminals and improve the mechanical reliance of connections.

The configuration of the other part of the present thirteenth embodiment is similar to that of the tenth embodiment, and also effects similar to those achieved by the eighth to tenth embodiments described above can be achieved.

It is to be noted that, though not particularly shown, the wiring scheme of the voltage supply lines in the seventh embodiment can be applied also to the eighth to thirteenth embodiments.

Also in this instance, invasion of an undesirable voltage into an adjacent pixel circuit 111 can be prevented. Consequently, an effect that good picture quality can be obtained can be achieved.

<Fourteenth Embodiment>

Figures 20A, 20B, 20C:
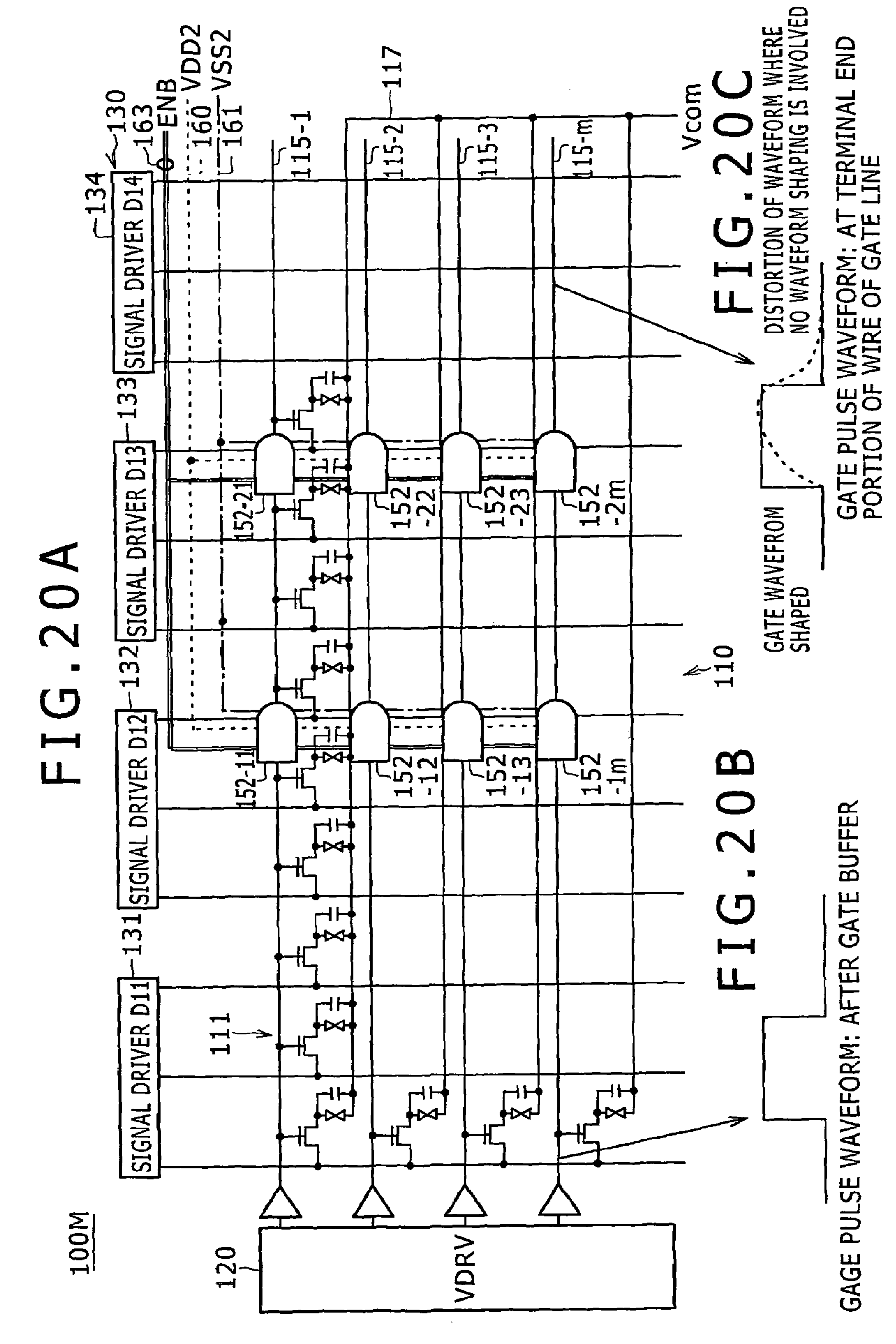
FIGS. 20A, 20B, and 20C are a circuit diagram and waveform diagrams showing an example of a configuration of a liquid crystal display apparatus according to a fourteenth embodiment of the present invention and examples of a gate pulse waveform, respectively.

FIGS. 20A, 20B, and 20C show an example of a configuration of a liquid crystal display apparatus according to a fourteenth embodiment of the present invention and examples of a gate pulse waveform, respectively.

Referring first to FIG. 20A, the liquid crystal display apparatus 100M according to the present fourteenth embodiment is similar in configuration to but different from the liquid crystal apparatus 100 according to the first embodiment described hereinabove in the following point.

In particular, in the liquid crystal display apparatus 100M according to the present fourteenth embodiment, the waveform shaping circuits are configured not from a circuit formed from CMOS buffers connected simply in a cascade connection but using a clocked CMOS circuit.

Here, a waveform shaping circuit 152 is described.

Also in the present fourteenth embodiment, the waveform shaping circuits 152-11 to 152-1m and 152-21 to 152-2m, which carry out waveform shaping and voltage change of gate pulses from the gate buffers 140-1 to 140-m, are disposed intermediately on the wires of the gate lines 115-1 to 115-m as described hereinabove.

Consequently, as seen from a waveform indicated by a solid line in FIG. 20C, the waveform of the gate pulse at the remote end portion or terminal end portion remote from the output stage of the gate buffers 140-1 to 140-m of the gate lines 115-1 to 115-m is improved from distortion thereof. It is to be noted that a waveform indicated by a broken line in FIG. 20C exhibits distortion of the waveform of the gate pulse at the remote end portion or terminal end portion where no waveform shaping circuit is interposed.

Consequently, the display apparatus facilitates display by a great number of pixels and a high frame frequency.

The waveform shaping circuits 152-11 to 152-1m and 152-21 to 152-2m are disposed intermediately on the lines of the gate lines 115-1 to 115-m for waveform shaping, respectively.

Further, the waveform shaping circuits 152-11 to 152-1m and 152-21 to 152-2m are connected commonly to the supply line 160 for the power supply voltage VDD2 which is the HIGH potential and the supply line 161 for the power supply voltage VSS2 which is the LOW potential.

Figures 21A, 21B:
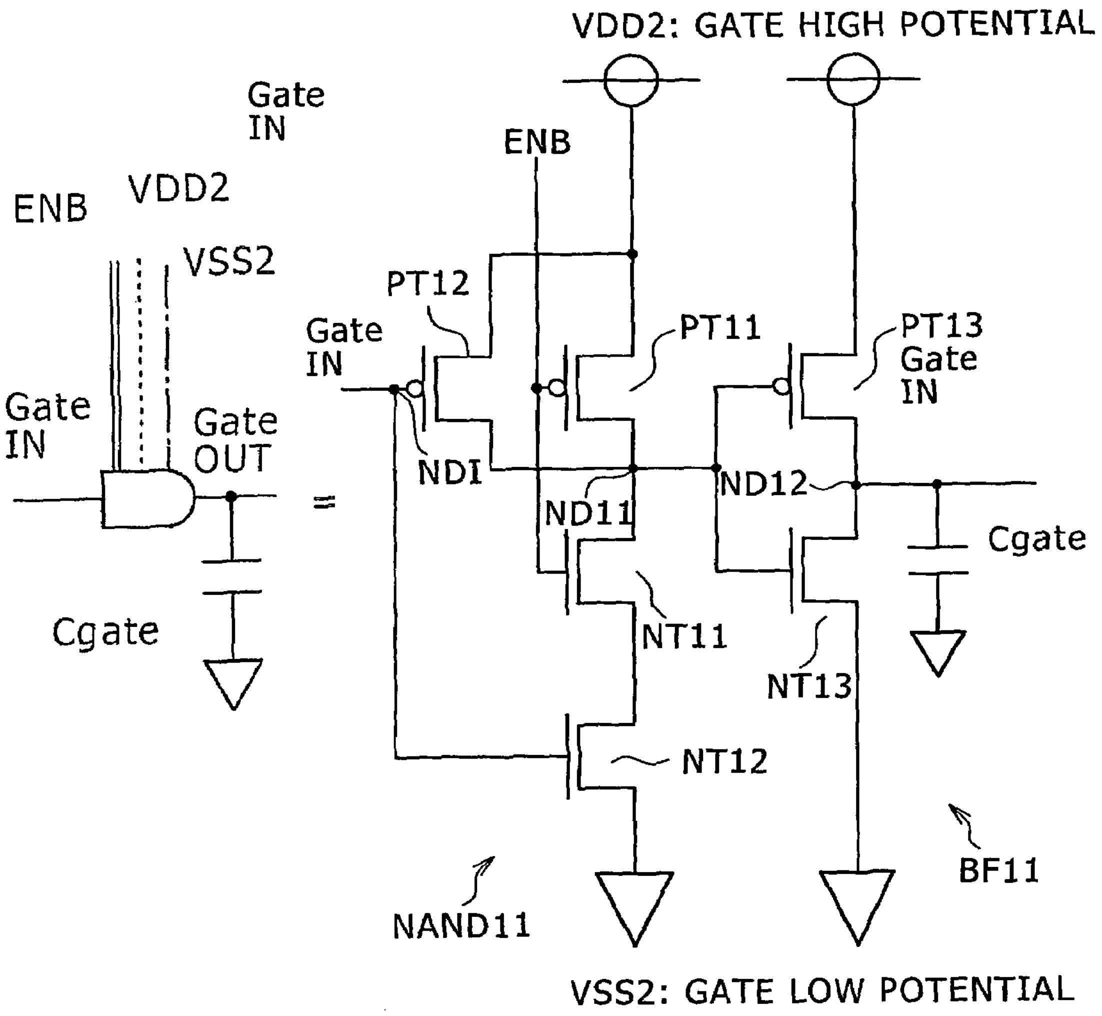
FIGS. 21A, 21B, and 21C are circuit diagrams showing a waveform shaping circuit of the liquid crystal display apparatus of FIG. 20A where it is formed from a clocked CMOS circuit including a NAND circuit of a CMOS configuration.
Figure 21C:
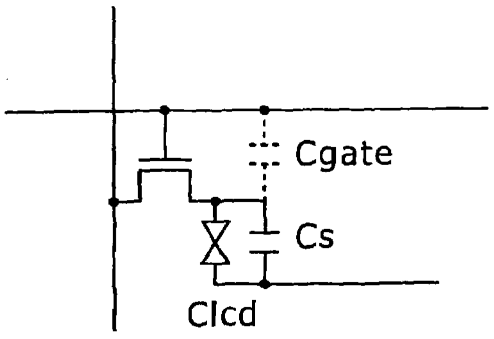

The waveform shaping circuits 152-11 to 152-1m and 152-21 to 152-2m are each formed, for example, from a circuit including a NAND gate of a CMOS configuration and a CMOS buffer connected in a cascade connection as seen in FIGS. 21A to 21C.

In the present fourteenth embodiment, the waveform shaping circuits 152-11 to 152-1m and 152-21 to 152-2m are disposed at the same coordinates in the vertical direction.

More particularly, the waveform shaping circuits 152-11 to 152-1m are disposed at intersecting positions of the signal line 116-6 and the gate lines 115-1 to 115-m, respectively. The waveform shaping circuits 152-21 to 152-2m are disposed at intersecting positions between the signal line 116-10 and the gate lines 115-1 to 115-m, respectively.

FIGS. 21A to 21C illustrate an example wherein the waveform shaping circuit according to the present fourteenth embodiment is formed from a clocked CMOS circuit of a CMOS configuration.

In particular, FIG. 21A shows an equivalent circuit and FIG. 21B shows a particular circuit while FIG. 21C illustrates capacitance on the output side of the buffer.

As seen in FIG. 21B, each of the waveform shaping circuits 152 includes a NAND circuit 11 of a CMOS configuration and a CMOS buffer or inverter BF11 connected in a cascade connection to the NAND circuit 11.

The NAND circuit 11 of a CMOS configuration includes a pair of PMOS transistors PT11 and PT12 and a pair of NMOS transistors NT11 and NT12.

The PMOS transistors PT11 and PT12 are connected at the source thereof to a supply line 160 for the power supply voltage VDD2 of the HIGH potential. The PMOS transistors PT11 and PT12 are connected at the drain thereof to the drain of the NMOS transistor NT11, and a node ND11 is formed from a connecting point of the drains.

The NMOS transistor NT11 is connected at the source thereof to the drain of the NMOS transistor NT12, and the NMOS transistor NT12 is connected at the source thereof to a supply line 161 for the reference voltage VSS2 of the LOW potential.

The PMOS transistor PT12 and the NMOS transistor NT12 are connected to each other at the gate thereof, and an node ND1 is formed from a connecting point of the gates and connected to a corresponding one of the gate lines 115 (115-1 to 115-m).

Further, the PMOS transistor PT12 and the NMOS transistor NT12 are connected at the gate thereof to a supply line for the enable signal ENB.

The CMOS buffer BF11 includes a PMOS transistor PT13 and an NMOS transistor NT13.

The PMOS transistor PT13 is connected at the source thereof to the supply line 160 for the power supply voltage VDD2 of the HIGH potential and at the drain thereof to the drain of the NMOS transistor NT13. A node ND12 is formed from a connecting point of the drains.

The NMOS transistor NT13 is connected at the source thereof to the supply line 161 for the reference voltage VSS2 of the LOW potential.

The PMOS transistor PT13 and the NMOS transistor NT13 are connected to each other at the gate thereof, and a connecting point of the gates is connected to the node ND11 of the NAND circuit 11 of a CMOS configuration. The node ND12 is connected as an output node to a corresponding one of the gate lines 115 (115-1 to 115-m).

The waveform shaping circuits 152 having such a configuration as described above output the waveform of the gate pulses GP1 to GPm transmitted from the arrangement side, that is, the output side or on the left side in FIG. 20A, of the vertical driving circuit 120 as a positive logic output and further carry out waveform shaping.

The outputs of the NAND circuit 11 of a CMOS configuration and the CMOS buffer BF11 for waveform shaping signify the capacitance Cgate of the gate line and also signify capacitance including the liquid crystal capacitance Clcd in a state wherein the pixel electrode or the TFT (pixel transistor) is in an on state and the storage capacitance Cs of the pixel.

Further, since the NAND circuit 11 of a CMOS configuration indicates an inverted logic output with respect to an input thereto, the waveform shaping circuit 152 is formed from a circuit wherein the CMOS buffer BF11 is connected serially to the NAND circuit 11 in order to obtain a positive logic output.

Since the waveform shaping circuit 152 requires an output power supply therefor, wires of the supply lines 160 and 161 for supplying the high side power supply voltage VDD2 and the low side power supply voltage VSS2 for turning the pixel gate on and off are laid.

The wires are laid in parallel to the pixel signal wires. The reason is that, where they are laid in parallel to and in the proximity of the signal lines 161 (116-1 to 116-n), drop of the aperture ratio of the liquid crystal can be minimized.

Further, where bus lines which exhibit lower resistance to the supply lines 160 and 161 for the voltages VDD2 and VSS2 are connected above the effective pixel region section 110, the voltage drop of the power supply lines in the horizontal direction can be minimized.

As a result, the variation of the high voltage and the low voltage to be outputted from the waveform shaping circuit 152 in the horizontal direction of the effective pixels can be minimized.

The NAND circuit 11 of a CMOS configuration starts its operation at a rising edge or a falling edge of the enable signal or clock ENB as a control pulse therefor when the enable signal ENB is inputted to the NAND circuit 11 of a CMOS configuration which forms the waveform shaping circuit 152.

Where a supply line 163 for the enable signal ENB is wired in the vertical direction of the display apparatus and is rendered operative, although some delay of the enable signal ENB or distortion in waveform in the vertical direction occurs, the enable signal ENB has the same history of same parasitic capacitance. Therefore, the delay becomes fixed.

As a result, a signal transferred along a gate line disposed in the horizontal direction exhibits a delayed waveform controlled by the clocks. This gives rise to generation of a selection signal without the necessity for a gate selection waveform, which is vertically scanned at a high speed, without paying attention to the horizontal direction.

Further, also in the present fourteenth embodiment, the supply lines 160 and 161 for the voltages VDD2 and VSS2 to be supplied to the waveform shaping circuits 152 and the waveform shaping circuits 152 are preferably disposed on the same coordinates in the horizontal direction similarly as in the first and eighth embodiments.

The reason is that, since the coordinates of the waveform shaping circuits 152 in the horizontal direction are fixed, the gate pulse waveform does not suffer from delay.

The configuration of the other part of the present fourteenth embodiment is similar to that of the first embodiment, and also effects similar to those achieved by the first embodiment described above can be achieved. Besides, the delay can be maintained fixed with a higher degree of accuracy.

<Fifteenth Embodiment>

Figures 22A, 22B, 22C:
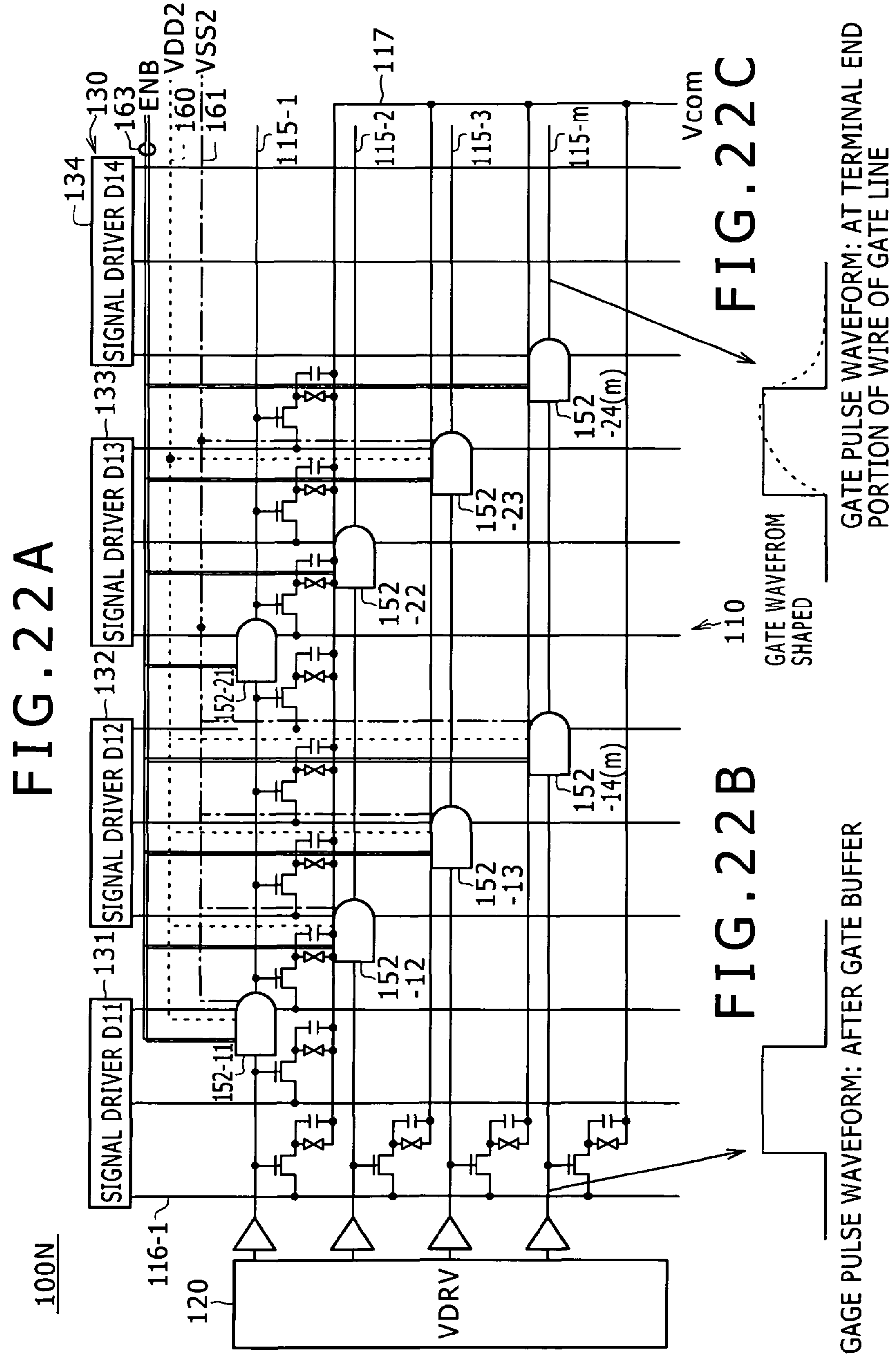
FIGS. 22A, 22B, and 22C are a circuit diagram and waveform diagrams showing an example of a configuration of a liquid crystal display apparatus according to a fifteenth embodiment of the present invention and examples of a gate pulse waveform, respectively.

FIGS. 22A, 22B, and 22C show an example of a configuration of a liquid crystal display apparatus according to a fifteenth embodiment of the present invention and examples of a gate pulse waveform, respectively.

Referring to FIG. 22A, the liquid crystal display apparatus 100N according to the present fifteenth embodiment is similar in configuration to but different in the arrangement position of the waveform shaping circuits 152 from the liquid crystal apparatus 100M according to the fourteenth embodiment described above.

In particular, in the liquid crystal apparatus 100M of the fourteenth embodiment described above, the supply lines 160 and 161 for the voltages VDD2 and VSS2 to be supplied to the waveform shaping circuits 152, the supply line 163 for the enable signal ENB, and the waveform shaping circuits 152 are disposed on the same coordinates in the horizontal direction.

In contrast, in the liquid crystal display apparatus 100N of the present fifteenth embodiment, the supply lines 160 and 161 for the voltages VDD2 and VSS2 to be supplied to the waveform shaping circuits 152, the supply line 163 for the enable signal ENB, and the waveform shaping circuits 152 are not disposed at the same coordinates in the horizontal direction but are disposed in a displaced relationship by one column distance from each other in a corresponding relationship to the wires of the gate lines and the signal lines.

In the example of FIG. 22A, the waveform shaping circuit 152-11 is disposed in the proximity of an intersecting position of the signal line 116-3 and the gate line 115-1. The waveform shaping circuit 152-12 is disposed in the proximity of an intersecting position of the signal line 116-4 and the gate line 115-2. The waveform shaping circuit 152-13 is disposed in the proximity of an intersecting position of the signal line 116-5 and the gate line 115-3. The waveform shaping circuit 152-14(m) is disposed in the proximity of an intersecting position of the signal line 116-6 and the gate line 115-m.

Meanwhile, the waveform shaping circuit 152-21 is disposed in the proximity of an intersecting position of the signal line 116-7 and the gate line 115-1. The waveform shaping circuit 152-22 is disposed in the proximity of an intersecting position of the signal line 116-8 and the gate line 115-2. The waveform shaping circuit 152-23 is disposed in the proximity of an intersecting position of the signal line 116-9 and the gate line 115-3. The waveform shaping circuit 152-24(m) is disposed in the proximity of an intersecting position of the signal line 116-10 and the gate line 115-m.

In this instance, in such a case that the coordinates of the waveform shaping circuits 152 in the horizontal direction are not fixed, local one-sidedness is eliminated from the wires of the supply lines 160 and 161 for the power supply voltage VDD2 and the reference voltage VSS2. Therefore, the uniformity in transmission factor of pixels under the influence of the wiring layout of the supply lines 160 and 161 for the voltages VDD2 and VSS2 is assured.

In this instance, the luminance distribution of the display apparatus is fixed.

The configuration of the other part of the present fifteenth embodiment is similar to that of the fourteenth embodiment, and also effects similar to those achieved by the first and fourteenth embodiments described above can be achieved.

<Sixteenth Embodiment>

Figures 23A, 23B, 23C:
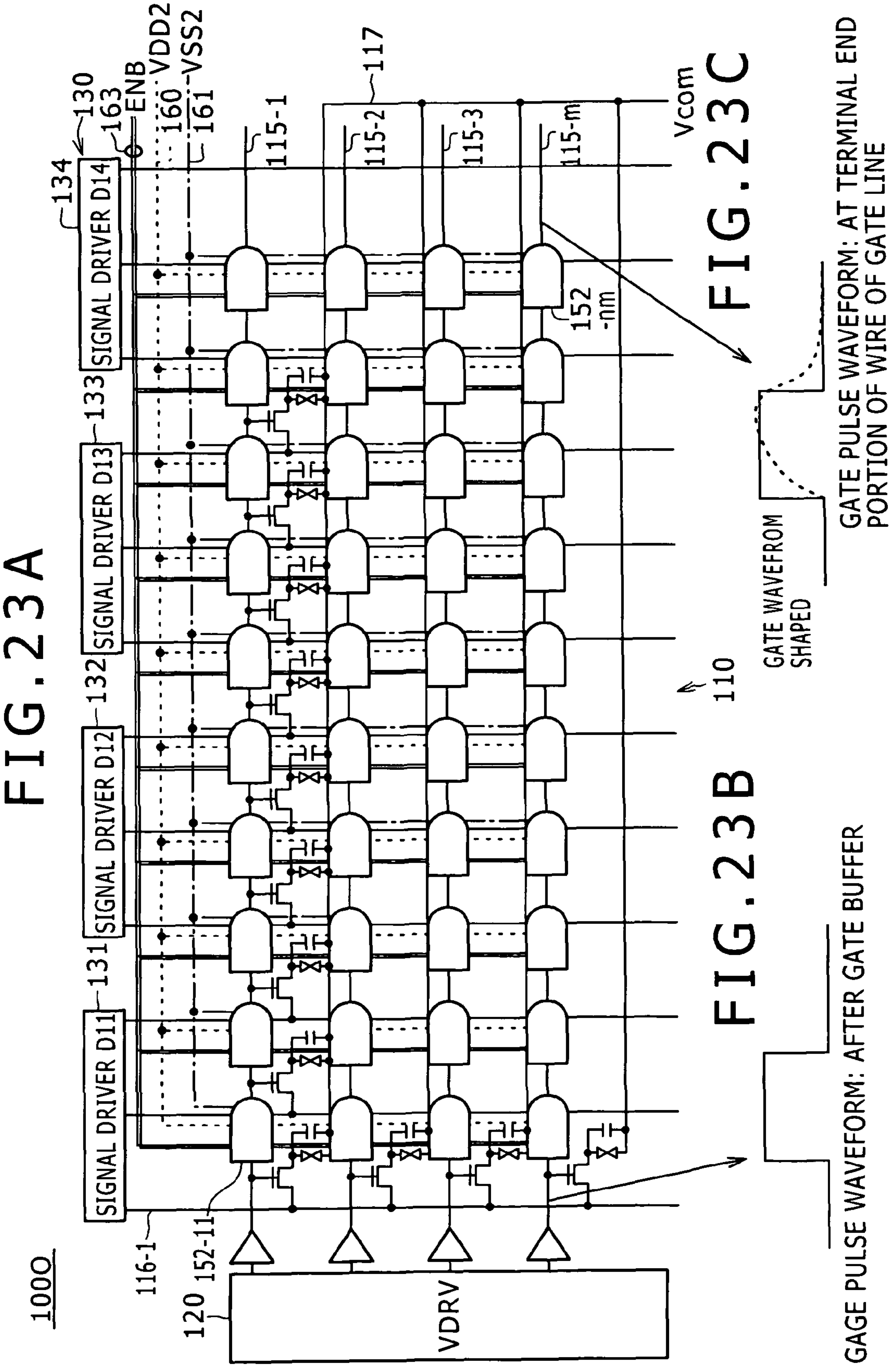
FIGS. 23A, 23B, and 23C are a circuit diagram and waveform diagrams showing an example of a configuration of a liquid crystal display apparatus according to a sixteenth embodiment of the present invention and examples of a gate pulse waveform, respectively.

FIGS. 23A, 23B, and 23C show an example of a configuration of a liquid crystal display apparatus according to a sixteenth embodiment of the present invention and examples of a gate pulse waveform, respectively.

Meanwhile, FIGS. 24A to 24J illustrate operation of the liquid crystal display apparatus according to the present sixteenth embodiment.

In particular, FIG. 24A illustrates a vertical starting signal or start pulse VST (Vst); FIG. 24B illustrates a vertical clock VCK for a vertical driving circuit; and FIG. 24C illustrates an enable signal ENB for a waveform shaping circuit.

FIG. 24D illustrates a gate pulse GP1 as an immediate output for the first row of the vertical driving circuit 120; FIG. 24E illustrates a gate pulse GP2 as an immediate output for the second row of the vertical driving circuit 120; and FIG. 24F illustrates a gate pulse GP3 as an immediate output for the third row of the vertical driving circuit 120.

FIG. 24G illustrates the gate pulse GP1 at a remote end portion of the first row of the vertical driving circuit 120; FIG. 24H illustrates a gate pulse GP2 at a remote end portion of the second row of the vertical driving circuit 120; and FIG. 24I illustrates a gate pulse GP3 at a remote end portion of the third row of the vertical driving circuit 120.

Further, the time chart Vgate_1_L of FIG. 24D illustrates an immediate output pulse of the first row; the time chart Vgate_2_L of FIG. 24E illustrates an immediate output pulse of the second row; and the time chart Vgate_3_L of FIG. 24F illustrates an immediate output pulse of the third row.

Further, the time chart Vgate_1_R of FIG. 24G illustrates a remote end pulse of the first row; the time chart Vgate_2_R of FIG. 24H illustrates a remote end pulse of the second row; and the time chart Vgate_3_R of FIG. 24I illustrates a remote end pulse of the third row.

FIG. 25A illustrates the vertical starting signal or start pulse VST (Vst), and FIG. 25B illustrates the vertical clock VCK for a vertical driving circuit.

FIG. 25C illustrates the enable signal ENB for a waveform shaping circuit at the first stage; FIG. 25D illustrates the gate pulse GP1 as an immediate output for the first row of the vertical driving circuit 120; and FIG. 25E illustrates the gate pulse GP1 at a remote end portion of the first row of the vertical driving circuit 120.

FIG. 25F illustrates the enable signal ENB for a waveform shaping circuit at a medium stage; FIG. 25G illustrates a gate pulse GPM as an immediate output for a medium row of the vertical driving circuit 120; and FIG. 25H illustrates the gate pulse GPM at a remote end portion of the vertical driving circuit 120 in the medium row.

FIG. 25I illustrates the enable signal ENB for a waveform shaping circuit at the last stage; FIG. 25J illustrates a gate pulse GPF as an immediate output for the last row of the vertical driving circuit 120; and FIG. 25K illustrates the gate pulse GPF at a remote end portion of the vertical driving circuit 120 in the last row.

Further, the time chart Vgate_1_L of FIG. 25D illustrates an immediate output pulse of the first row; and the time chart Vgate_1_R of FIG. 25E illustrates a remote end pulse of the first row.

The time chart Vgate_M_L of FIG. 25G illustrates an immediate output pulse of the medium row; and the time chart Vgate_M_R of FIG. 25H illustrate a remote end pulse of the middle row The time chart Vgate_F_L of FIG. 25J illustrates an immediate output pulse of the last row; and the time chart Vgate_F_R of FIG. 25K a remote end pulse of the last row.

Referring to FIG. 23A, the liquid crystal display apparatus 1000 according to the present sixteenth embodiment is similar in configuration to but different in the arrangement position of the waveform shaping circuits 152 from the liquid crystal display apparatus 100M and 100N according to the fourteenth and fifteenth embodiments described above.

In particular, in the liquid crystal display apparatus 100M and 100N according to the fourteenth and fifteenth embodiments, the supply lines 160 and 161 for the voltages VDD2 and VSS2 to be supplied to the waveform shaping circuits 152 and the waveform shaping circuits 152 are disposed at the same coordinates in the horizontal direction.

Or conversely, the supply lines 160 and 161 for the voltages VDD2 and VSS2 to be supplied to the waveform shaping circuits 152 and the waveform shaping circuits 152 are not disposed at the same coordinates.

In contrast, in the liquid crystal display apparatus 1000 according to the present sixteenth embodiment, the waveform shaping circuits 152-11 to 152-nm are disposed on the gate lines in the proximity of almost all intersecting positions of the gate lines and the signal lines, or in other words, at inputting portions of the pixel circuits 111 for a gate pulse.

With the present sixteenth embodiment, a gate pulse is shaped into a good waveform as seen from FIGS. 24A to 24I.

Further, although the waveform of the enable signal ENB is distorted by parasitic capacitance of the supply lines 163 and so forth, since, in the horizontal direction, all supply line 163 for the enable signal ENB has an equal parasitic capacitance value, distortion in waveform of the enable signal ENB is same.

Then, since the gate pulses transmitted in the horizontal direction pass the waveform shaping circuits 152, the waveform thereof does not suffer from distortion in the horizontal direction and delay.

In this manner, since the waveform shaping circuit 152 is disposed for each pixel circuit 111 on the wires of the gate lines in this manner, it is possible to allow a plurality of pixel circuits 111 to exist between different waveform shaping circuits so that no dispersion in delay of the waveform of a gate pulse may occur therein.

In other words, where a plurality of pixel circuits exist between a waveform shaping circuit and another waveform shaping circuit, the ununiformity in parasitic capacitance is eliminated, and uniform load capacitance of the pixel gates of the waveform shaping circuits is assured. Therefore, no delay occurs with the gate electrodes any more.

The configuration of the other part of the present sixteenth embodiment is similar to that of the fourteenth and fifteenth embodiments, and also effects similar to those achieved by the fourteenth and fifteenth embodiments described above can be achieved.

<Seventeenth Embodiment>

Figure 26:
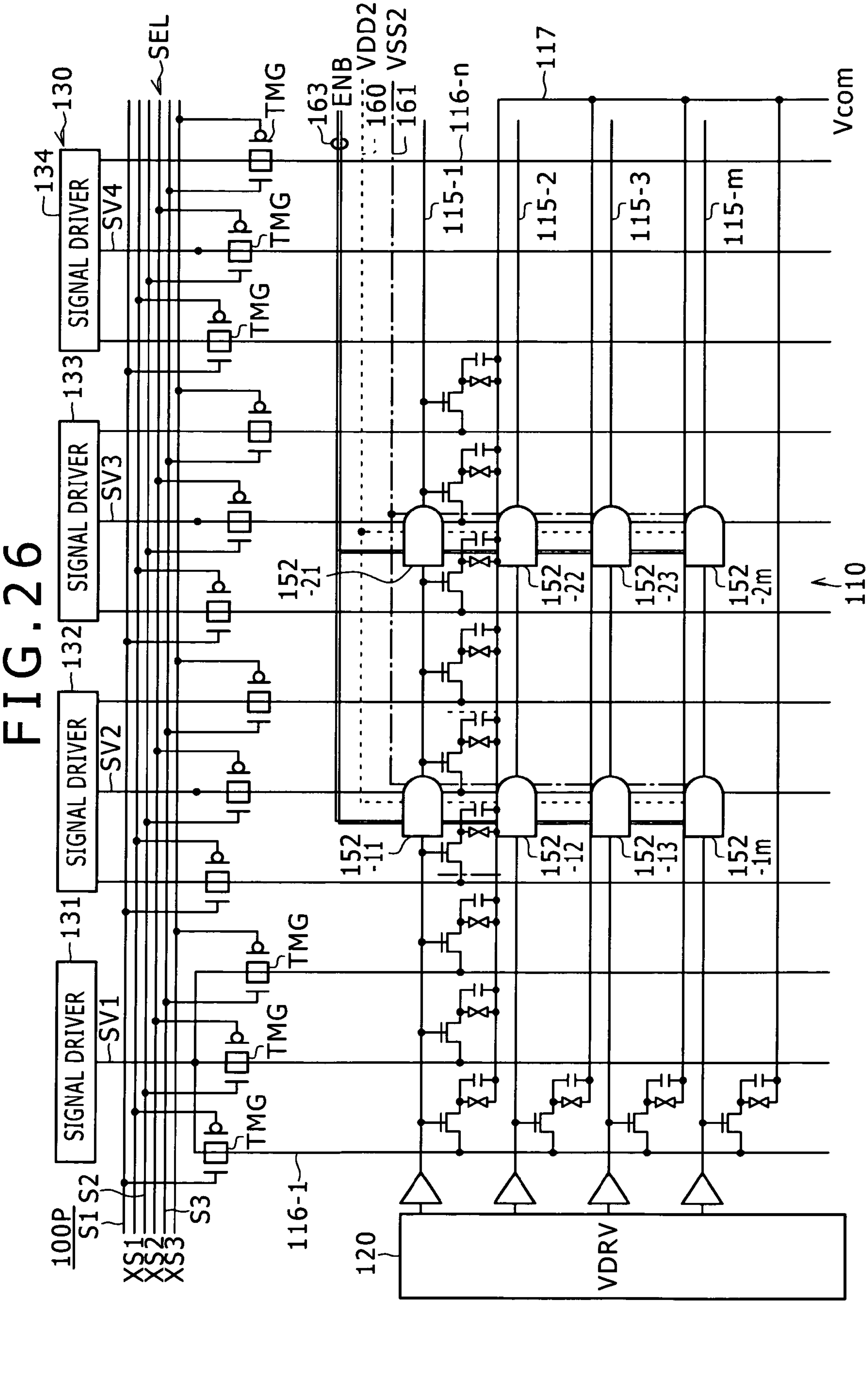
FIGS. 26, 27, and 28 are circuit diagrams showing an example of a configuration of liquid crystal display apparatus according to seventeenth, eighteenth and nineteenth embodiments of the present invention, respectively.

FIG. 26 shows an example of a configuration of a liquid crystal display apparatus according to a seventeenth embodiment of the present invention.

Referring to FIG. 26, the liquid crystal display apparatus 100P according to the present seventeenth embodiment is similar in configuration to but different from the liquid crystal apparatus 100M according to the fourteenth embodiment described above in that it adopts a configuration which is effective also in a system wherein image data is written time-divisionally into a panel.

Particularly, also where a time-dividing switch is utilized as seen in FIG. 26 in order to reduce the picture frame of the panel, application of the present invention is required where the time division number of the time dividing switch does not sufficiently satisfy an electric characteristic and an image characteristic within a horizontal selection period.

In FIG. 26, the signals SV1 to SV4 from the signal drivers 131 to 134 are transferred to the signal lines 116 (116-1 to 116-12) through the selector SEL having the plural transfer gates TMG.

The conduction state of the transfer gates (analog switches) TMG is controlled by the selection signal S1 and the inverted signal XS1 of the same, the selection signal S2 and the inverted signal XS2 of the same, the selection signal S3 and the inverted signal XS3 of the same, . . . which are supplied from the outside and have complementary levels to each other.

Where such a configuration as described above is adopted, it is possible for an active matrix display apparatus of the high-definition (UXGA) and high-speed frame rate type to adopt a selector time divisional driving system which decreases the number of connection terminals and improve the mechanical reliance of connections.

The configuration of the other part of the present fourteenth embodiment is similar to that of the fifteenth embodiment, and also effects similar to those achieved by the fourteenth embodiment described above can be achieved.

<Eighteenth Embodiment>

Figure 27:
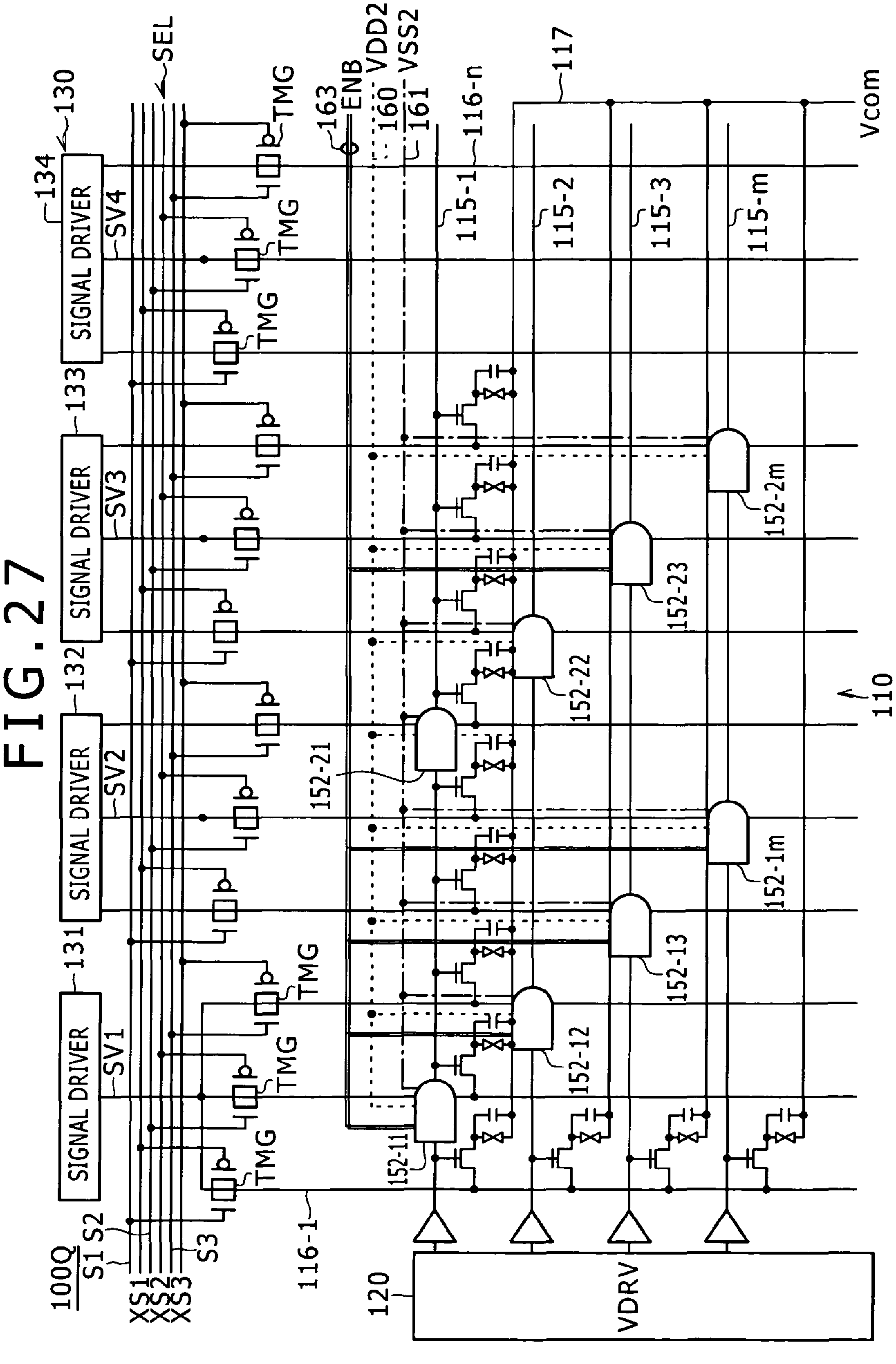

FIG. 27 shows an example of a configuration of a liquid crystal display apparatus according to an eighteenth embodiment of the present invention.

Referring to FIG. 27, the liquid crystal display apparatus 100Q according to the present eighteenth embodiment is similar in configuration to but different from the liquid crystal display apparatus 100N according to the fifteenth embodiment described above in that it adopts a configuration which is effective also in a system wherein image data is written time-divisionally into a panel.

Particularly, also where a time dividing switch is utilized as seen in FIG. 27 in order to reduce the picture frame of the panel, application of the present invention is required where the time division number of the time dividing switch does not sufficiently satisfy an electric characteristic and an image characteristic within a horizontal selection period.

Referring to FIG. 27, the signals SV1 to SV4 from the signal drivers 131 to 134 are transferred to the signal lines 116 (116-1 to 116-12) through the selector SEL having the plural transfer gates TMG.

The conduction state of the transfer gates (analog switches) TMG is controlled by the selection signal S1 and the inverted signal XS1 of the same, the selection signal S2 and the inverted signal XS2 of the same, the selection signal S3 and the inverted signal XS3 of the same, . . . which are supplied from the outside and have complementary levels to each other.

Where such a configuration as described above is adopted, it is possible for an active matrix display apparatus of the high-definition (UXGA) and high-speed frame rate type to adopt a selector time divisional driving system which decreases the number of connection terminals and improves the mechanical reliance of connections.

The configuration of the other part of the present eighteenth embodiment is similar to that of the fifteenth embodiment, and also effects similar to those achieved by the fourteenth and fifteenth embodiments described above can be achieved.

<Nineteenth Embodiment>

Figure 28:
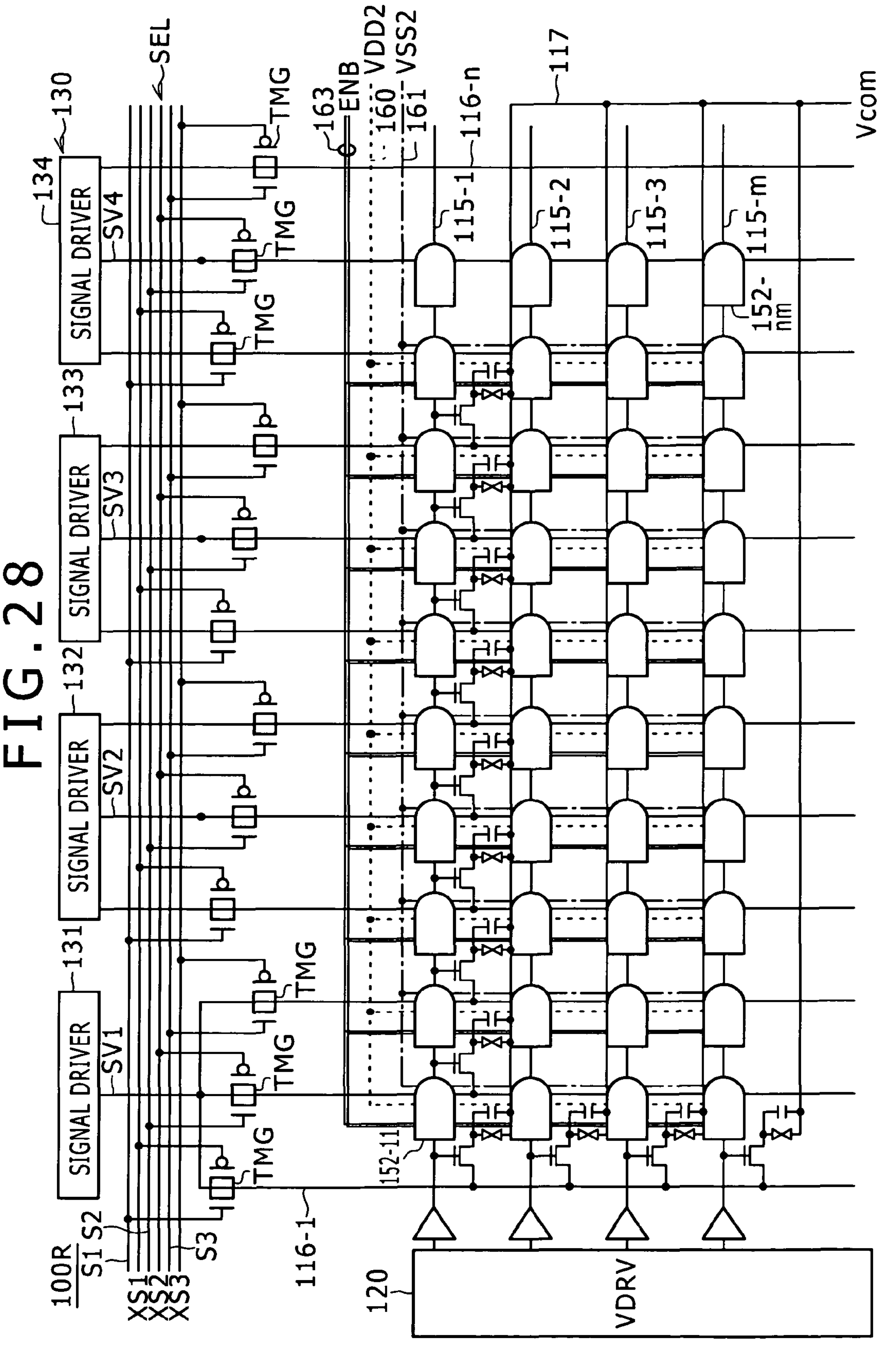

FIG. 28 shows an example of a configuration of a liquid crystal display apparatus according to a nineteenth embodiment of the present invention.

Referring to FIG. 28, the liquid crystal display apparatus 100R according to the present nineteenth embodiment is similar in configuration to but different from the liquid crystal display apparatus 1000 according to the sixteenth embodiment described above in that it adopts a configuration which is effective also in a system wherein image data is written time-divisionally into a panel.

Particularly, also where a time-dividing switch is utilized as seen in FIG. 28 in order to reduce the picture frame of the panel, application of the present invention is required where the time division number of the time dividing switch does not sufficiently satisfy an electric characteristic and an image characteristic within a horizontal selection period.

Referring to FIG. 28, the signals SV1 to SV4 from the signal drivers 131 to 134 are transferred to the signal lines 116 (116-1 to 116-12) through the selector SEL having the plural transfer gates TMG.

The conduction state of the transfer gates (analog switches) TMG is controlled by the selection signal S1 and the inverted signal XS1 of the same, the selection signal S2 and the inverted signal XS2 of the same, the selection signal S3 and the inverted signal XS3 of the same, . . . which are supplied from the outside and have complementary levels to each other.

Where such a configuration as described above is adopted, it is possible for an active matrix display apparatus of the high-definition (UXGA) and high-speed frame rate type to adopt a selector time divisional driving system which decreases the number of connection terminals and improves the mechanical reliance of connections.

The configuration of the other part of the present nineteenth embodiment is similar to that of the sixteenth embodiment, and also effects similar to those achieved by the fourteenth to sixteenth embodiments described above can be achieved.

<Twentieth Embodiment>

Figures 29A, 29B, 29C:
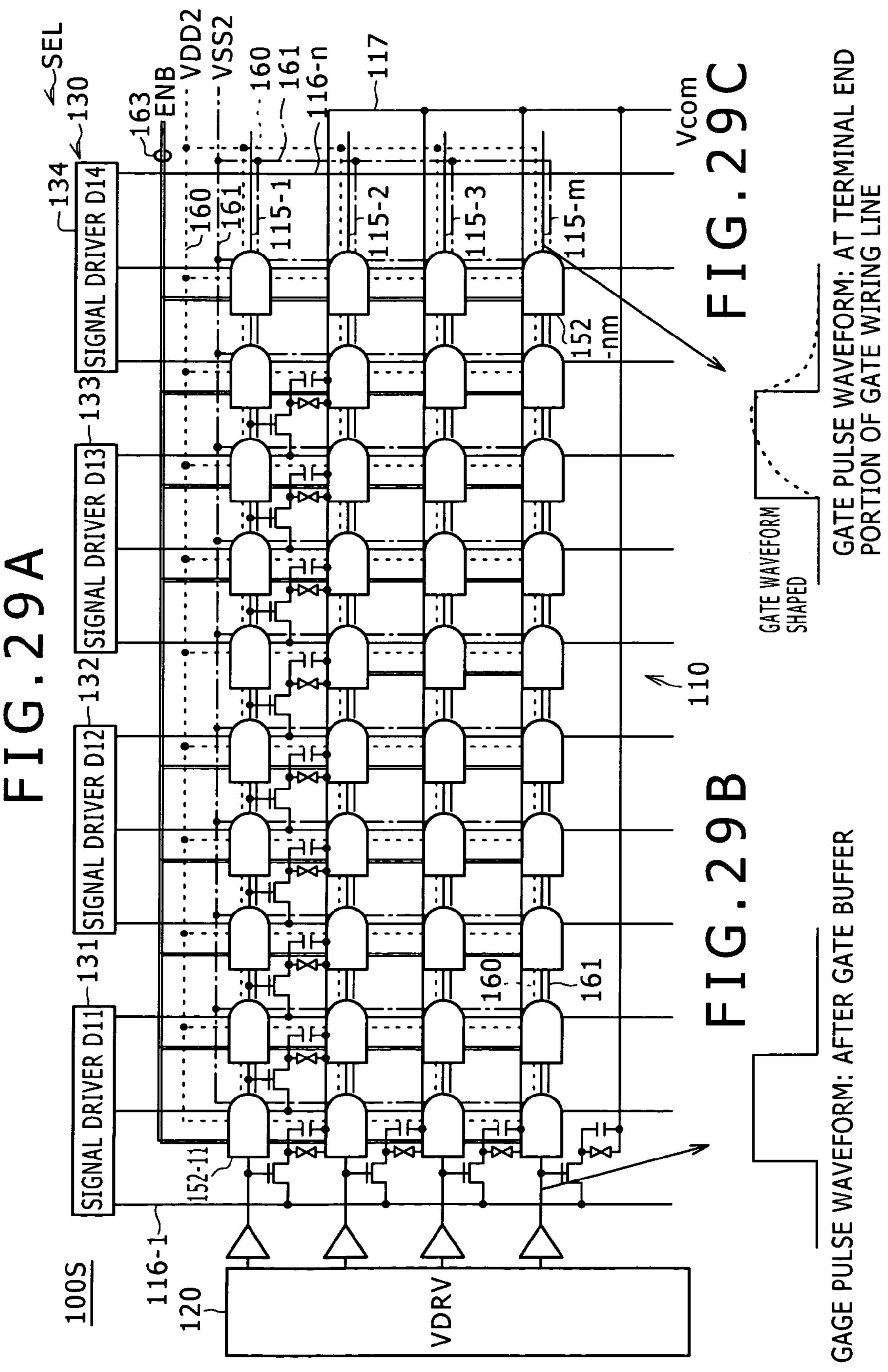
FIGS. 29A, 29B, and 29C are a circuit diagram and waveform diagrams showing an example of a configuration of a liquid crystal display apparatus according to a twentieth embodiment of the present invention and examples of a gate pulse waveform, respectively.

FIGS. 29A, 29B, and 29C show an example of a configuration of a liquid crystal display apparatus according to a twentieth embodiment of the present invention and examples of a gate pulse waveform, respectively.

Referring first to FIG. 29A, the liquid crystal display apparatus 100S according to the present twentieth embodiment is similar in configuration to but different from the liquid crystal apparatus 1000 according to the sixteenth embodiment described hereinabove in the following point.

In particular, in the liquid crystal display apparatus 100S according to the present twentieth embodiment, the supply line 160 for the power supply voltage VDD2 and the supply line 161 for the power supply voltage VSS2 are wired also between all of the signal lines 116 (116-1 to 116-m) and all of the gate lines 115 (115-1 to 115-m).

Where the configuration described above is adopted, invasion of an undesirable voltage into an adjacent pixel circuit 111 which occurs between a gate line and a signal line can be prevented. Consequently, good picture quality can be obtained.

The configuration of the other part of the present twentieth embodiment is similar to that of the tenth embodiment, and also effects similar to those achieved by the fourteenth and sixteenth embodiments described above can be achieved.

It is to be noted that, although a wiring scheme of the voltage supply lines in the twentieth embodiment is not shown in FIG. 29A, the configuration of the twentieth embodiment can be applied also to the other fourteenth, fifteenth and seventeenth to nineteenth embodiments. Also in this instance, invasion of an undesirable voltage into an adjacent pixel circuit 111 can be prevented, and an effect that good picture quality can be obtained can be achieved.

An arrangement position, a configuration, a power supply line scheme and so forth of the waveform shaping circuits 150, 151, and 152 on an equivalent circuit in the first to twentieth embodiments of the present invention are described above.

In the following, an arrangement position of the waveform shaping circuits 150, 151, and 152 on a device is described.

In the present embodiment, in a liquid crystal display apparatus of the transmission type, basically the waveform shaping circuits 150, 151, and 152 are disposed just below a black color filter mask.

Meanwhile, in a liquid crystal display apparatus of the reflection type or the transmission and reflection type, the waveform shaping circuits 150, 151, and 152 are disposed in a reflection region.

Figure 30A:
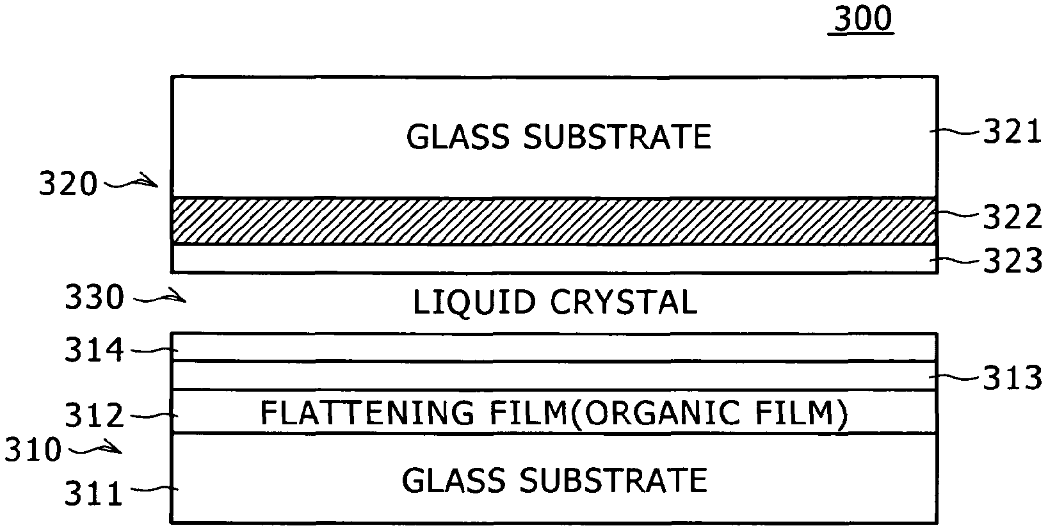
FIGS. 30A and 30B are sectional views of a transmission type liquid crystal display apparatus.
Figure 30B:
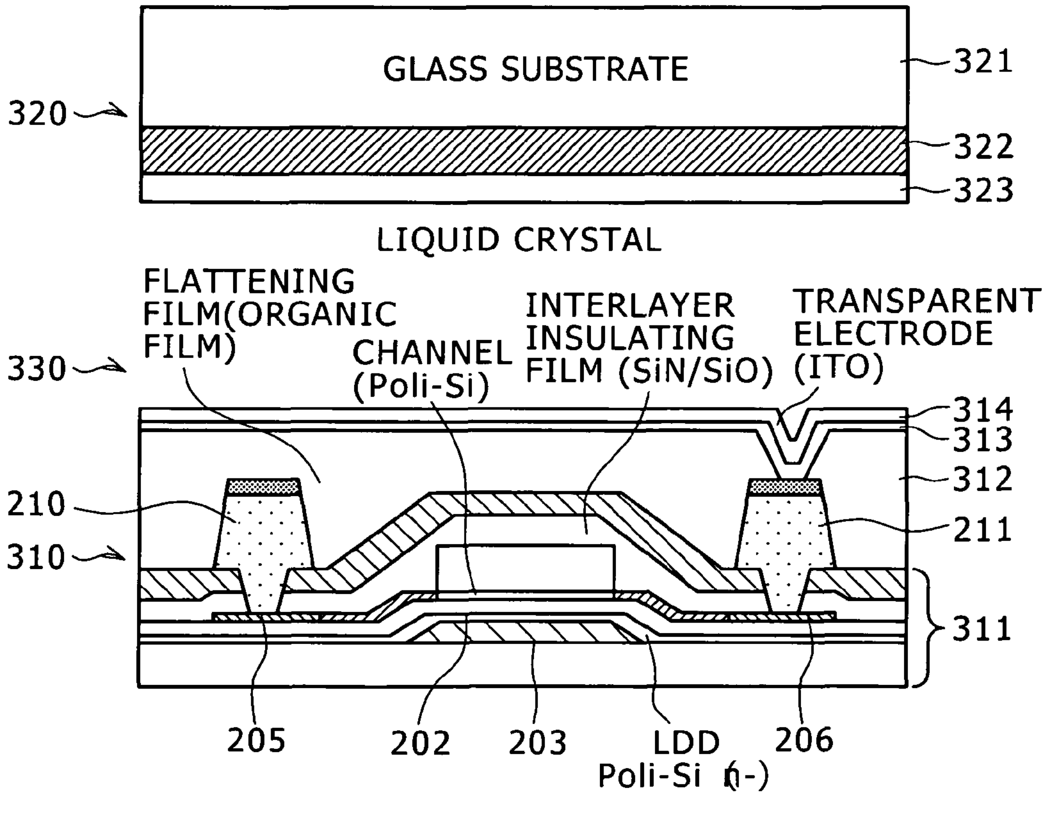

FIGS. 30A and 30B show a liquid crystal display apparatus of the transmission type.

Referring to FIGS. 30A and 30B, the transmission type liquid crystal display apparatus 300 shown includes such a bottom gate type TFT as described hereinabove with reference to FIG. 3 and is configured such that a liquid crystal layer 330 is sandwiched between a TFT substrate 310 and an opposing substrate 320.

As seen in FIG. 30A, the TFT substrate 310 includes a glass substrate 311, a flattening film 312 formed on the glass substrate 311, a transparent electrode 313 formed on the flattening film 312, and an orientation film 314 formed on the transparent electrode 313.

The opposing substrate 320 includes a glass substrate 321, a light blocking region 322 formed on the glass substrate 321, and an orientation film 323 formed on the light blocking region 322.

It is to be noted that, in FIG. 30B, like elements as those in FIG. 3 are denoted by like reference numerals. Further, since the structure itself of the TFT is described hereinabove, overlapping description thereof is omitted herein to avoid redundancy.

Figure 31:
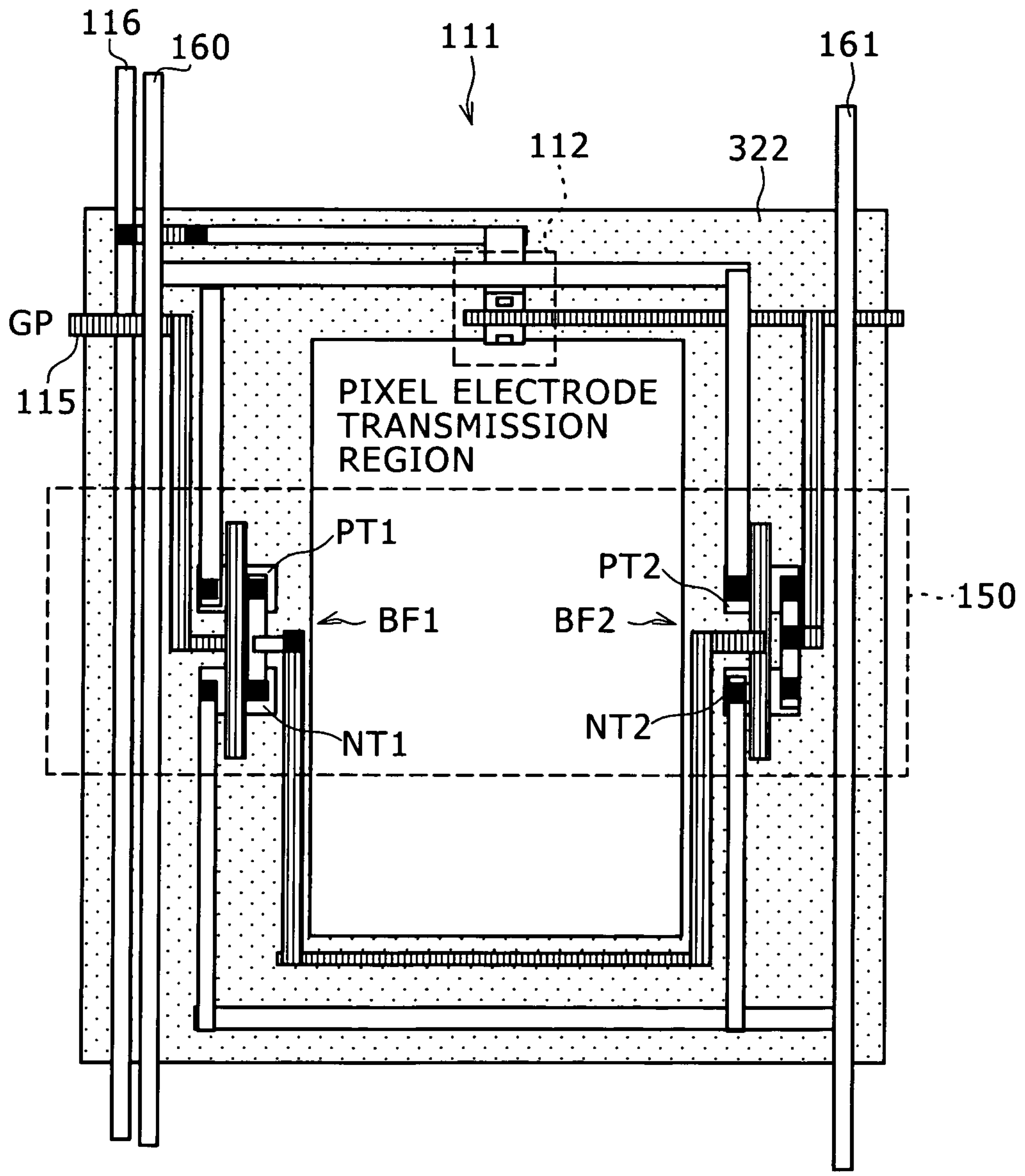
FIGS. 31, 32, 33, and 34 are plan views showing first, second, third, and fourth examples of a pixel circuit of a transmission type liquid crystal display apparatus where the waveform shaping circuit of FIG. 5A is adopted.

FIG. 31 shows a first example of a pixel circuit of the transmission type liquid crystal display apparatus where the waveform shaping circuit described hereinabove with reference to FIGS. 5A to 5C is adopted.

As seen in FIG. 31, the components PT1, PT2, NT1, and NT2 and wiring lines of the waveform shaping circuit 150 are disposed just below the light blocking region 322 formed from a black color filter mask.

In the present example, a gate pulse GP inputted in positive logic is applied in positive logic to the gate of the TFT 112 of the pixel circuit 111 after it passes through the buffers BF1 and BF2.

Since the waveform shaping circuit 150 is formed from a polycrystalline silicon TFT (thin film transistor), light from the backlight is blocked by the waveform shaping circuit 150, and this makes a cause of drop of the transmission factor of the pixel.

Therefore, some dispersion in luminance is likely to occur with a certain pixel which includes the waveform shaping circuit 150 formed from a TFT (thin film transistor) and the power supply lines 160 and 161 of the voltages VDD2 and VSS2 for the waveform shaping circuit 150.

Therefore, the light blocking region 322 formed from a black color filter mask for reducing the luminance dispersion among the pixels is placed above the circuit to fix the transmission factor thereby to suppress the luminance dispersion.

Figure 32:
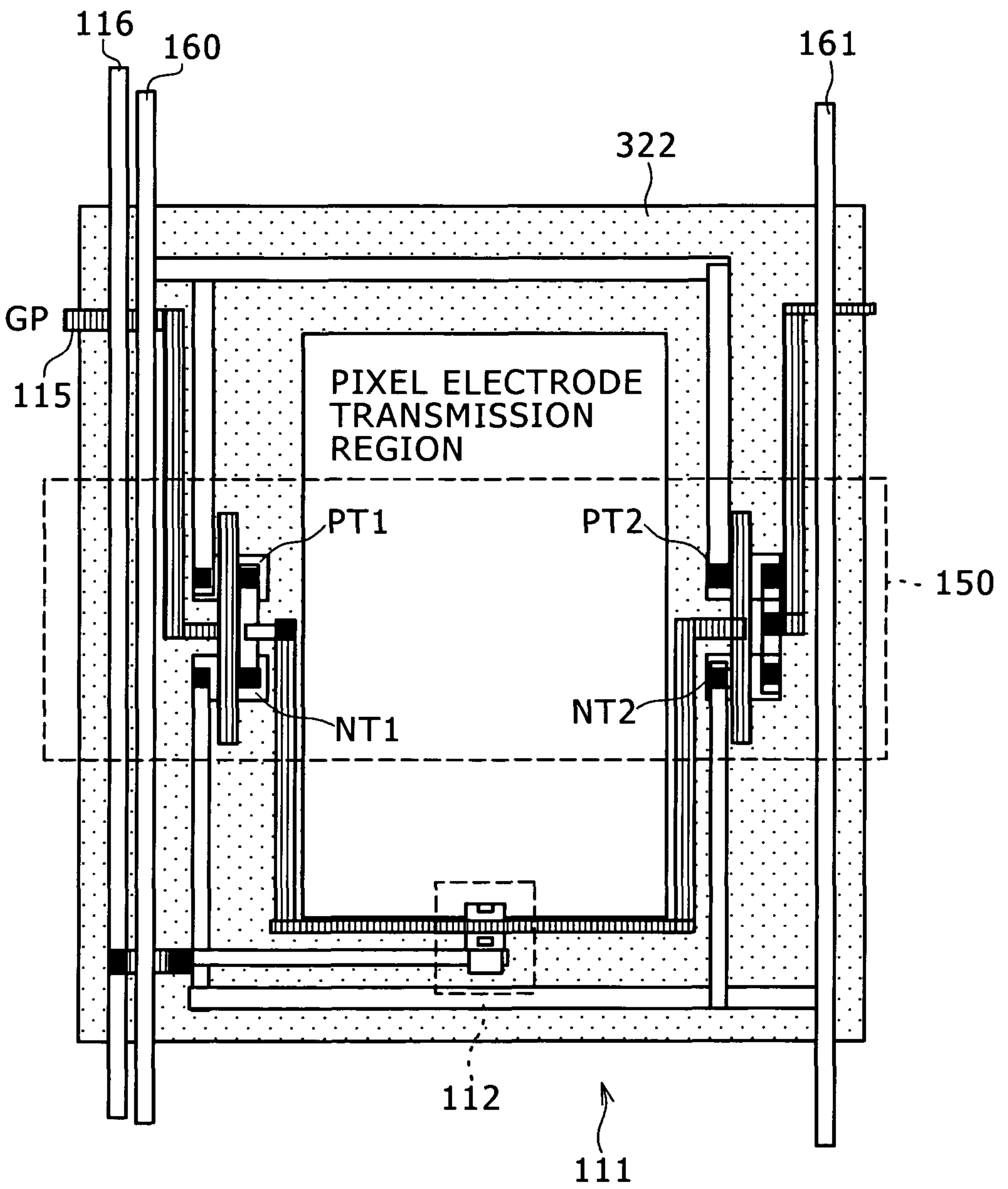

FIG. 32 shows a second example of a pixel circuit of the transmission type liquid crystal display apparatus where the waveform shaping circuit described hereinabove with reference to FIGS. 5A to 5C is adopted.

The second example is similar to but different from the first example of FIG. 31 in that it reverses the level of a gate pulse GP inputted in negative logic by means of the buffer BF1 so that the gate pulse GP is applied in positive logic to the gate of the TFT 112 of the pixel circuit 111. Then, the gate pulse GP is outputted in negative logic through the buffer BF2.

Accordingly, the pixel circuit 111 is positioned between the output of the buffer BF1 and the input of the buffer BF2.

Figure 33:
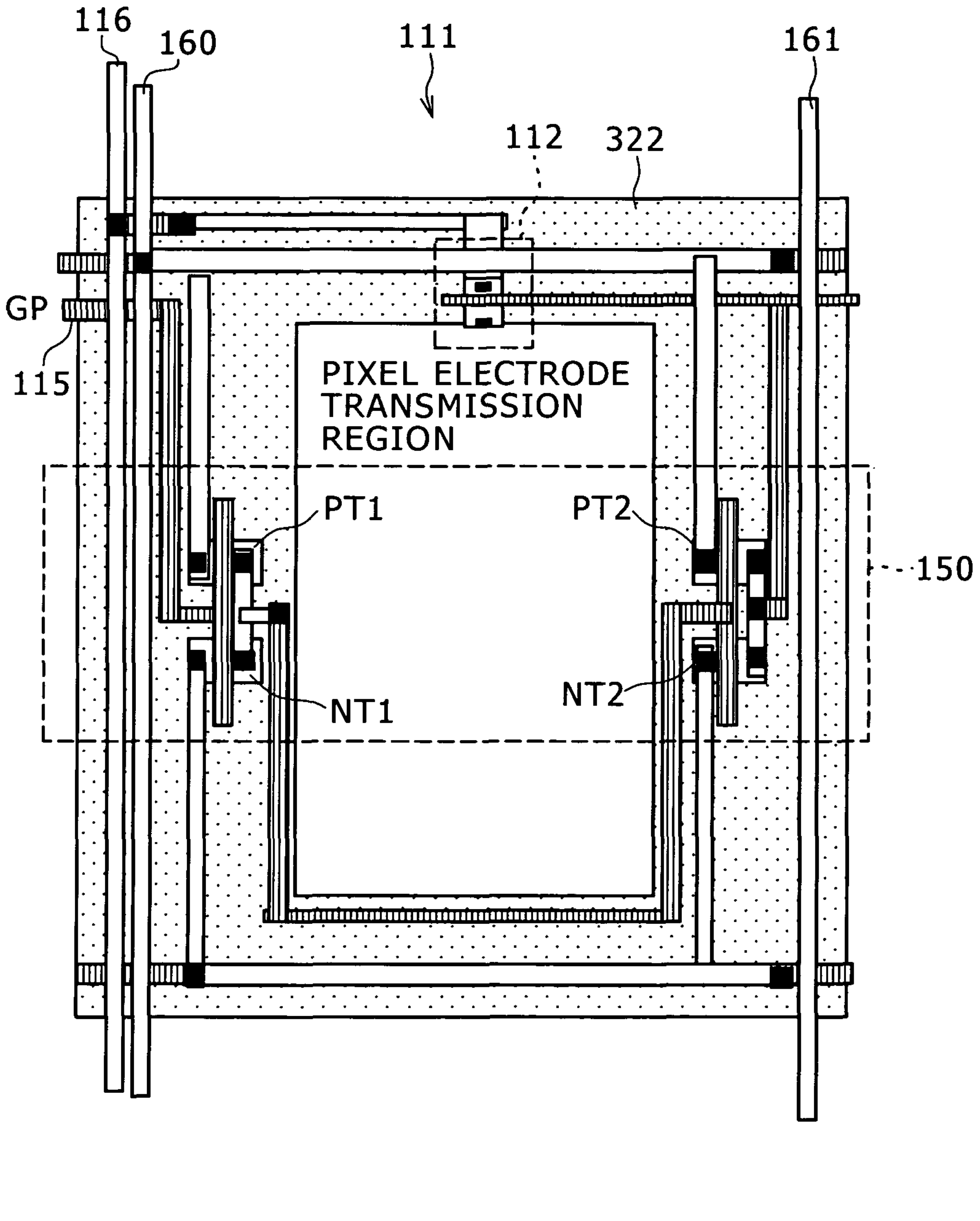

FIG. 33 shows a third example of a pixel circuit of the transmission type liquid crystal display apparatus where the waveform shaping circuit described hereinabove with reference to FIGS. 5A to 5C is adopted.

The third example is similar to but different from the first example of FIG. 31 in that it is configured so as to prevent invasion of an undesirable voltage from a signal line 116 and a gate line 115.

In particular, in the present third example, the signal line 116 and the gate line 115 are sandwiched between the supply line 160 for the power supply voltage VDD2 and the supply line 161 for the reference voltage VSS2 so as to prevent invasion of an undesirable voltage from the signal line 116 and the gate line 115.

Figure 34:
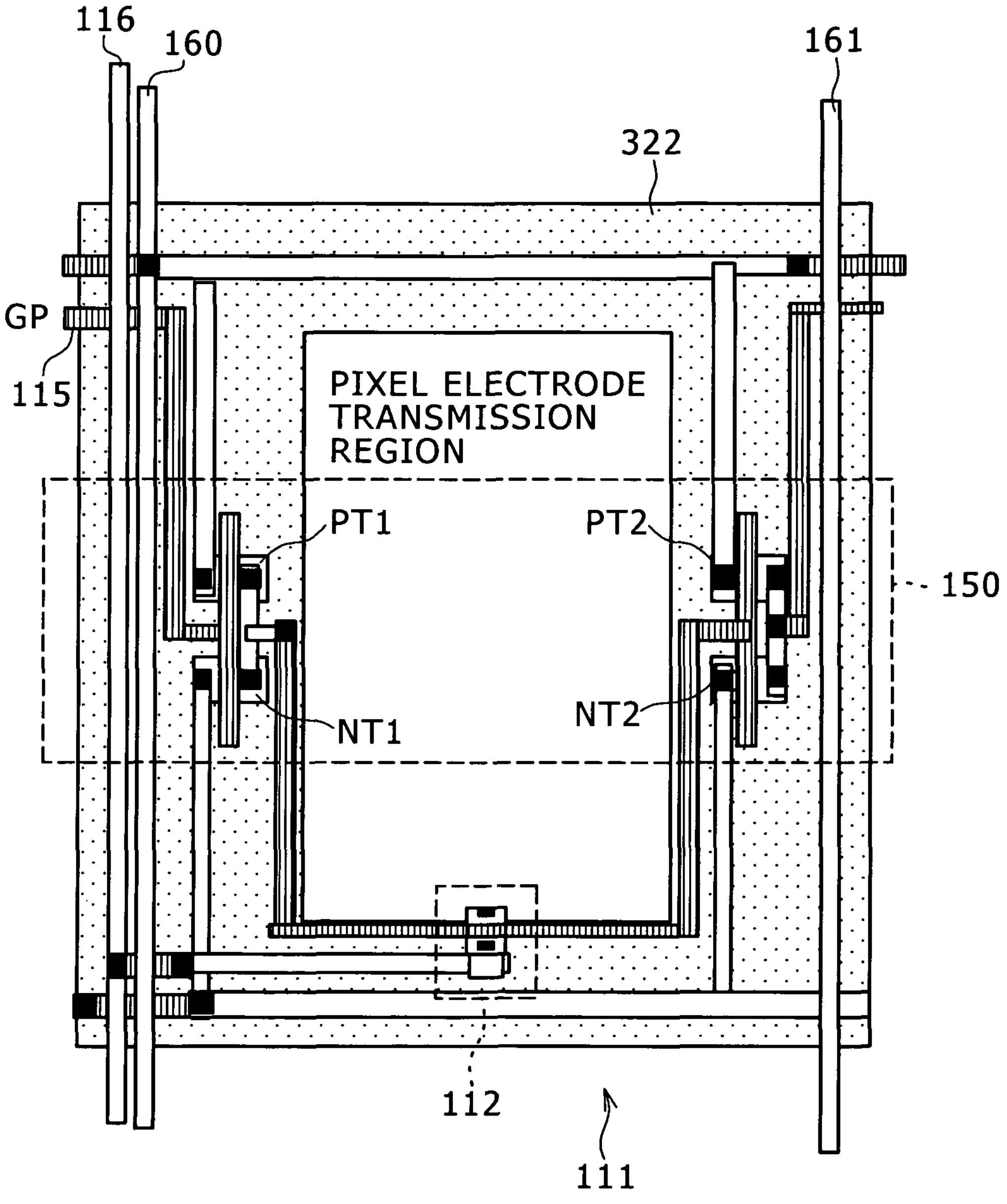

FIG. 34 shows a fourth example of a pixel circuit of the transmission type liquid crystal display apparatus where the waveform shaping circuit described hereinabove with reference to FIGS. 5A to 5C is adopted.

The fourth example is similar to but different from the second example of FIG. 32 in that it is configured so as to prevent invasion of an undesirable voltage from a signal line 116 and a gate line 115.

In particular, in the present third example, the signal line 116 and the gate line 115 are sandwiched between the supply line 160 for the power supply voltage VDD2 and the supply line 161 for the reference voltage VSS2 so as to prevent invasion of an undesirable voltage from the signal line 116 and the gate line 115.

Figures 35A, 35B:
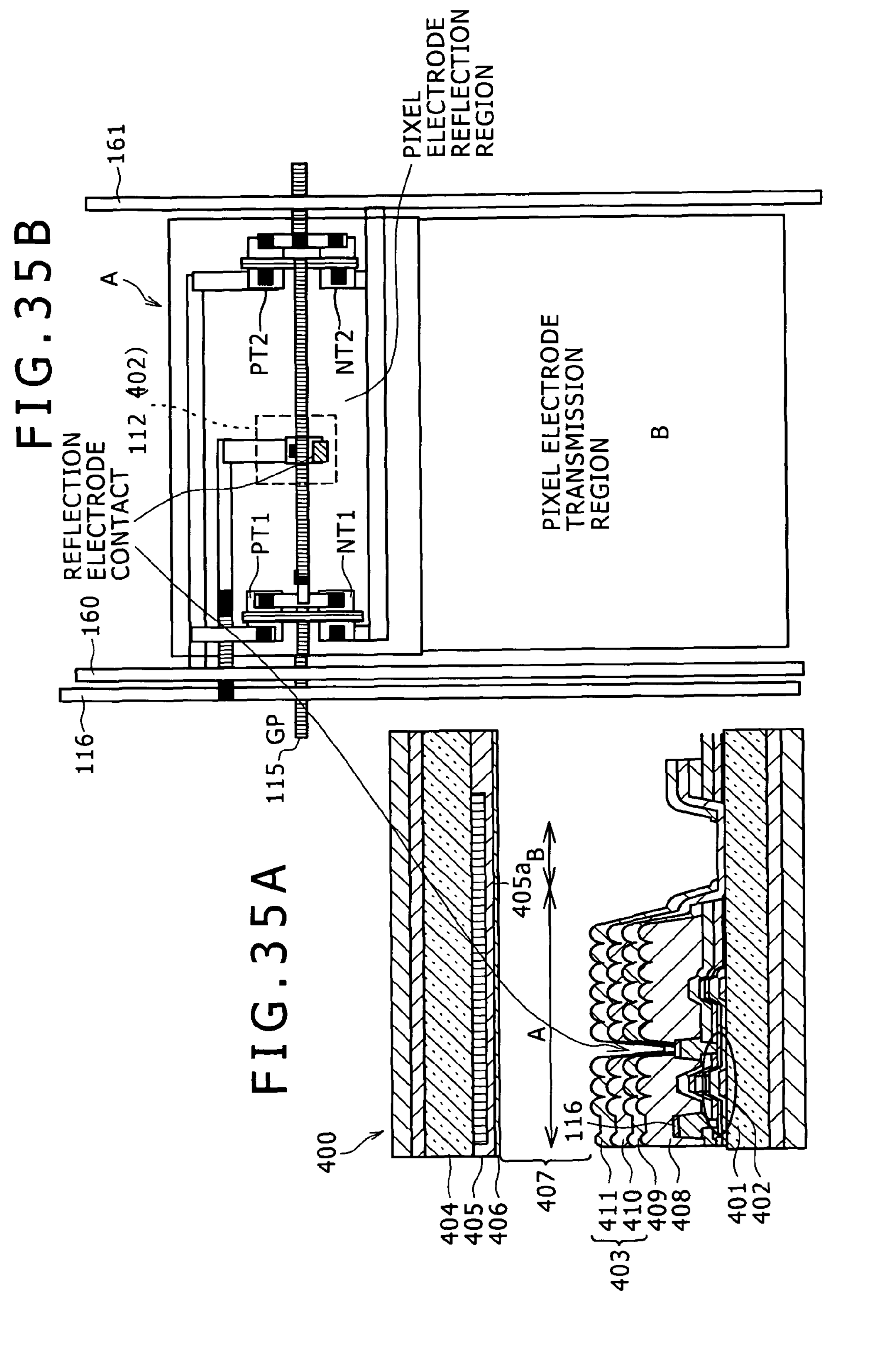
FIGS. 35A and 35B are a sectional view of a pixel circuit of a transmission and reflection type liquid crystal display apparatus and a plan view showing a first example of a pixel circuit of the transmission and reflection type liquid crystal display apparatus where the waveform shaping circuit of FIG. 5A is adopted, respectively.

FIG. 35A shows a pixel circuit of a transmission and reflection type liquid crystal display apparatus, and FIG. 35B shows a first example of the pixel circuit of the transmission and reflection type liquid crystal display apparatus where the waveform shaping circuit described hereinabove with reference to FIGS. 5A to 5C is adopted.

Referring first to FIG. 35A, the transmission and reflection type liquid crystal display apparatus 400 shown includes a transparent insulating substrate 401, a thin film transistor (TFT) 402, a pixel region 403, and so forth formed on the transparent insulating substrate 401.

The transmission and reflection type liquid crystal display apparatus 400 further includes a transparent insulating substrate 404 disposed in an opposing relationship to the transparent insulating substrate 401, TFT 402, and pixel region 403. The transmission and reflection type liquid crystal display apparatus 400 further includes an overcoat layer 405, a color filter 405*a*, an opposing electrode 406, and a liquid crystal layer 407 formed on the transparent insulating substrate 404. The liquid crystal layer 407 is sandwiched between the pixel region 403 and the opposing electrode 406.

Such pixel regions 403 are disposed in a matrix, and gate lines 115 for supplying a gate pulse GP to the TFTs 402 and signal lines 116 for supplying a display signal to the TFTs 402 are provided in a perpendicularly intersecting relationship to each other around the individual pixel regions 403 thereby to form the pixel section.

Further, holding capacitor wiring lines (hereinafter referred to as CS lines) each formed from a metal wire are provided on the transparent insulating substrate 401 and TFTs 402 side such that they extend in parallel to the gate lines 115. The CS lines cooperate with the pixel electrodes to form holding capacitors CS and are connected to the opposing electrodes 406.

Further, a reflection region A to be used for reflection type display and a transmission region B to be used for transmission type display are provided in each pixel region 403.

The transparent insulating substrate 401 is formed from a transparent material such as, for example, glass. The TFTs 402, a diffusion layer 408 and a flattening layer 409 are formed on the transparent insulating substrate 401. In particular, the diffusion layer 408 is formed on the TFT 402 with an insulating film interposed therebetween, and the flattening layer 409 is formed on the diffusion layer 408. Further, a transparent electrode 410 and a reflection electrode 411 are formed on the flattening layer 409. The reflection electrode 411 forms the pixel region 403 which has the reflection region A and the transmission region B described above.

Referring now to FIG. 35B, the components PT1, PT2, NT1, and NT2 and the wiring lines of the waveform shaping circuit 150 are disposed in the reflection region A.

Since the waveform shaping circuit 150 is formed from a polycrystalline silicon TFT (thin film transistor) as described hereinabove, light from the backlight is blocked by the waveform shaping circuit 150, and this makes a cause of drop of the transmission factor of the pixel.

In this connection, a method is available wherein, where an article which does not pass light of the backlight therethrough like reflection liquid crystal, the waveform shaping circuit 150 is positively disposed just below the reflecting region of the reflection liquid crystal.

By the arrangement of the waveform shaping circuit 150, the degree of freedom of the TFT layout for forming CMOS used for the waveform shaping circuits 150 increases significantly in comparison with that of the transmission type. Consequently, since the width of power supply lines such as those for the power supply voltage VDD2 and the reference voltage VSS2 can be increased, delay of a CMOS output by power supply line resistance becomes less likely to occur.

Figures 36A, 36B:
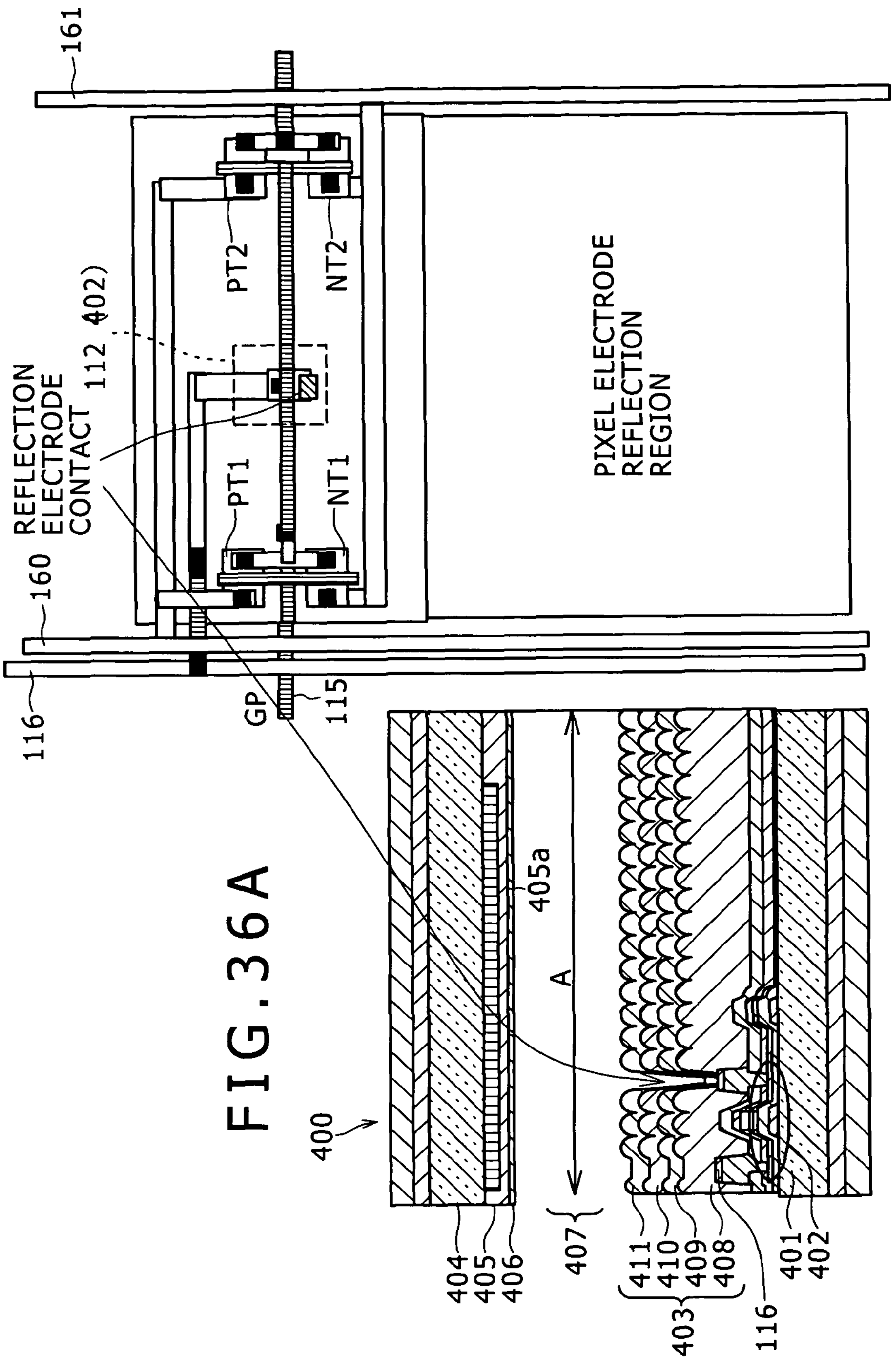
FIGS. 36A and 36B are a sectional view of a pixel circuit of a reflection type liquid crystal display apparatus and a plan view showing a first example of a pixel circuit of the reflection type liquid crystal display apparatus where the waveform shaping circuit of FIG. 5A is adopted, respectively.

FIG. 36A shows a pixel circuit of a reflection type liquid crystal display apparatus, and FIG. 35B shows a first example of the pixel circuit of the reflection type liquid crystal display apparatus where the waveform shaping circuit described hereinabove with reference to FIGS. 5A to 5C is adopted.

The device structure of the pixel circuit of the reflection type liquid crystal display apparatus is similar to that of the transmission and reflection type liquid crystal display apparatus except that it does not have the transmission region B. Therefore, overlapping description of the device structure is omitted herein to avoid redundancy.

Also in this instance, the components PT1, PT2, NT1, and NT2 and the wiring lines of the waveform shaping circuit 150 are disposed in the reflection region A as seen in FIG. 36B.

Figure 37:
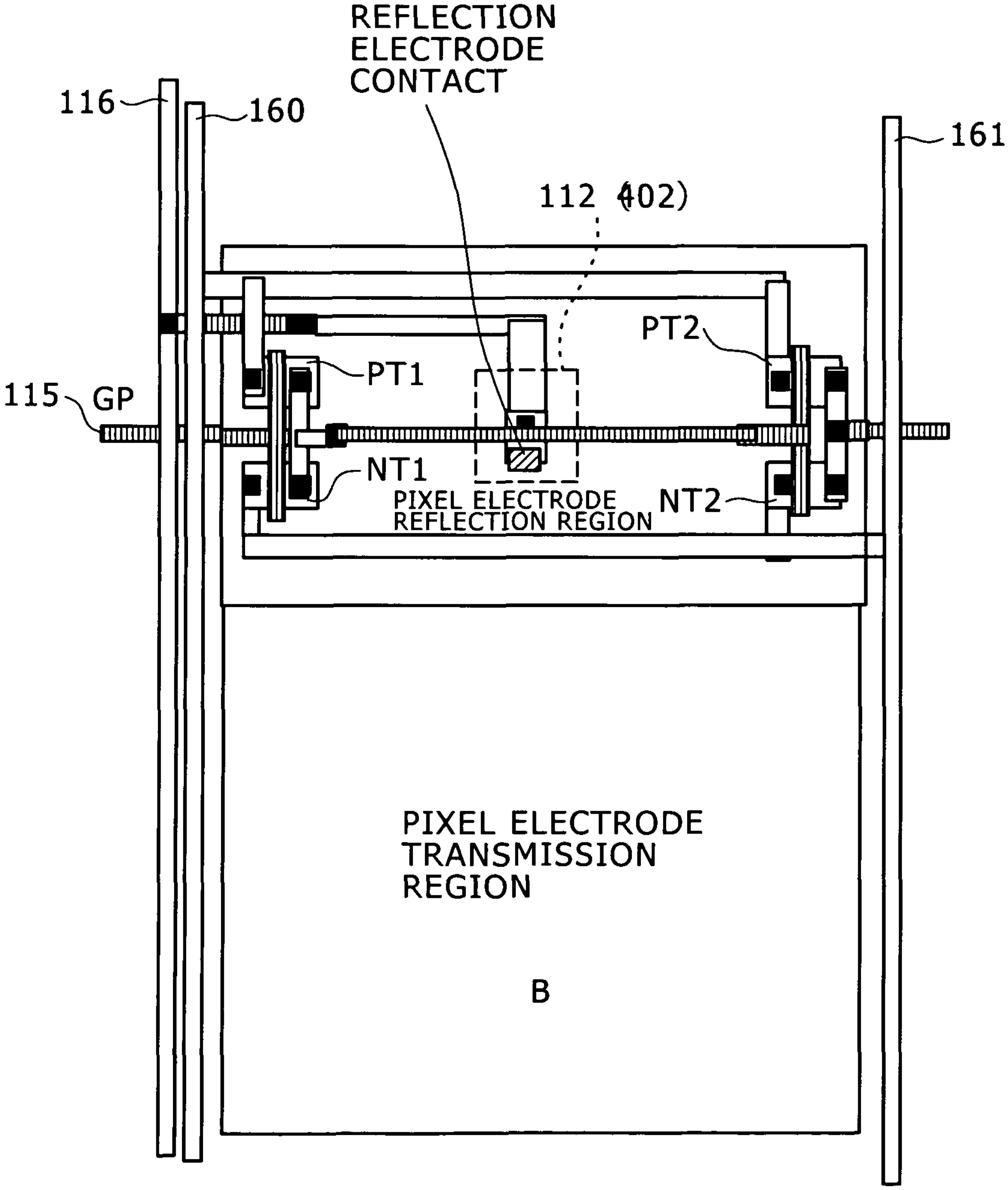
FIG. 37 is a plan view showing a second example of the pixel circuit of the transmission and reflection type liquid crystal display apparatus where the waveform shaping circuit of FIG. 5 is adopted.

FIG. 37 shows a second example of a pixel circuit of a transmission and reflection type liquid crystal display apparatus where the waveform shaping circuit described hereinabove with reference to FIGS. 5A to 5C is adopted.

The second example is similar to but different from the first example of FIGS. 35A and 35B in that it is configured so as to prevent invasion of an undesirable voltage from the signal line 116 and the gate line 115.

In particular, in the present example, the signal line 116 and the gate line 115 are sandwiched by a supply line 160 for the power supply voltage VDD2 and a supply line 161 for the reference voltage VSS2 so as to prevent invasion of an undesirable voltage from the signal line 116 and the gate line 115.

Figure 38:
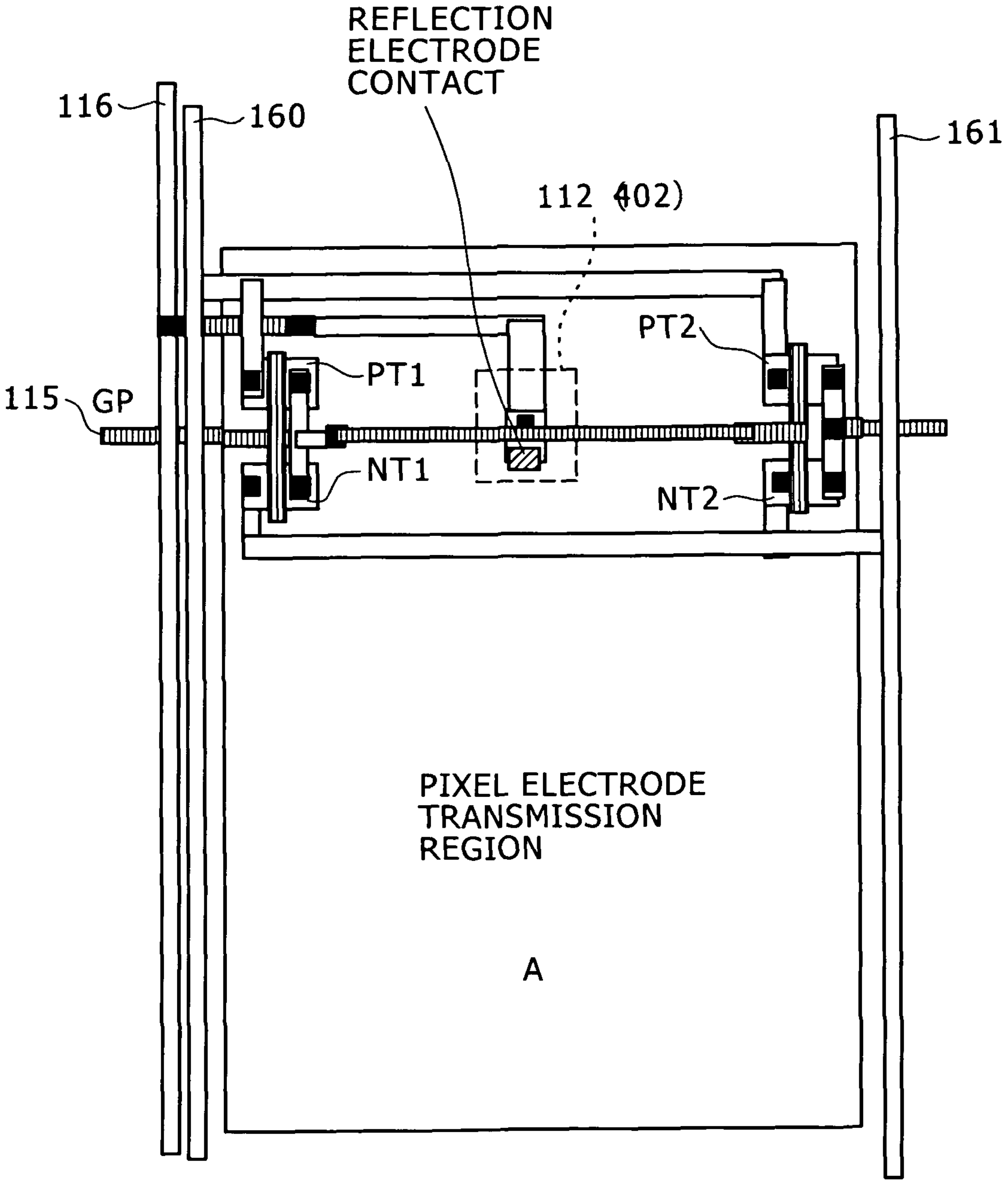
FIG. 38 is a plan view showing a second example of the pixel circuit of the reflection type liquid crystal display apparatus where the waveform shaping circuit of FIG. 5 is adopted.

FIG. 38 shows a second example of a pixel circuit of the reflection type liquid crystal display apparatus where the waveform shaping circuit described hereinabove with reference to FIGS. 5A to 5C is adopted.

The second example is similar to but different from the first example of FIG. 36 in that it is configured so as to prevent invasion of an undesirable voltage from a signal line 116 and a gate line 115.

In particular, in the present second example, the signal line 116 and the gate line 115 are sandwiched between the supply line 160 for the power supply voltage VDD2 and the supply line 161 for the reference voltage VSS2 so as to prevent invasion of an undesirable voltage from the signal line 116 and the gate line 115.

Figure 39:
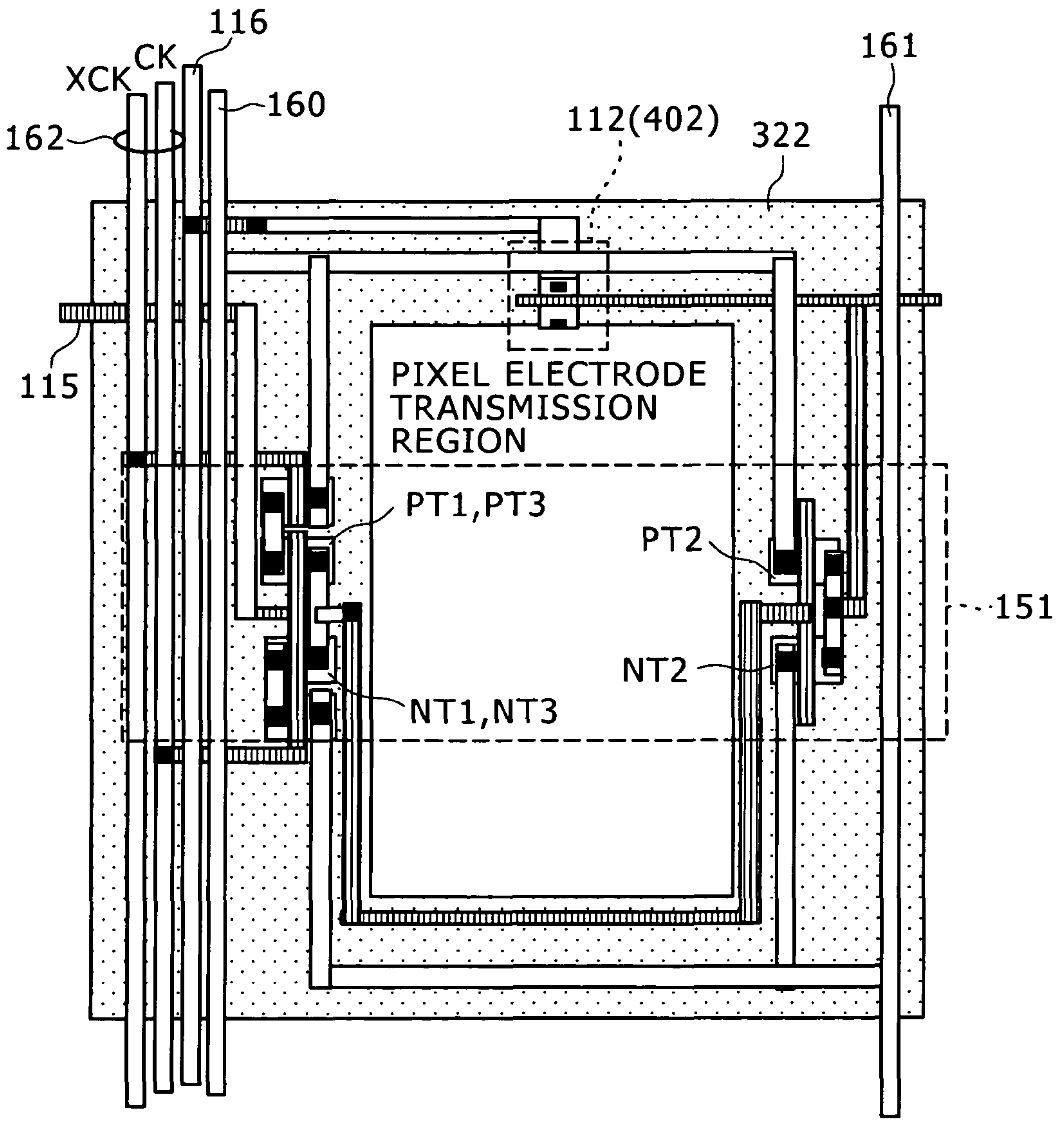
FIGS. 39, 40, 41, and 42 are plan views showing first, second, third, and fourth examples of a pixel circuit of the transmission type liquid crystal display apparatus where the waveform shaping circuit of FIG. 13 is adopted.

FIG. 39 shows a first example of a pixel circuit of the transmission type liquid crystal display apparatus where the waveform shaping circuit described hereinabove with reference to FIGS. 13A to 13C is adopted.

As seen in FIG. 39, the components PT1, PT2, PT3, NT1, NT2, and NT3 and wiring lines of the waveform shaping circuit 151 are disposed just below the light blocking region 322 formed from a black color filter mask.

In the present example, a gate pulse GP inputted in positive logic is applied in positive logic to the gate of the TFT 112 of the pixel circuit 111 after it passes through the buffers BF3 and BF2.

Since the waveform shaping circuit 151 is formed from a polycrystalline silicon TFT (thin film transistor), light from the backlight is blocked by the waveform shaping circuit 151, and this makes a cause of drop of the transmission factor of the pixel.

Therefore, a dispersion in luminance is likely to occur with a certain pixel which includes the waveform shaping circuit 151 formed from a TFT (thin film transistor) and the power supply lines 160 and 161 of the voltages VDD2 and VSS2 for the waveform shaping circuit 151.

Therefore, the light blocking region 322 formed from a black color filter mask for reducing the luminance dispersion among the pixels is placed above the circuit to fix the transmission factor thereby to suppress the luminance dispersion.

Figure 40:
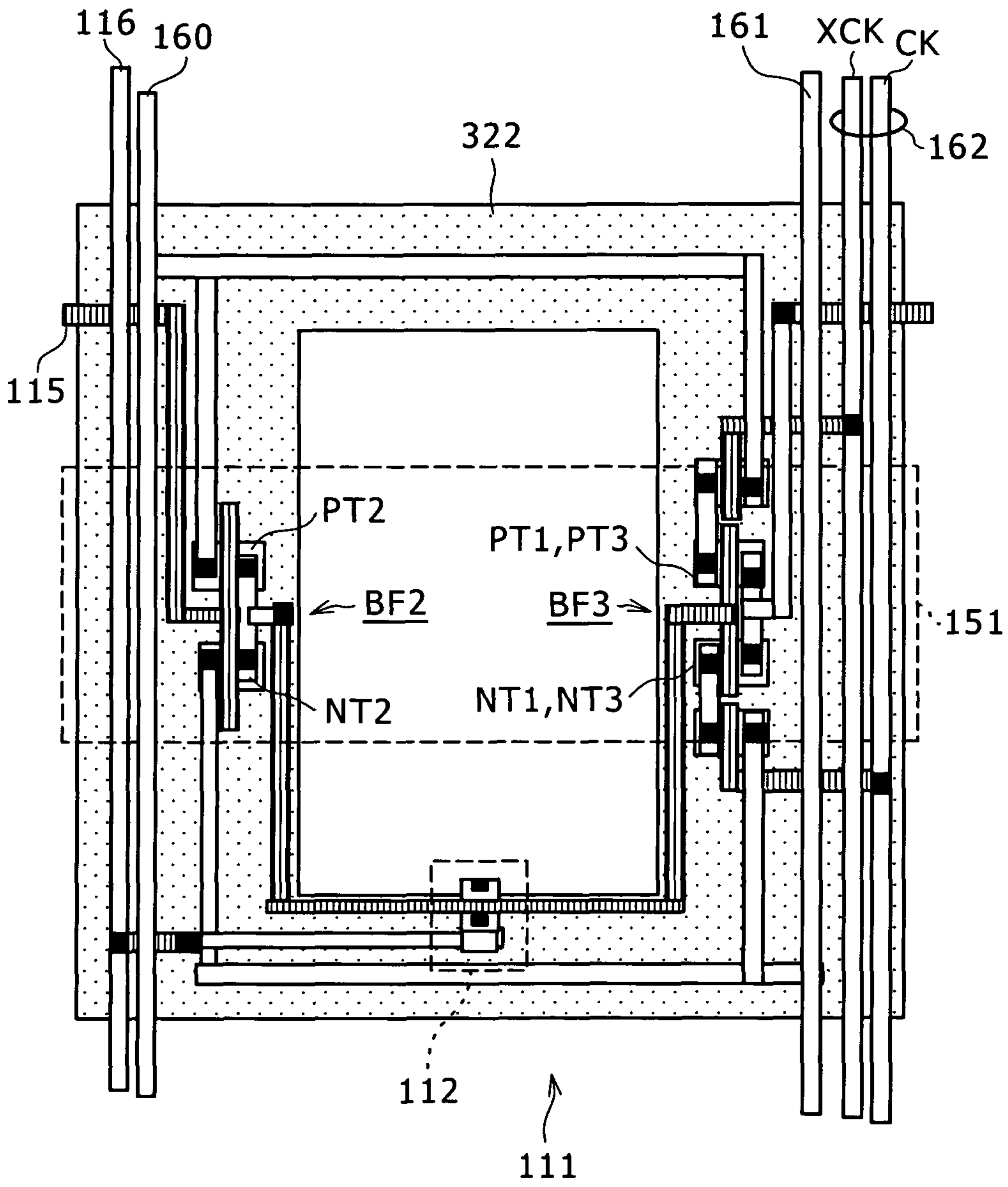

FIG. 40 shows a second example of a pixel circuit of the transmission type liquid crystal display apparatus where the waveform shaping circuit described hereinabove with reference to FIGS. 13A to 13C is adopted.

The second example is similar to but different from the first example of FIG. 39 in that it reverses the level of a gate pulse GP inputted in negative logic by means of the buffer BF3 so that the gate pulse GP is applied in positive logic to the gate of the TFT 112 of the pixel circuit 111. Then, the gate pulse GP is outputted in negative logic through the buffer BF1.

Accordingly, the pixel circuit 111 is positioned between the output of the buffer BF3 and the input of the buffer BF11.

Figure 41:
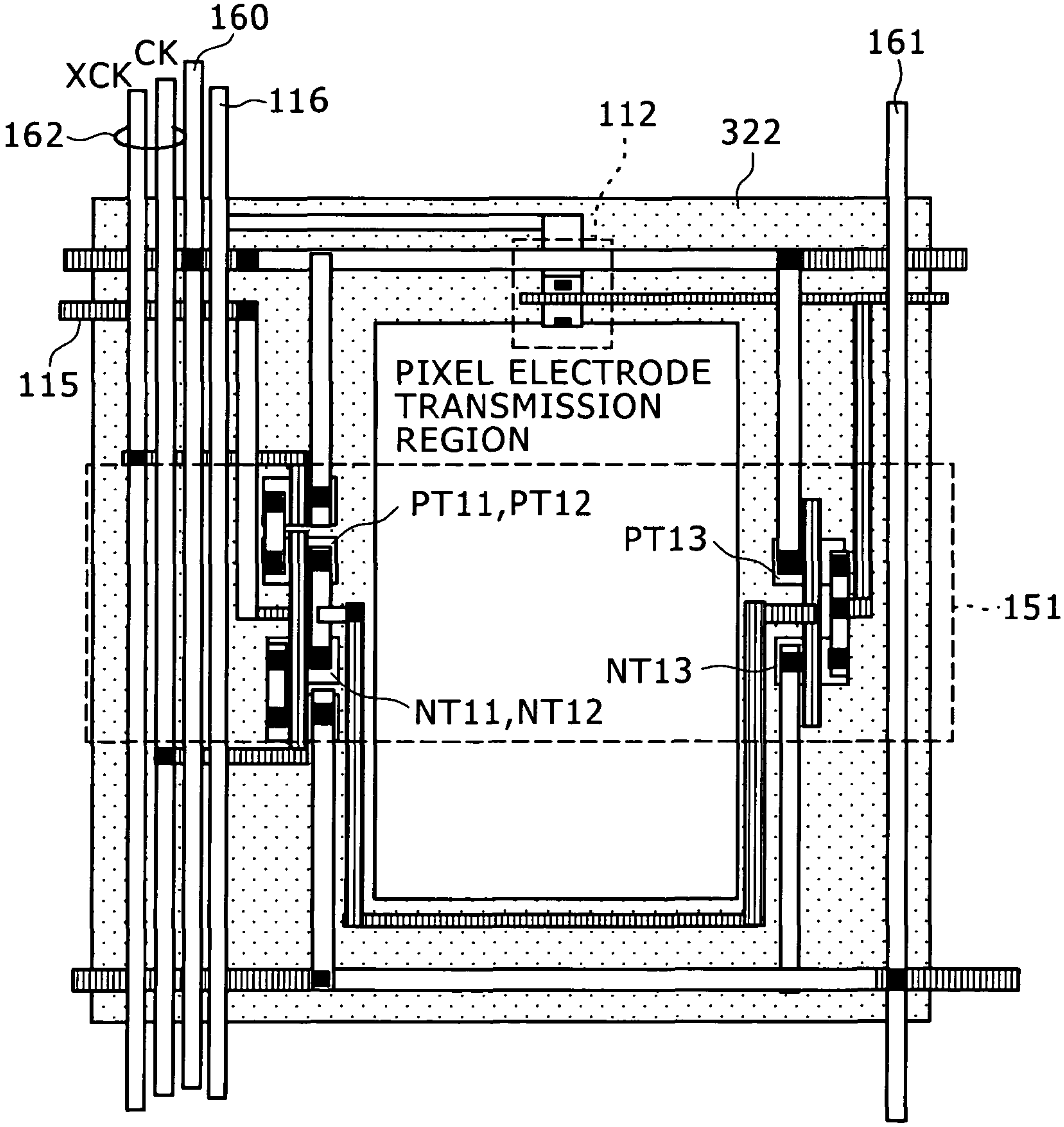

FIG. 41 shows a third example of a pixel circuit of the transmission type liquid crystal display apparatus where the waveform shaping circuit described hereinabove with reference to FIGS. 13A to 13C is adopted.

The third example is similar to but different from the first example of FIG. 39 in that it is configured so as to prevent invasion of an undesirable voltage from a signal line 116 and a gate line 115.

In particular, in the present third example, the signal line 116 and the gate line 115 are sandwiched between the supply line 160 for the power supply voltage VDD2 and the supply line 161 for the reference voltage VSS2 so as to prevent invasion of an undesirable voltage from the signal line 116 and the gate line 115.

Figure 42:
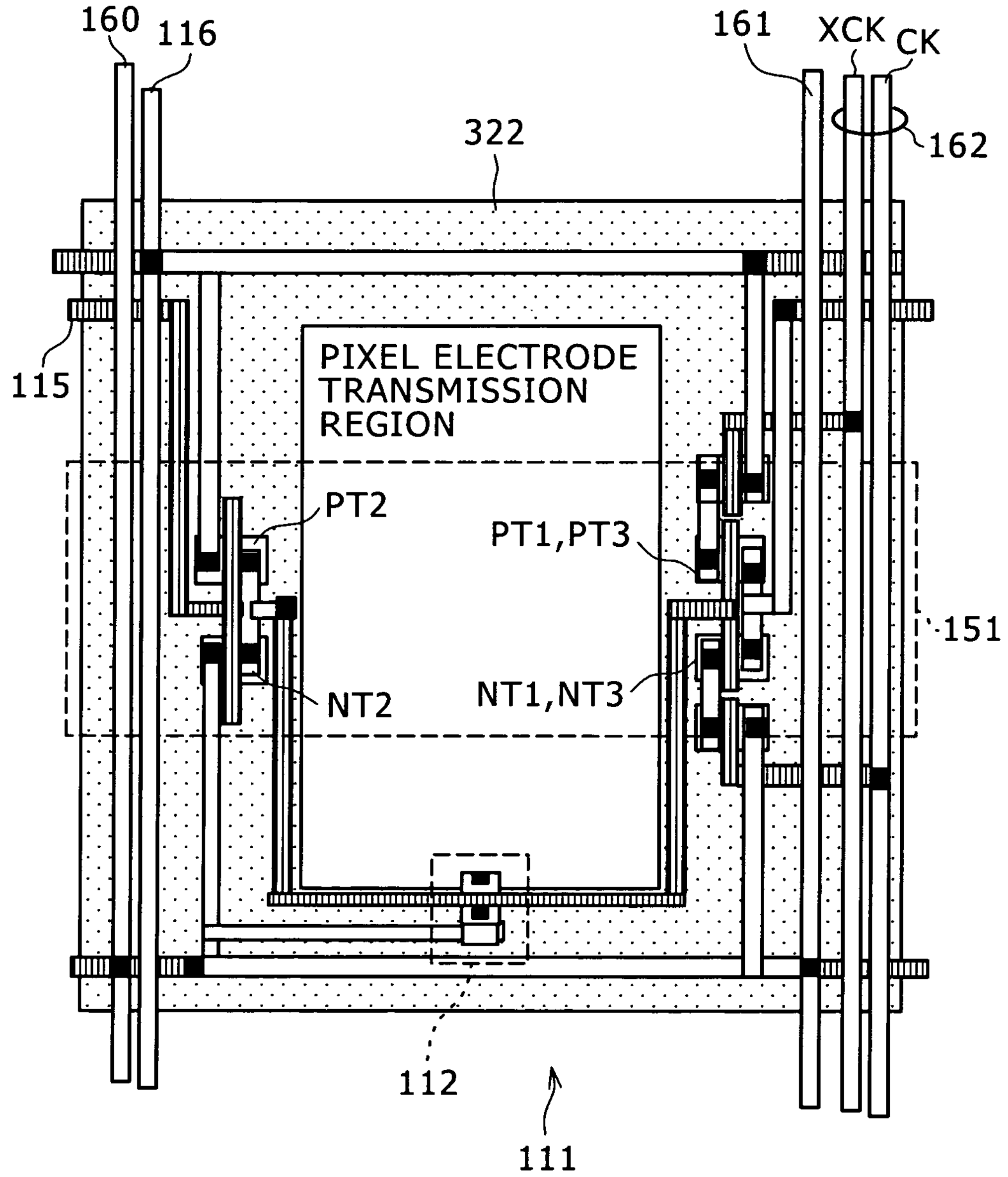

FIG. 42 shows a fourth example of a pixel circuit of the transmission type liquid crystal display apparatus where the waveform shaping circuit described hereinabove with reference to FIGS. 13A to 13C is adopted.

The fourth example is similar to but different from the second example of FIG. 40 in that it is configured so as to prevent invasion of an undesirable voltage from a signal line 116 and a gate line 115.

In particular, in the present fourth example, the signal line 116 and the gate line 115 are sandwiched between the supply line 160 for the power supply voltage VDD2 and the supply line 161 for the reference voltage VSS2 so as to prevent invasion of an undesirable voltage from the signal line 116 and the gate line 115.

Figure 43:
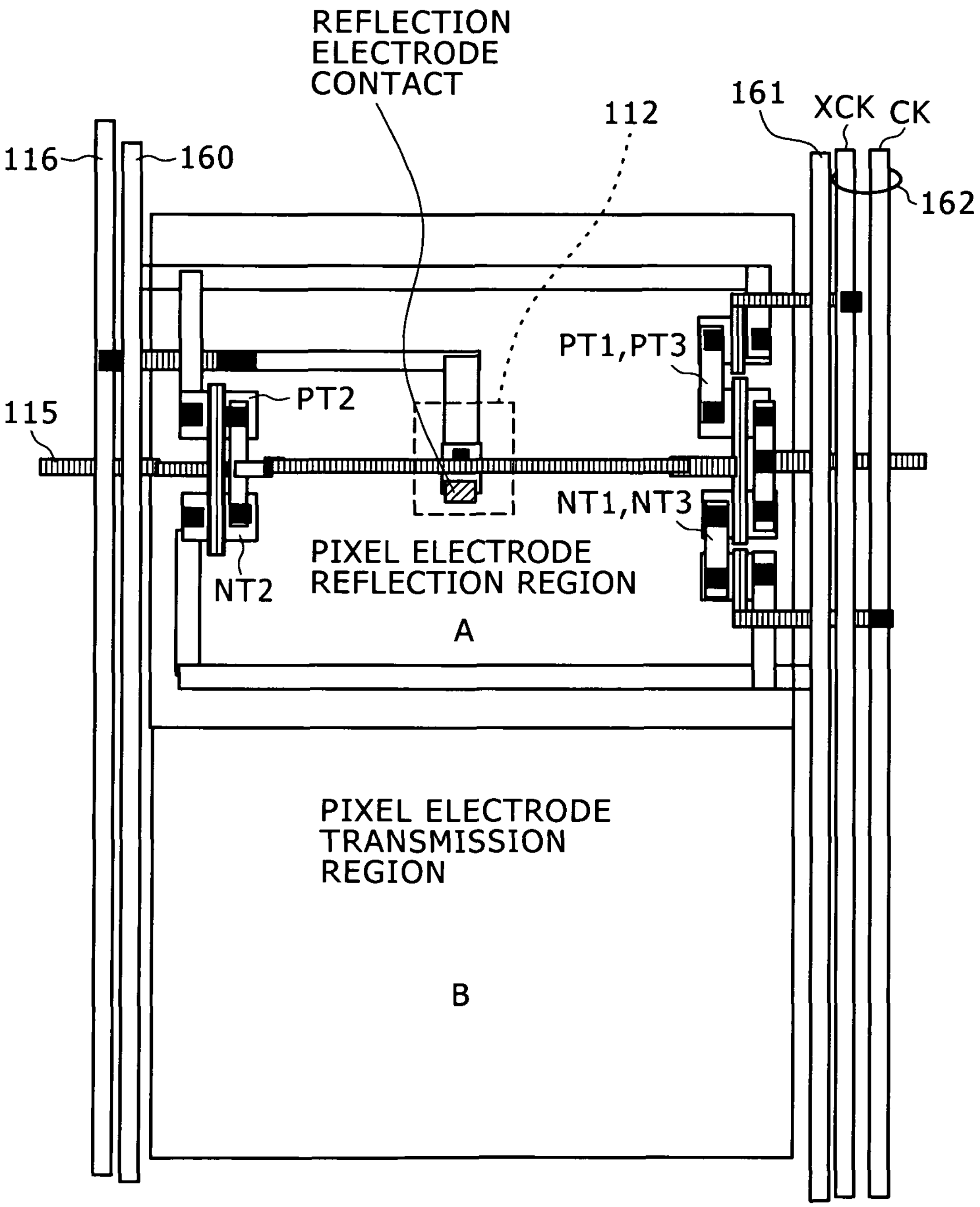
FIG. 43 is a plan view showing a first example of a pixel circuit of the transmission and reflection type liquid crystal display apparatus where the waveform shaping circuit of FIG. 13 is adopted.

FIG. 43 shows a first example of a pixel circuit of the transmission and reflection type liquid crystal display apparatus where the waveform shaping circuit described hereinabove with reference to FIGS. 13A to 13C is adopted.

Referring now to FIG. 43, the components PT1, PT2, PT3, NT1, NT2, and NT3 and the wiring lines of the waveform shaping circuit 151 are disposed in the reflection region A.

Since the waveform shaping circuit 151 is formed from a polycrystalline silicon TFT (thin film transistor) as described hereinabove, light from the backlight is blocked by the waveform shaping circuit 151, and this makes a cause of drop of the transmission factor of the pixel.

In this connection, a method is available wherein, where an article which does not pass light of the backlight therethrough like reflection liquid crystal exists, the waveform shaping circuit 151 is positively disposed just below the reflecting region of the reflection liquid crystal.

By the arrangement of the waveform shaping circuit 151, the degree of freedom of the TFT layout for forming CMOS used for the waveform shaping circuit 151 increases significantly in comparison with that of the transmission type. Consequently, since the width of power supply lines such as those for the power supply voltage VDD2 and the reference voltage VSS2 can be increased, delay of a CMOS output by power supply line resistance becomes less likely to occur.

Figure 44:
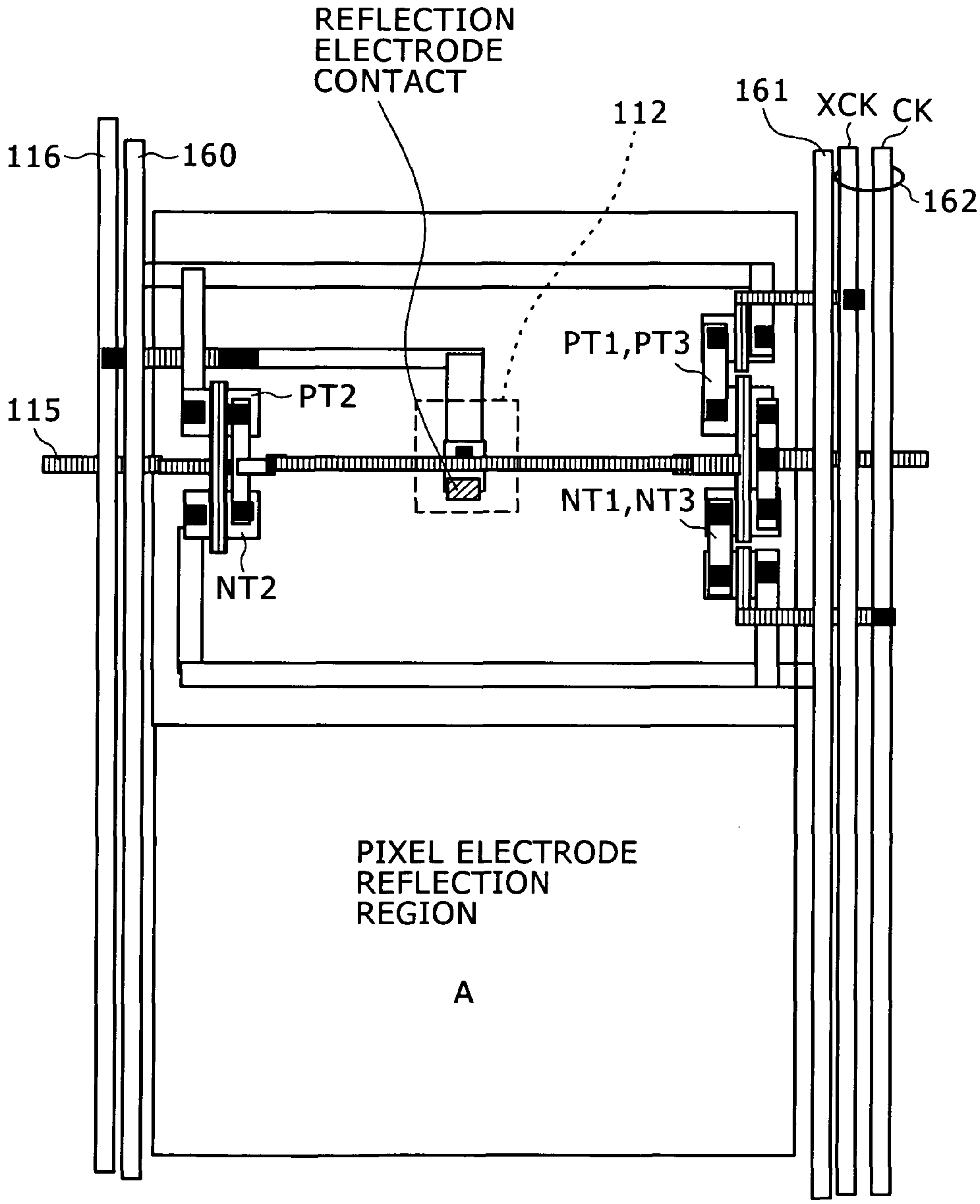
FIG. 44 is a plan view showing a first example of a pixel circuit of the reflection type liquid crystal display apparatus where the waveform shaping circuit of FIG. 13 is adopted.

FIG. 44 shows a first example of a pixel circuit of the reflection type liquid crystal display apparatus where the waveform shaping circuit described hereinabove with reference to FIGS. 13A to 13C is adopted.

Referring to FIG. 44, also in the arrangement shown, the components PT1, PT2, PT3, NT1, NT2, and NT3 and the wiring lines of the waveform shaping circuit 151 are disposed in the reflection region A.

Figure 45:
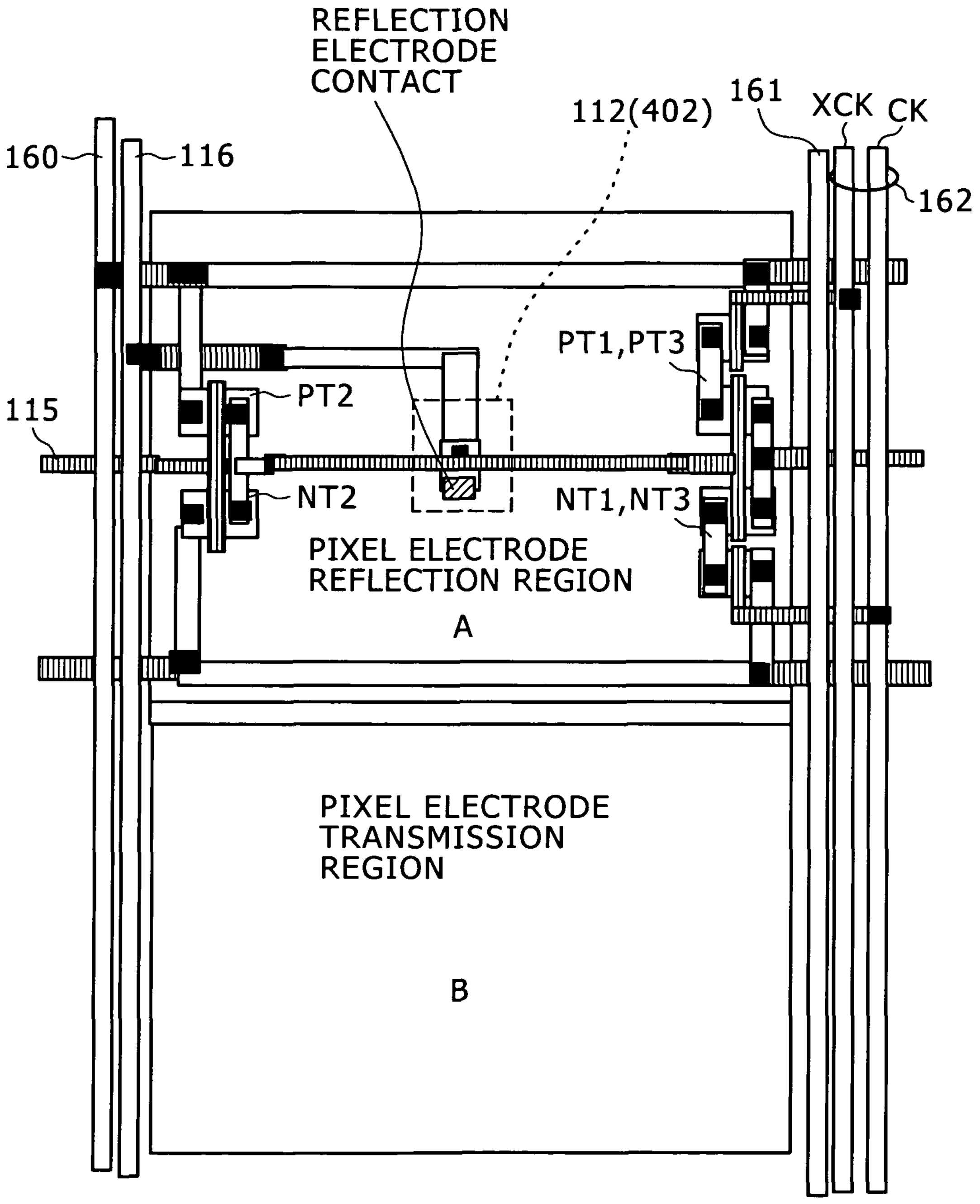
FIG. 45 is a plan view showing a second example of a pixel circuit of the transmission and reflection type liquid crystal display apparatus where the waveform shaping circuit of FIG. 13 is adopted.

FIG. 45 shows a second example of a pixel circuit of the transmission and reflection type liquid crystal display apparatus where the waveform shaping circuit described hereinabove with reference to FIGS. 13A to 13C is adopted.

The second example is similar to but different from the first example of FIG. 43 in that it is configured so as to prevent invasion of an undesirable voltage from the signal line 116 and the gate line 115.

In particular, in the present example, the signal line 116 and the gate line 115 are sandwiched by a supply line 160 for the power supply voltage VDD2 and a supply line 161 for the reference voltage VSS2 so as to prevent invasion of an undesirable voltage from the signal line 116 and the gate line 115.

Figure 46:
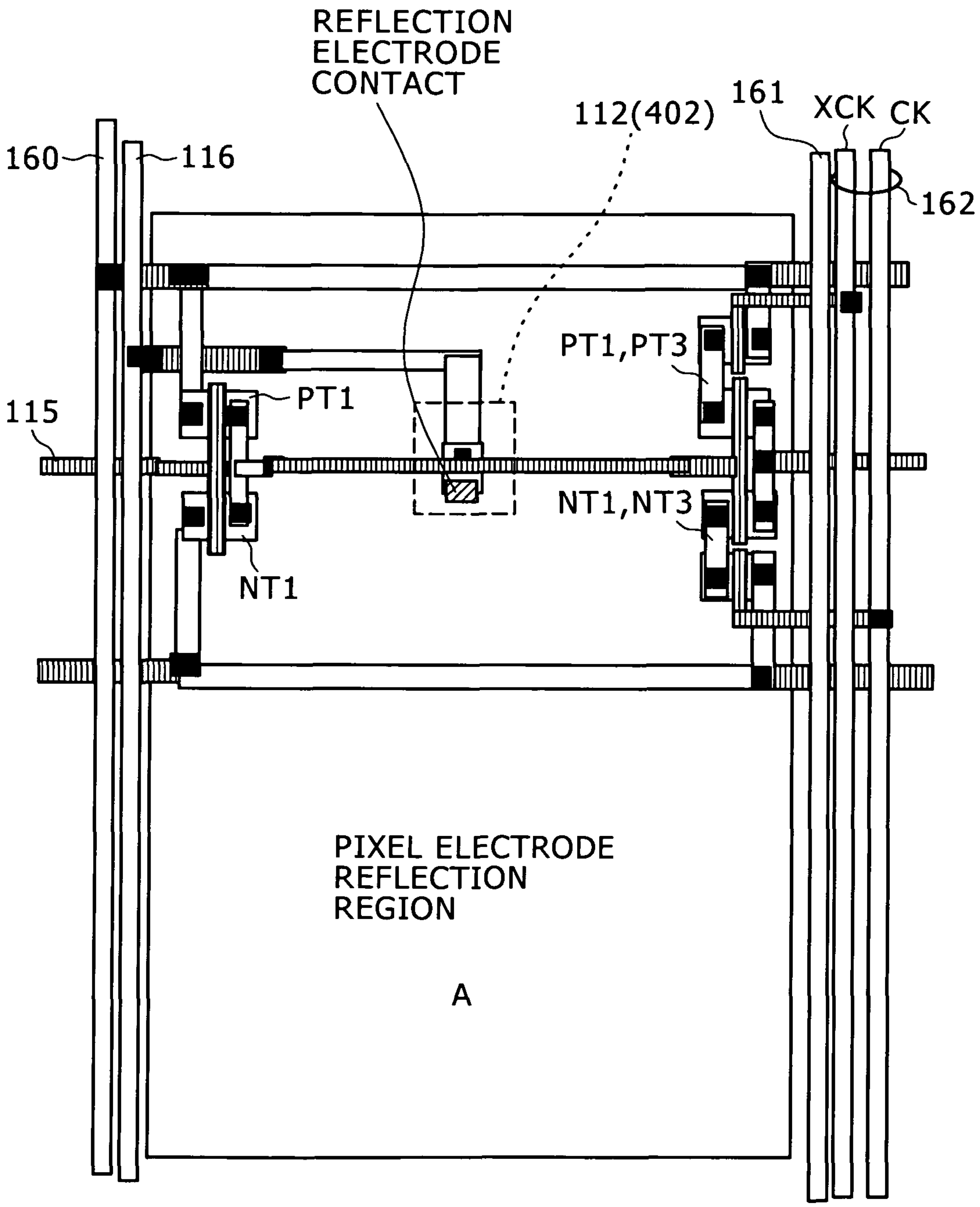
FIG. 46 is a plan view showing a second example of a pixel circuit of the reflection type liquid crystal display apparatus where the waveform shaping circuit of FIG. 13 is adopted.

FIG. 46 shows a second example of a pixel circuit of the reflection type liquid crystal display apparatus where the waveform shaping circuit described hereinabove with reference to FIGS. 13A to 13C is adopted.

The second example is similar to but different from the first example of FIG. 44 in that it is configured so as to prevent invasion of an undesirable voltage from a signal line 116 and a gate line 115.

In particular, in the present second example, the signal line 116 and the gate line 115 are sandwiched between the supply line 160 for the power supply voltage VDD2 and the supply line 161 for the reference voltage VSS2 so as to prevent invasion of an undesirable voltage from the signal line 116 and the gate line 115.

Figure 47:
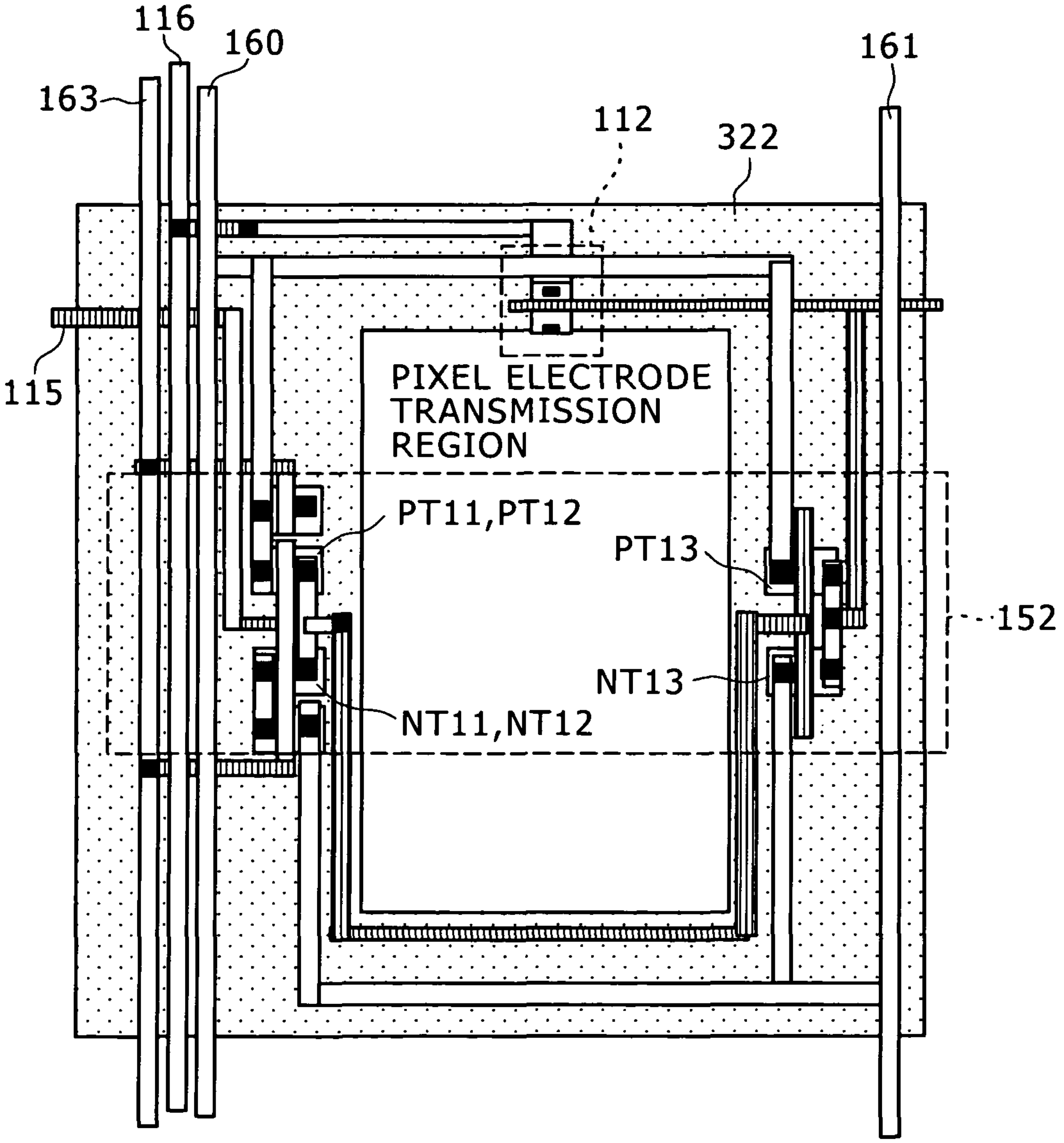
FIGS. 47, 48, 49, and 50 are plan views showing first, second, third, and fourth examples of the pixel circuit of a transmission type liquid crystal display apparatus where the waveform shaping circuit of FIG. 21 is adopted, respectively.

FIG. 47 shows a first example of a pixel circuit of the transmission type liquid crystal display apparatus where the waveform shaping circuit described hereinabove with reference to FIGS. 21A to 21C.

As seen in FIG. 47, the components PT1, PT2, PT3, NT1, NT2 and NT3 and wiring lines of the waveform shaping circuit 152 are disposed just below the light blocking region 322 formed from a black color filter mask.

In the present example, a gate pulse GP inputted in positive logic is applied in positive logic to the gate of the TFT 112 of the pixel circuit 111 after it passes through the buffers BF1 and BF2.

Since the waveform shaping circuit 152 is formed from a polycrystalline silicon TFT (thin film transistor), light from the backlight is blocked by the waveform shaping circuit 152, and this makes a cause of drop of the transmission factor of the pixel.

Therefore, a dispersion in luminance is likely to occur with a certain pixel which includes the waveform shaping circuit 152 formed from a TFT (thin film transistor) and the power supply lines 160 and 161 of the voltages VDD2 and VSS2 for the waveform shaping circuit 152.

Therefore, the light blocking region 322 formed from a black color filter mask for reducing the luminance dispersion among the pixels is placed above the circuit to fix the transmission factor thereby to suppress the luminance dispersion.

Figure 48:
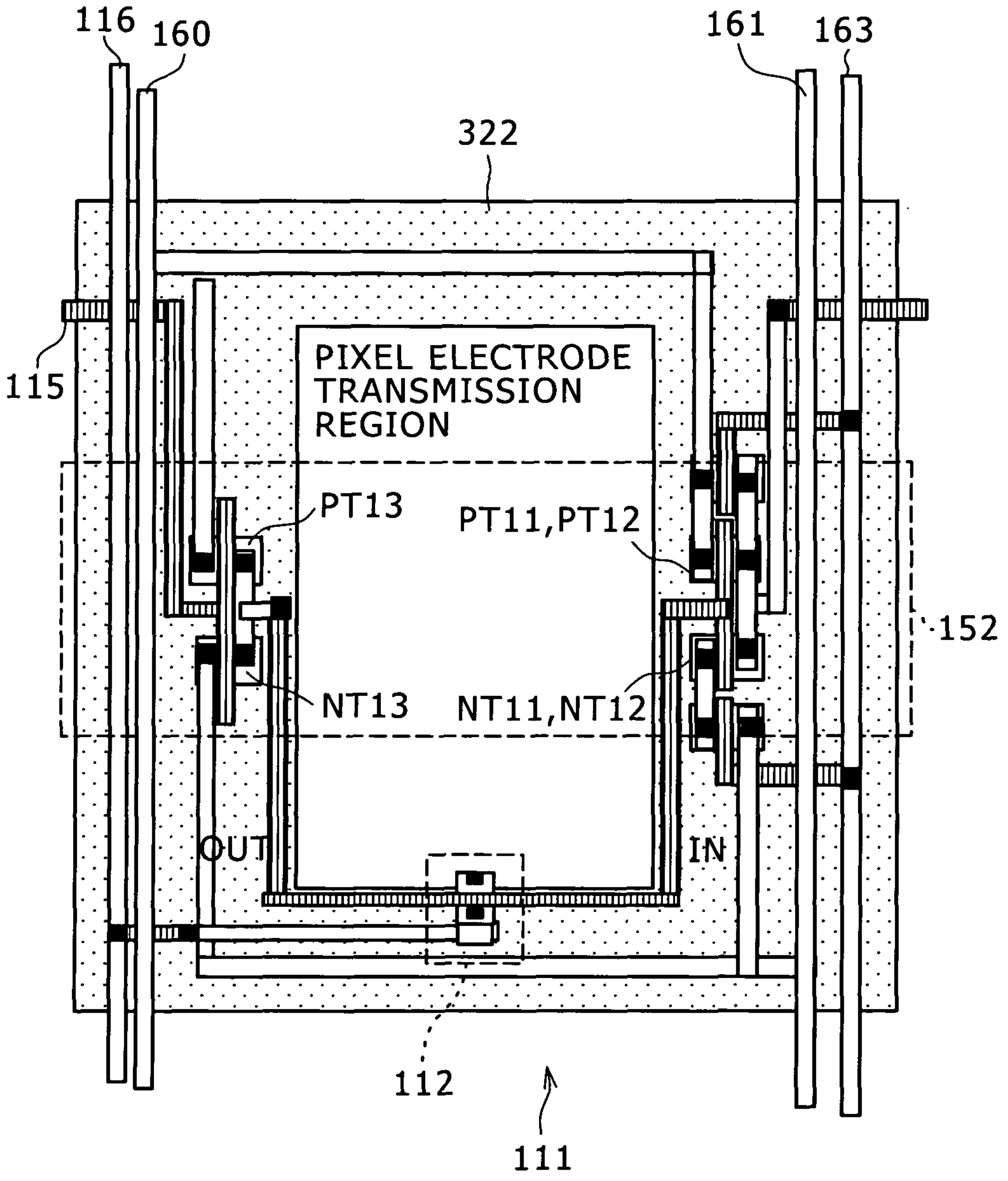

FIG. 48 shows a second example of a pixel circuit of the transmission type liquid crystal display apparatus where the waveform shaping circuit described hereinabove with reference to FIGS. 21A to 21C is adopted.

The second example is similar to but different from the first example of FIG. 47 in that it reverses the level of a gate pulse GP inputted in negative logic by means of the NAND circuit 11 so that the gate pulse GP is applied in positive logic to the gate of the TFT 112 of the pixel circuit 111. Then, the gate pulse GP is outputted in negative logic through the buffer BF11.

Accordingly, the pixel circuit 111 is positioned between the output of the NAND circuit 11 and the input of the buffer BF11.

Figure 49:
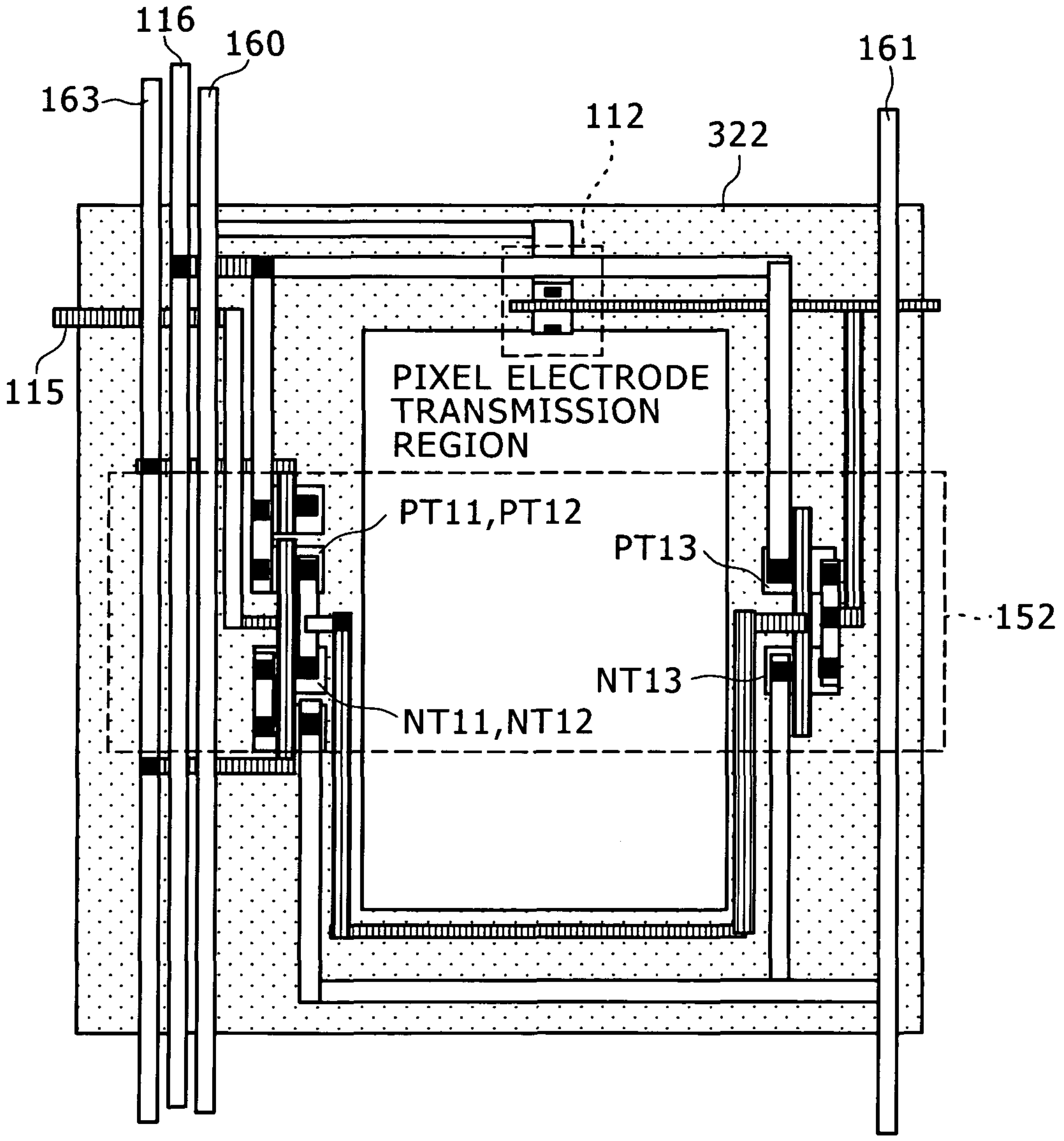

FIG. 49 shows a third example of a pixel circuit of the transmission type liquid crystal display apparatus where the waveform shaping circuit described hereinabove with reference to FIGS. 21A to 21C is adopted.

The third example is similar to but different from the first example of FIG. 47 in that it is configured so as to prevent invasion of an undesirable voltage from a signal line 116 and a gate line 115.

In particular, in the present third example, the signal line 116 and the gate line 115 are sandwiched between the supply line 160 for the power supply voltage VDD2 and the supply line 161 for the reference voltage VSS2 so as to prevent invasion of an undesirable voltage from the signal line 116 and the gate line 115.

Figure 50:
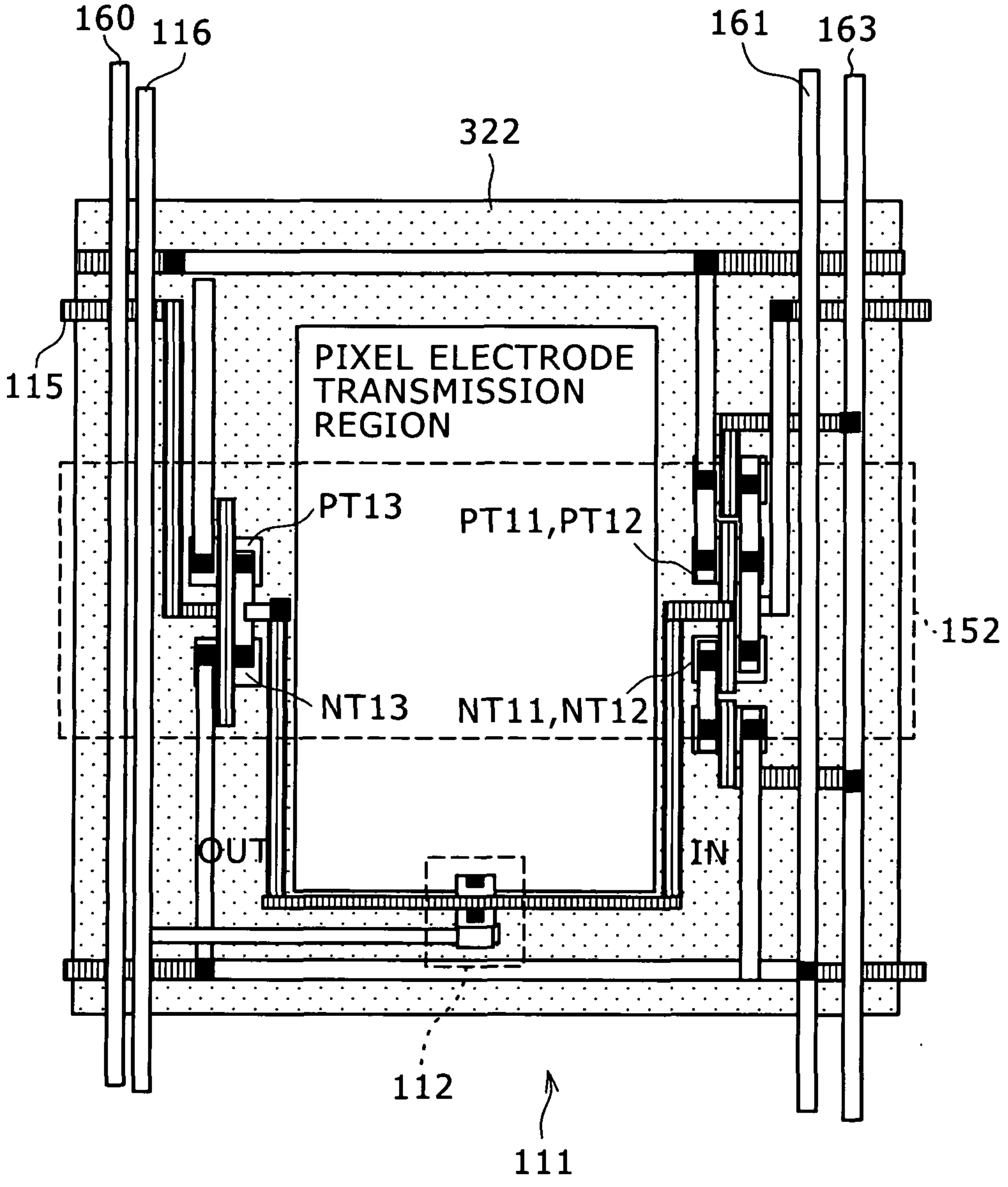

FIG. 50 shows a fourth example of a pixel circuit of the transmission type liquid crystal display apparatus where the waveform shaping circuit described hereinabove with reference to FIGS. 21A to 21C is adopted.

The fourth example is similar to but different from the second example of FIG. 48 in that it is configured so as to prevent invasion of an undesirable voltage from a signal line 116 and a gate line 115.

In particular, in the present fourth example, the signal line 116 and the gate line 115 are sandwiched between the supply line 160 for the power supply voltage VDD2 and the supply line 161 for the reference voltage VSS2 so as to prevent invasion of an undesirable voltage from the signal line 116 and the gate line 115.

Figure 51:
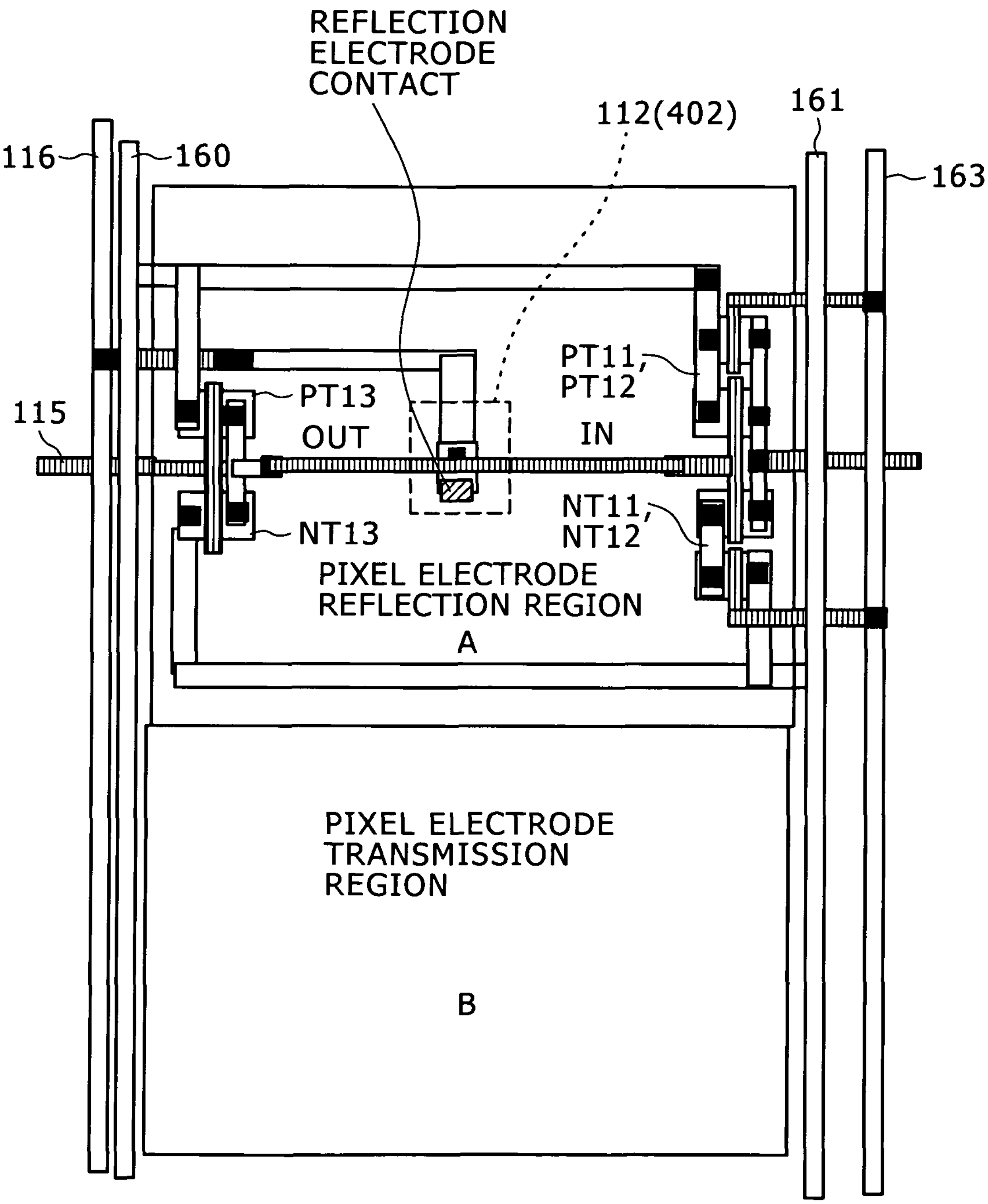
FIG. 51 is a plan view showing a first example of a pixel circuit of the transmission and reflection type liquid crystal display apparatus where the waveform shaping circuit of FIG. 21 is adopted.

FIG. 51 shows a first example of a pixel circuit of the transmission and reflection type liquid crystal display apparatus where the waveform shaping circuit described hereinabove with reference to FIGS. 21A to 21C is adopted.

Referring now to FIG. 51, the components PT11, PT12, PT13, NT11, NT12 and NT13 and the wiring lines of the waveform shaping circuit 152 are disposed in the reflection region A.

Since the waveform shaping circuit 152 is formed from a polycrystalline silicon TFT (thin film transistor), light from the backlight is blocked by the waveform shaping circuit 152, and this makes a cause of drop of the transmission factor of the pixel.

In this connection, a method is available wherein, where an article which does not pass light of the backlight therethrough like reflection liquid crystal exists, the waveform shaping circuit 152 is positively disposed just below the reflecting region of the reflection liquid crystal.

By the arrangement of the waveform shaping circuit 152, the degree of freedom of the TFT layout for forming CMOS used for the waveform shaping circuit 152 increases significantly in comparison with that of the transmission type. Consequently, since the width of power supply lines such as those for the power supply voltage VDD2 and the reference voltage VSS2 can be increased, delay of a CMOS output by power supply line resistance becomes less likely to occur.

Figure 52:
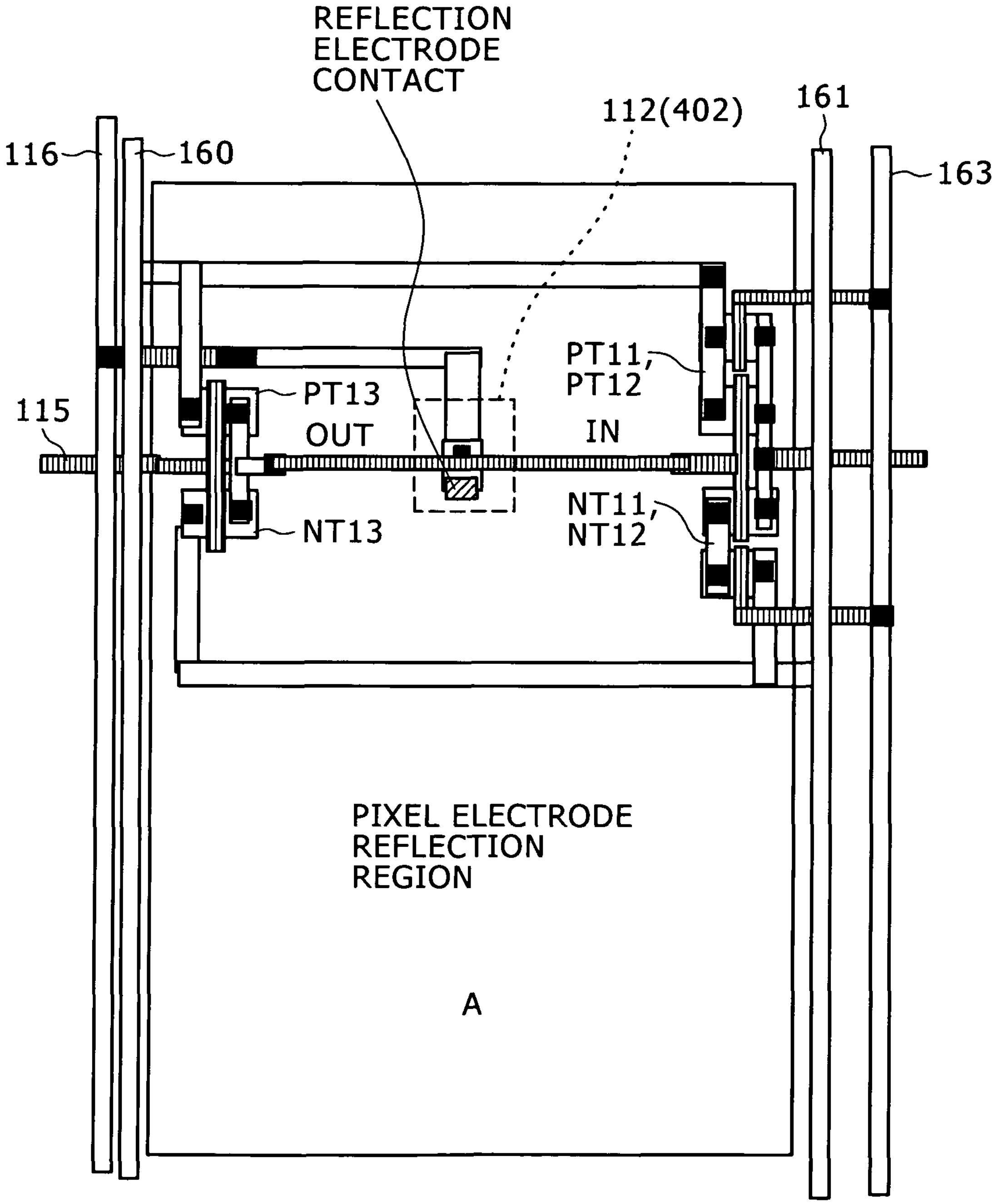
FIG. 52 is a plan view showing a first example of a pixel circuit of the reflection type liquid crystal display apparatus where the waveform shaping circuit of FIG. 21 is adopted.

FIG. 52 shows a first example of a pixel circuit of the reflection type liquid crystal display apparatus where the waveform shaping circuit described hereinabove with reference to FIGS. 21A to 21C is adopted.

Referring to FIG. 52, also in the arrangement shown, the components PT11, PT12, PT13, NT11, NT12, and NT13 and the wiring lines of the waveform shaping circuit 152 are disposed in the reflection region A.

Figure 53:
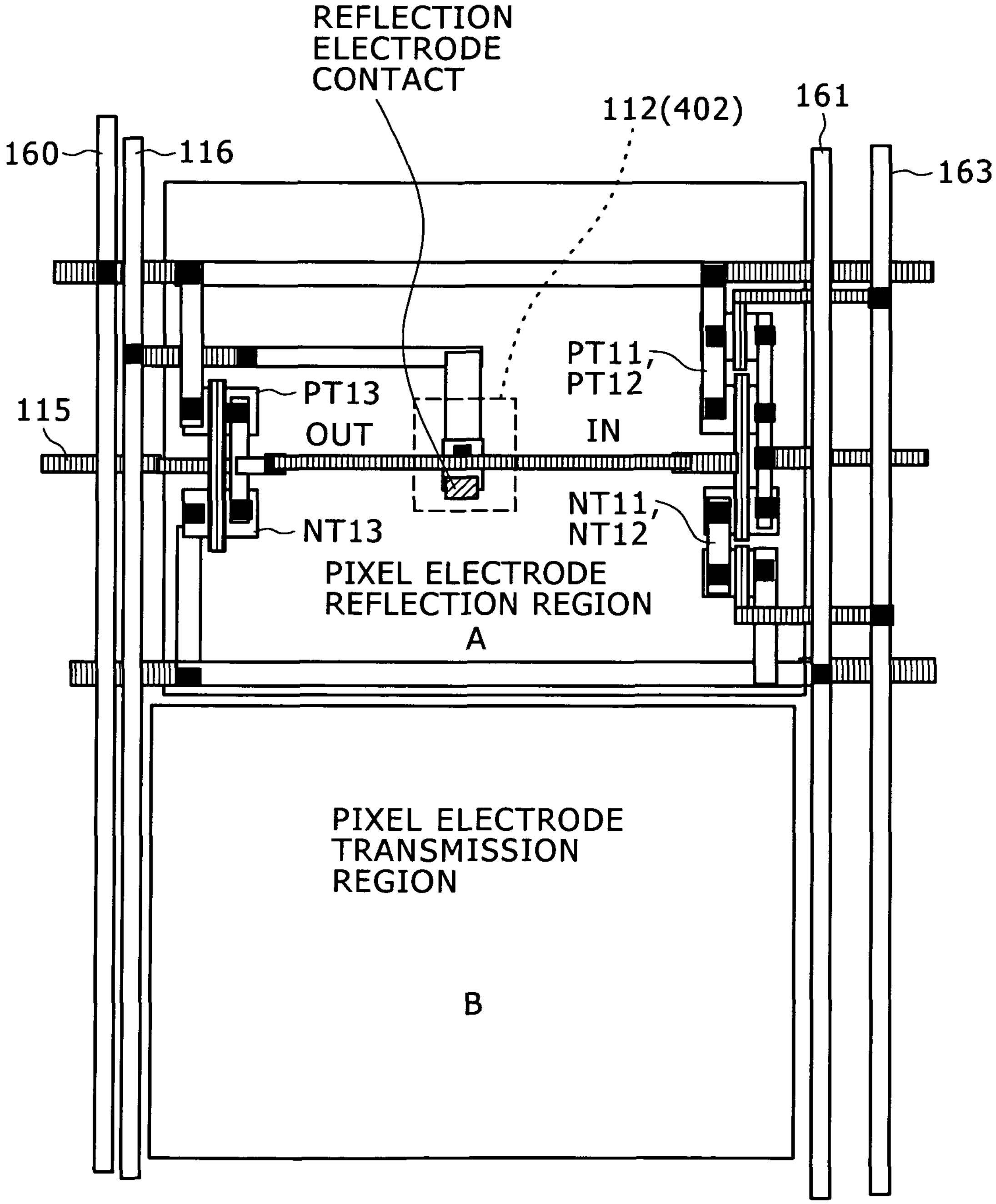
FIG. 53 is a plan view showing a second example of a pixel circuit of the transmission and reflection type liquid crystal display apparatus where the waveform shaping circuit of FIG. 21 is adopted.

FIG. 53 shows a second example of a pixel circuit of the transmission and reflection type liquid crystal display apparatus where the waveform shaping circuit described hereinabove with reference to FIGS. 21A to 21C is adopted.

The second example is similar to but different from the first example of FIG. 51 in that it is configured so as to prevent invasion of an undesirable voltage from the signal line 116 and the gate line 115.

In particular, in the present example, the signal line 116 and the gate line 115 are sandwiched by a supply line 160 for the power supply voltage VDD2 and a supply line 161 for the reference voltage VSS2 so as to prevent invasion of an undesirable voltage from the signal line 116 and the gate line 115.

Figure 54:
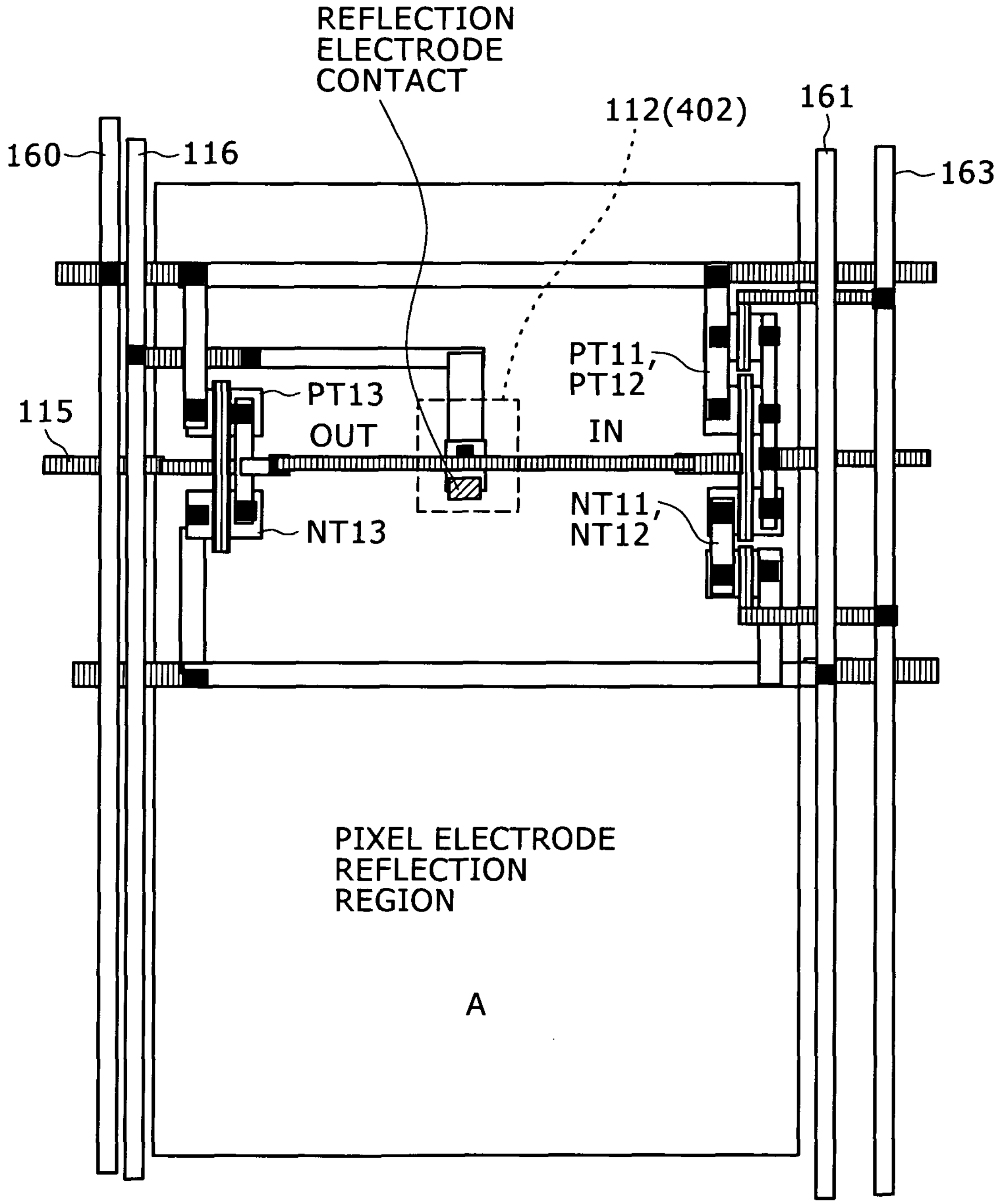
FIG. 54 is a plan view showing a second example of a pixel circuit of the reflection type liquid crystal display apparatus where the waveform shaping circuit of FIG. 21 is adopted.

FIG. 54 shows a second example of a pixel circuit of the reflection type liquid crystal display apparatus where the waveform shaping circuit described hereinabove with reference to FIGS. 21A to 21C is adopted.

The second example is similar to but different from the first example of FIG. 52 in that it is configured so as to prevent invasion of an undesirable voltage from a signal line 116 and a gate line 115.

In particular, in the present second example, the signal line 116 and the gate line 115 are sandwiched between the supply line 160 for the power supply voltage VDD2 and the supply line 161 for the reference voltage VSS2 so as to prevent invasion of an undesirable voltage from the signal line 116 and the gate line 115.

Active matrix display apparatus represented by the active matrix liquid crystal display apparatus according to the embodiments described hereinabove are used as a display apparatus for OA apparatus such as personal computers and word processors, television receivers and so forth. The display apparatus of the present invention can suitably applied as a display section for any other electronic apparatus such as a portable telephone set or a PDA for which miniaturization and downsizing of the apparatus body are being progressed.

In particular, the display apparatus according to the present invention described above can be applied to such various electronic apparatus shown as examples in FIGS. 55A to 55G.

In particular, the display apparatus can be applied as a display apparatus for electronic apparatus in all fields which display an image signal inputted to the electronic apparatus or an image signal produced in the electronic apparatus as an image such as, for example, a digital camera, a notebook type personal computer, a portable telephone set, a video camera and so forth.

In the following, particular examples of an electronic apparatus to which the display apparatus of the present invention is applied are described.

Figures 55A, 55B, 55C, 55D, 55E, 55F, 55G:
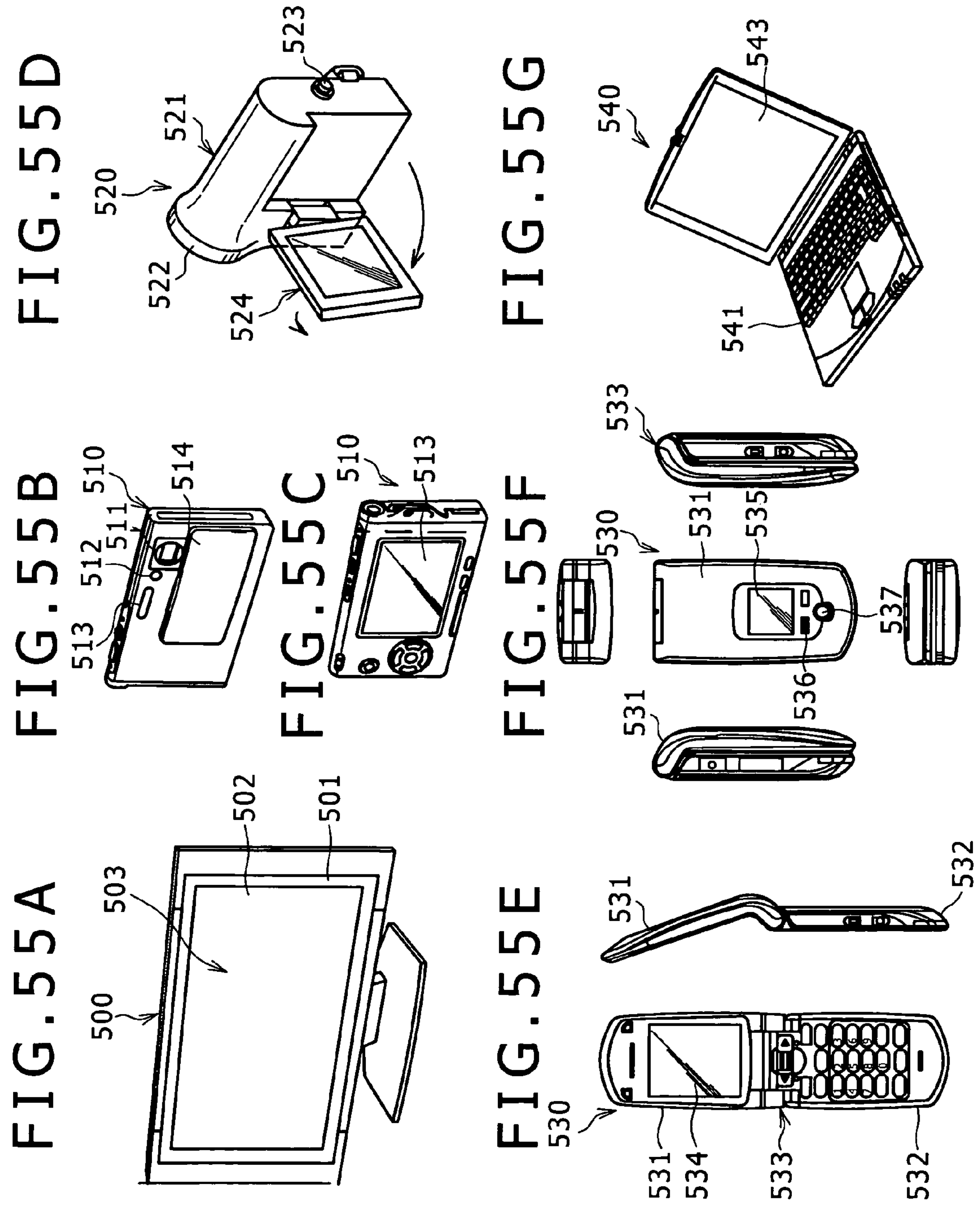
FIGS. 55A to 55G are schematic views showing several examples of an electronic apparatus to which the display apparatus according to the present invention is applied.

FIG. 55A shows an example of a television receiver to which the present invention is applied. Referring to FIG. 55A, the television receiver 500 includes an image display screen section 303 composed of a front panel 501, a glass filter 502 and so forth. The display apparatus according to the present invention can be used as the image display screen section 503.

FIGS. 55B and 55C show an example of a digital camera to which the present invention is applied. Referring to FIGS. 55B and 55C, the digital camera 510 includes an image pickup lens 511, a flash light emitting section 512, a display section 513, a control switch 514, and so forth. The display apparatus according to the present invention can be used as the display section 513.

FIG. 55D shows an example of a video camera to which the present invention is applied. Referring to FIG. 55D, the video camera 520 includes a body section 521, a lens 522 provided on a forwardly directed face of the body section 521 for picking up an image of an image pickup object, a start/stop switch 523 for being operated to start or stop image pickup, a display section 524 and so forth. The display apparatus according to the present invention can be used as the display section 524.

FIGS. 55E and 55F show an example of a portable terminal apparatus to which the present invention is applied. Referring to FIGS. 55E and 55F, the portable terminal apparatus 530 includes an upper side housing 531, a lower side housing 532, a connection section 533 in the form of a hinge, a display section 534, a sub display section 535, a picture light 536, a camera 537 and so forth. The display apparatus according to the present invention can be used as the display section 534 or the sub display section 535.

FIG. 55G shows an example of a notebook type personal computer to which the present invention is applied. Referring to FIG. 55G, the notebook type personal computer 540 includes a body 541, a keyboard 542 for being operated to input a character or the like, a display section 543 for displaying an image, and so forth. The display apparatus according to the present invention can be used as the display section 543.

It is to be noted that, in the embodiments described hereinabove, the present invention is applied to a liquid crystal display apparatus of the active matrix type. However, the present invention is not limited to this, but can be applied similarly also to other active matrix type display apparatus such as an EL display apparatus wherein an electroluminescence (EL) device is used as an electro-optical element of each pixel.

It should be understood by those skilled in the art that various modifications, combinations, sub-combinations, and alterations may occur depending on design requirements and other factors insofar as they are within the scope of the appended claims or the equivalents thereof.

What is claimed is:

1. A display apparatus comprising:

a plurality of pixel circuits arrayed in a matrix, each of the pixel circuits including a switching transistor and a liquid crystal cell; and at least one waveform shaping circuit connected to a gate electrode of the switching transistor, the waveform shaping circuit including:

a gate electrode of a first buffer PMOS transistor directly electrically connected to a gate electrode of a first buffer NMOS transistor;

a gate electrode of a second buffer PMOS transistor directly electrically connected to a gate electrode of a second buffer NMOS transistor;

a source of the first buffer NMOS transistor directly electrically connected to a drain of a third buffer NMOS transistor;

a source of the second first buffer PMOS transistor directly electrically connected to a source of a third buffer PMOS transistor;

a source electrode of the third buffer NMOS transistor directly electrically connected to a source electrode of the second buffer NMOS transistor;

a drain of the first buffer PMOS transistor directly electrically connected to a drain of the first buffer NMOS transistor and to said gate electrode of the second buffer PMOS transistor;

a drain of the second buffer PMOS transistor directly electrically connected to a drain of the second buffer NMOS transistor;

a drain of the third buffer PMOS transistor directly electrically connected to said drain of the first buffer PMOS transistor; and a gate electrode of the third buffer PMOS transistor directly electrically connected to a gate electrode of the third buffer NMOS transistor, wherein the waveform shaping circuit is a NAND circuit of a CMOS configuration that indicates an inverted logic output with respect to an input thereto, wherein the NAND circuit of the CMOS configuration starts an operation at a rising edge or a falling edge of an enable signal when the enable signal is inputted to the NAND circuit of the CMOS configuration, and wherein the rising edge of the enable signal occurs simultaneously with each rising edge of a gate pulse supplied to the plurality of pixels arrayed in the matrix.

2. The display apparatus according to claim 1, further comprising:

a gate electrode of a switching device directly electrically connected to said gate electrode of the first buffer PMOS transistor and to said gate electrode of the first buffer NMOS transistor.

3. The display apparatus according to claim 2, further comprising:

a drain electrode of the switching device directly electrically connected to an electrode of a storage capacitance and to an electrode of an electro-optical element.

4. The display apparatus according to claim 2, further comprising:

a gate electrode of a different switching device directly electrically connected to said drain of the second buffer PMOS transistor and to said drain of the second buffer NMOS transistor.

5. The display apparatus according to claim 2, further comprising:

a power supply voltage supply line directly electrically connected to said source of the second buffer PMOS transistor and to said source of the third buffer PMOS transistor.

6. The display apparatus according to claim 5, wherein said power supply voltage supply line is configured to receive a power supply voltage.

7. The display apparatus according to claim 6, further comprising:

a different power supply voltage supply line directly electrically connected to said source of the third buffer NMOS transistor and to said source of the second buffer NMOS transistor.

8. The display apparatus according to claim 7, wherein said different power supply voltage supply line is configured to receive a different power supply voltage, said different power supply voltage differing from said power supply voltage.

9. The display apparatus according to claim 8, further comprising:

a common voltage wiring line directly electrically connected to another electrode of the storage capacitance and to an opposing electrode of the electro-optical element.

10. The display apparatus according to claim 8, wherein said common voltage wiring line is configured to receive a common voltage, said common voltage differing from said power supply voltage and said different power supply voltage.

11. The display apparatus according to claim 1, further comprising:

an electrode of a gate line capacitance directly electrically connected to said drain of the second buffer PMOS transistor and to said drain of the second buffer NMOS transistor.

12. The display apparatus according to claim 1, further comprising:

a substrate having a light blocking region, said first buffer NMOS transistor and said second buffer NMOS transistor being in said light blocking region.

13. An electronic apparatus comprising the display apparatus according to claim 1.

* * * * *